United States Patent
LaPray et al.

(10) Patent No.: US 11,111,363 B2
(45) Date of Patent: Sep. 7, 2021

(54) ARTICLES FORMED WITH RENEWABLE AND/OR SUSTAINABLE GREEN PLASTIC MATERIAL AND CARBOHYDRATE-BASED POLYMERIC MATERIALS LENDING INCREASED STRENGTH AND/OR BIODEGRADABILITY

(71) Applicant: BiologiQ, Inc., Idaho Falls, ID (US)

(72) Inventors: Bradford LaPray, Idaho Falls, ID (US); Wenji Quan, Idaho Falls, ID (US); Donald R. Allen, Idaho Falls, ID (US)

(73) Assignee: BIOLOGIQ, INC., Idaho Falls, ID (US)

( * ) Notice: Subject to any disclaimer, the term of this patent is extended or adjusted under 35 U.S.C. 154(b) by 79 days.

(21) Appl. No.: 15/836,555

(22) Filed: Dec. 8, 2017

(65) Prior Publication Data

US 2018/0100060 A1 Apr. 12, 2018

Related U.S. Application Data

(63) Continuation-in-part of application No. 15/691,588, filed on Aug. 30, 2017, and a continuation-in-part of
(Continued)

(51) Int. Cl.
*C08L 3/02* (2006.01)
*C08L 23/06* (2006.01)
(Continued)

(52) U.S. Cl.
CPC .............. *C08L 23/06* (2013.01); *C08L 3/02* (2013.01); *C08L 23/12* (2013.01); *C08L 67/02* (2013.01);
(Continued)

(58) Field of Classification Search
None
See application file for complete search history.

(56) References Cited

U.S. PATENT DOCUMENTS 3,270,874 A 9/1966 Hilton
3,865,603 A 2/1975 Szymanski
(Continued)

FOREIGN PATENT DOCUMENTS

CA 1031088 5/1978
CN 1603361 4/2005
(Continued)

OTHER PUBLICATIONS

Santos, R. A. L. et al., "Starch/Poly (Butylene Adipate-Co-Terephthalate)/Montmorillonite Films Produced by Blow Extrusion". Quim. Nov. 2014, 37(6), 937-942. (Year: 2014).*
(Continued)

*Primary Examiner* — Richard A Huhn
(74) *Attorney, Agent, or Firm* — Workman Nydegger

(57) ABSTRACT

Described herein are strength characteristics and biodegradation of articles produced using one or more "green" sustainable polymers and one or more carbohydrate-based polymers. A compatibilizer can optionally be included in the article. In some cases, the article can include a film, a bag, a bottle, a cap or lid therefore, a sheet, a box or other container, a plate, a cup, utensils, or the like.

37 Claims, 19 Drawing Sheets

Related U.S. Application Data application No. 15/481,806, filed on Apr. 7, 2017, and a continuation-in-part of application No. 15/481,823, filed on Apr. 7, 2017, and a continuation-in-part of application No. 14/853,780, filed on Sep. 14, 2015, and a continuation-in-part of application No. 14/853,725, filed on Sep. 14, 2015.

(60) Provisional application No. 62/483,219, filed on Apr. 7, 2017, provisional application No. 62/442,432, filed on Jan. 4, 2017, provisional application No. 62/440,399, filed on Dec. 29, 2016, provisional application No. 62/187,231, filed on Jun. 30, 2015.

(51) Int. Cl.
*C08L 23/12* (2006.01)
*C08L 67/02* (2006.01)

(52) U.S. Cl.
CPC ....... *C08L 2201/06* (2013.01); *C08L 2203/10* (2013.01); *C08L 2203/16* (2013.01); *C08L 2205/025* (2013.01); *C08L 2205/03* (2013.01); *C08L 2205/035* (2013.01); *C08L 2207/04* (2013.01); *C08L 2207/066* (2013.01)

(56) References Cited

U.S. PATENT DOCUMENTS

| | | |
|---|---|---|
| 4,016,117 A | 4/1977 | Griffin |
| 5,026,745 A | 6/1991 | Weil |
| 5,095,054 A | 3/1992 | Lay et al. |
| 5,314,934 A | 5/1994 | Tomka |
| 5,449,708 A | 9/1995 | Schiltz |
| 5,462,983 A | 10/1995 | Bloembergen |
| 5,510,401 A | 4/1996 | Dehennau et al. |
| 5,714,445 A | 2/1998 | Trinh |
| 6,211,325 B1 | 4/2001 | Sun |
| 6,472,497 B2 | 10/2002 | Loercks et al. |
| 6,605,657 B1 | 8/2003 | Favis et al. |
| 6,783,854 B2 | 8/2004 | Bond |
| 6,818,295 B2 | 11/2004 | Bond et al. |
| 6,841,597 B2 | 1/2005 | Bastioli et al. |
| 6,946,506 B2 | 9/2005 | Bond et al. |
| 7,608,649 B2 | 10/2009 | Sun |
| 7,666,261 B2 | 2/2010 | Bailey et al. |
| 7,740,952 B2 | 6/2010 | Hausmann |
| 7,998,888 B2 | 8/2011 | Shi |
| 8,188,185 B2 | 5/2012 | Wang |
| 8,232,348 B2 | 7/2012 | Changping |
| 8,283,006 B2 | 10/2012 | Wang |
| 8,329,501 B1 | 12/2012 | Robinson et al. |
| 8,329,601 B2 | 12/2012 | Shi |
| 8,466,337 B2 | 6/2013 | Wang |
| 8,802,754 B2 | 8/2014 | Nie |
| 8,807,254 B2 | 8/2014 | Manus |
| 8,889,945 B2 | 11/2014 | Wang |
| 8,927,611 B2 | 1/2015 | Voolapalli et al. |
| 8,927,617 B2 | 1/2015 | Funk |
| 8,969,224 B2 | 3/2015 | Masuda et al. |
| 9,056,968 B2 | 6/2015 | Matsuo et al. |
| 9,273,207 B2 | 3/2016 | Bastioli |
| 9,327,438 B2 | 5/2016 | Wang |
| 9,464,188 B2 | 10/2016 | Wang |
| 9,884,471 B2 | 2/2018 | Neuman et al. |
| 10,131,783 B2 | 11/2018 | Schmidt et al. |
| 10,214,634 B2 | 2/2019 | LaPray et al. |
| 10,239,292 B2 | 3/2019 | Nissenbaum et al. |
| 10,752,759 B2 | 8/2020 | LaPray et al. |
| 2002/0006989 A1 | 1/2002 | Bastioli |
| 2002/0168517 A1 | 11/2002 | Husemann et al. |
| 2002/0168518 A1 | 11/2002 | Bond et al. |
| 2002/0188041 A1 | 12/2002 | Bond et al. |
| 2003/0077444 A1 | 4/2003 | Bond et al. |
| 2003/0166779 A1* | 9/2003 | Khemani ............... C08L 67/03 525/178 |
| 2007/0129468 A1 | 6/2007 | Bastioli et al. |
| 2008/0103232 A1 | 5/2008 | Lake |
| 2008/0287592 A1 | 11/2008 | Favis et al. |
| 2009/0048368 A1 | 2/2009 | Bash |
| 2010/0159777 A1 | 6/2010 | Wang |
| 2010/0311874 A1 | 12/2010 | Mentink |
| 2011/0287929 A1 | 11/2011 | Smith |
| 2012/0059097 A1 | 3/2012 | Liao |
| 2012/0139154 A1 | 6/2012 | Huneault |
| 2012/0283364 A1 | 11/2012 | Sarazin et al. |
| 2012/0316257 A1 | 12/2012 | Bastioli |
| 2013/0001289 A1 | 1/2013 | Tedford |
| 2013/0157031 A1 | 6/2013 | Wang |
| 2013/0157032 A1 | 6/2013 | Wamg |
| 2014/0011921 A1 | 1/2014 | Bash |
| 2014/0079935 A1* | 3/2014 | Broyles ..................... C08J 5/18 428/220 |
| 2014/0272370 A1 | 9/2014 | Broyles |
| 2016/0107426 A1 | 4/2016 | Leufgens |
| 2017/0002184 A1 | 1/2017 | LaPray et al. |
| 2017/0002185 A1 | 1/2017 | LaPray et al. |
| 2017/0210889 A1 | 7/2017 | LaPray |
| 2017/0218184 A1 | 8/2017 | LaPray |
| 2017/0283597 A1 | 10/2017 | LaPray |
| 2017/0362418 A1 | 12/2017 | LaPray |
| 2018/0100060 A1 | 4/2018 | LaPray |
| 2019/0194426 A1 | 6/2019 | LaPray et al. |
| 2019/0256681 A1 | 8/2019 | LaPray et al. |
| 2019/0276664 A1 | 9/2019 | LaPray |
| 2019/0315942 A1 | 10/2019 | LaPray |
| 2019/0315947 A1 | 10/2019 | LaPray |
| 2020/0339781 A1 | 10/2020 | LaPray et al. |
| 2020/0339784 A1 | 10/2020 | LaPray et al. |
| 2020/0339803 A1 | 10/2020 | Allen et al. |
| 2020/0377705 A1 | 12/2020 | LaPray et al. |

FOREIGN PATENT DOCUMENTS

| | | |
|---|---|---|
| CN | 101589097 | 11/2009 |
| CN | 102153786 A | 8/2011 |
| CN | 102329436 A | 1/2012 |
| CN | 101805499 B | 5/2012 |
| CN | 102850626 | 1/2013 |
| CN | 103289165 | 9/2013 |
| CN | 103819794 A | 5/2014 |
| CN | 103987504 | 8/2014 |
| CN | 103998195 | 8/2014 |
| CN | 105966014 | 9/2016 |
| CN | 103627153 B | 2/2018 |
| CN | 107793619 A | 3/2018 |
| CN | 105670239 B | 6/2018 |
| CN | 108276744 | 7/2018 |
| EP | 326517 | 7/1994 |
| EP | 1930487 A1 | 6/2008 |
| EP | 2762307 | 8/2014 |
| GB | 2272699 | 5/1994 |
| JP | S49055740 | 5/1974 |
| JP | S50086543 | 7/1975 |
| JP | H07126449 | 5/1995 |
| JP | H07258488 | 10/1995 |
| JP | H09041224 | 2/1997 |
| JP | 10-259083 A | 9/1998 |
| JP | H11322962 | 11/1999 |
| JP | 2003518541 | 6/2003 |
| JP | 3539955 | 7/2004 |
| JP | 2005089718 | 4/2005 |
| JP | 2005264111 | 9/2005 |
| JP | 2008-013602 A | 1/2008 |
| JP | 2010150305 | 7/2010 |
| JP | 2010260923 | 11/2010 |
| JP | 2011042032 | 3/2011 |
| JP | 2011511121 | 4/2011 |
| JP | 2011213836 | 10/2011 |
| JP | 2012148507 | 8/2012 |
| JP | 5544303 | 7/2014 |
| JP | 2018502744 | 2/2018 |
| JP | 2018525467 | 9/2018 |

(56) References Cited

FOREIGN PATENT DOCUMENTS

| TW | 201538529 | 10/2015 |
|---|---|---|
| WO | 0148078 | 7/2001 |
| WO | 2003014164 | 11/2004 |
| WO | 2006116861 | 11/2006 |
| WO | 2007/027163 A2 | 3/2007 |
| WO | 2009073197 | 6/2009 |
| WO | 2009103052 | 8/2009 |
| WO | 2011020170 | 2/2011 |
| WO | 2012088585 | 7/2012 |
| WO | 2013116945 | 8/2013 |
| WO | 2014089321 | 6/2014 |
| WO | 2014/190935 A1 | 12/2014 |
| WO | 2014190395 | 12/2014 |
| WO | 2015028943 | 3/2015 |
| WO | 2016109196 | 7/2016 |
| WO | 2016/134994 A1 | 9/2016 |
| WO | 2018/125897 A1 | 7/2018 |
| WO | 2018187784 | 10/2018 |

OTHER PUBLICATIONS

U.S. Appl. No. 16/287,884, filed Feb. 27, 2019, LaPray.
U.S. Appl. No. 15/481,806, Feb. 28, 2019, Office Action.
U.S. Appl. No. 15/481,823, Feb. 28, 2019, Office Action.
U.S. Appl. No. 14/853,780, Feb. 28, 2019, Office Action.
PCT Search Report dated Sep. 14, 2016 for PCT/US2016/040092, 1 page.
PCT Search Report dated Sep. 15, 2016 for PCT/US2016/040104, 1 page.
Kalambur, et al., "An Overview of Starch-Based Plastic Blends from Reactive Extrusion" Journal of Plastic Film and Sheeting, 2006, vol. 22, pp. 39-58.
Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.
Tang, et al., "Recent Advances in Starch, Polyvinyl Alcohol Based Polymer Blends, Nanocomposites and their Biodegradability" Carbohydrate Polymers, 2011, vol. 85, pp. 7-16.
Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.
Braskem "Life Cycle Assessment of Green Plastic" Available as early as Mar. 28, 2017, accessed at http://www.braskem.com_site.aspx_plastic-green, 18 pages.
De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.
Ojeda, Telmo, et al., "Polymer Degradation and Stability" Available as early as Dec. 16, 2010 at www.elsevier.com/locat/polydegstab, 5 pages.
Thakore, I.M., et al., "Studies on Biodegradability, morphology and thermo-mechanical properties of LDPE/modified starch blends" published in the European Polymer Journal, vol. 37 2001, pp. 151-160.
Vargha, et al., "Behavior of Polyethylene Films in Soil" published in Periodica Polytechnica Chemical Engineering, Nov. 5, 2015 pp. 60-68.
Li, Gang, et al., "Biodegradation of Thermoplastic Starch and its Blends with Poly(lactic acid) and Polyethylene: Influence of Morphology" published in Macromolecular Journals of Chemistry and Physics, 2011 pp. 1147-1154.
Ibbrucker, Constance "Can Additives make plastics biodegradable?" Bioplastics Magazine Jan. 2017, 1 page.
Ibbrucker, Constance "Oxo-degradable plastics increasingly under fire in Europe" European Bioplastics, http://www.european-bioplastics.org/oxo-degradable-plastics-increasingly-under-fire-in-europe/ Feb. 28, 2017, 5 pages.

"Oxo-Biodegradable Plastics and Other Plastics with Additives for Degradation" European Bioplastics BackGround Oct. 2015, 5 pages.
"BPI Position on Degradable Additives" Feb. 2010, 6 pages.
"The SPC Position Against Biodegradability Additives for Petroleum-Based Plastics" Sustainable Packaging Coalition, http://www.sustainablepackaging.org/content/?type=5&id=position-against-biodegradability-additives-for-petroleum-based-plastics Retreived on Sep. 19, 2017, 5 pages.
"APR Position Statement—Degradable Additives Use in Bottles, Forms and Films" The Association of Postconsumer Plastic Recyclers, http://plasticsrecycling.org/about/position-statements, Apr. 27, 2015, 1 page.
"Compostable Plastics 101: An Overview of Compostable Plastics Sponsored by the California Organics Recycling Council" based on information and belief, available at least as early as 2012, 23 pages.
Yoshida, et al., "A Bacterium that Degrades and Assimilates Poly(ehylene terphthalate)" Science Magazine vol. 351 Issue 6278 Mar. 11, 2016 pp. 1196-1199.
"Discover Polysaccharides" Available at http://polysac3db.cermav.cnrs.fr/discover_starch.html; Accessed Feb. 16, 2017, 10 pages.
Office Action for U.S. Appl. No. 14/853,780 dated Oct. 12, 2016.
Office Action for U.S. Appl. No. 14/853,725 dated Apr. 28, 2017.
Final Office Action for U.S. Appl. No. 14/853,780 dated May 24, 2017.
Office Action for U.S. Appl. No. 14/853,780 dated Nov. 6, 2017.
Final Office Action for U.S. Appl. No. 14/853,725 dated Nov. 8, 2017.
Tokiwa, et al., "Biodegradability of Plastics" in the International Journal of Molecular Sciences, Aug. 26, 2009, vol. 10, pp. 3722-3742.
International Search Report and Written Opinion for PCT PCT/US2017/068492 dated Mar. 16, 2018, 14 pages.
Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.
"Environmentally Degradable Plastics" Leonardo Da Vinci Program; Jan. 2000-Dec. 2006.
Arevalo-Nino et al., "Starch-based extruded plastic films and evaluation of their biodegradable properties" Biodegradation 7: 231-237, 1996.
Chen et al. "Environmental Degradation of Starch/Poly (Lactic Acid) Composite in Seawater" Apr. 6, 2010.
Shogren et al. "Biodegradation of starch/polylactic acid/poly(hydroxyester-ether) composite bars in soil" Polymer Degradation and Stability 79 (2003) 405-411.
"Transition Metal Salts." Oxo-biodegradable Plastics Association, http://www.biodeg.org/index.html. Accessed Apr. 20, 2018.
Luo, Ying, et al. "Accelerating the degradation of polyethylene composite mulches." Plastics Research Online, May 19, 2017. Society of Plastics Engineers (SPE), DOI: 10.2417/spepro.006909. Accessed Apr. 20, 2018.
Shang, Jing, et al. "Photocatalytic Degradation of Polystyrene Plastic under Fluorescent Light." *Environmental Science & Technology*, Sep. 5, 2003, 37 (19), pp. 4494-4499. *American Chemical Society*, DOI: 10.1021/es0209464. Accessed Apr. 20, 2018.
Gupta, Apeksha et al. "Visible Range Photocatalysts for Solid Phase Photocatalytic Degradation of Polyethylene and Polyvinyl Chloride." *Journal of the Chilean Chemical Society*, [S.I.], v. 62, n. 1, Jun. 2017. ISSN 0717-9707. <https://jcchems.com/index.php/JCCHEMS/article/view/156>. Accessed: Apr. 20, 2018.
Oluz, Zehra and Teoman Tinter. "Additives for ultraviolet-induced oxidative degradation of low-density polyethylene." *J. Appl. Polym. Sci.*, 133, 43354, Jan. 18, 2016. *Wiley Online Library*, DOI: 10.1002/app.43354. Accessed Apr. 21, 2018.
Thryft, Ann R. "Biodegradable Plastics Standard to Bust Landfill Waste." ENSO Plastics, Nov. 15, 2011. http://ensoplastics.com/theblog/?p=535. Accessed Apr. 23, 2018.
Esmaeili, Atefeh, et al. "Biodegradation of Low-Density Polyethylene (LDPE) by Mixed Culture of Lysinibacillus xylanilyticus and Aspergillus niger in Soil." *PLoS One* 8(9): e71720, Sep. 23, 2013. https://doi.org/10.1371/journal.pone.0071720. Accessed Apr. 16, 2018.

(56) References Cited

OTHER PUBLICATIONS

Sumathi, Tirupati et al. "Production of Laccase by *Cochliobolus* sp. Isolated from Plastic Dumped Soils and Their Ability to Degrade Low Molecular Weight PVC." *Biochemistry Research International* 2016 (2016): 9519527. *PMC*. Web. Apr. 16, 2018.
U.S. Appl. No. 15/628,379, Apr. 30, 2018, Office Action.
U.S. Appl. No. 15/481,823, Apr. 30, 2018, Office Action.
U.S. Appl. No. 15/481,806, Apr. 30, 2018, Office Action.
U.S. Appl. No. 15/691,588, Apr. 30, 2018, Office Action.
Bastioli et al. "Starch in Polymers Technology" ACS Symposium Series, Jan. 1, 2012, American Chemical Society/Oxford University Press, XP055490447, vol. 1114, pp. 87-112.
PCT International Search Report and Written Opinion for PCT/US2018/026610 dated Jul. 13, 2018.
Van Soest et al. "Crystallinity in Starch Plastics: Consequences for Material Properties" Trends in Biotechnology, vol. 15, No. 6, Jun. 1, 1997, pp. 208-213.
U.S. Appl. No. 14/853,780, Aug. 10, 2018, Office Action.
U.S. Appl. No. 14/853,725, Oct. 12, 2018, Office Action.
U.S. Appl. No. 15/691,588, Jan. 2, 2019, Office Action.
Eyheraguibel, et al. "Characterization of oxidized oligomers from polyethylene films by mass spectrometry and NMR spectroscopy before and after biodegradation by a *Rhodococcus rhodochrous* strain" Chemosphere 184, 2017, pp. 366-374.
Fujisawa, et al. "Degradation of Polyethylene and Nylon 66 by the Laccase-Mediator System" Journal of Polymers and the Environment, vol. 9, Issue 3, 2001, pp. 103-108.
Ohtake, et al. "The Biodegradability of Polyethylene" Material Life, vol. 6, Issue 3, 1994, pp. 125-133.
Zhang, et al. "Retrogradation and Antiplasticization of Thermoplastic Starch" Mar. 2012.
U.S. Appl. No. 16/391,909, filed Apr. 23, 2019, LaPray.
"Background on Biodegradable Additives" BPI, Feb. 12, 2010.
"Case Study: Compostable vs Oxo Degradable" Natur Bag, Feb. 19, 2019.
"French Proposal for Law on Biodegradable Plastics" Oxo-Biodegradable Plastics Association, Revised Oct. 31, 2013.
Pearce "Biodegradable plastic bags carry more ecological harm than good" The Guardian, Jun. 18, 2009.
"Position Paper on Degradable Additives" SPI Bioplastics Division, issued Feb. 2016.
"Report from the Commission to the European Parliament and the Council on the Impact of the Use of Oxo-Degradable Plastic, Including Oxo-Degradable Plastic Carrier Bags, on the Environment" European Commission, Brussels, Jan. 16, 2018.
"The Flexible Packaging Association Position on Degradable Additives" FPA, Jun. 22, 2010.
"What Are Oxo-biodegradable Additives" MJS Packaging, May 8, 2014.
U.S. Appl. No. 15/691,588, May 10, 2019, Office Action.
U.S. Appl. No. 15/628,379, Oct. 3, 2018, Notice of Allowance.
U.S. Appl. No. 15/481,806, Oct. 12, 2018, Office Action.
U.S. Appl. No. 15/481,823, Oct. 12, 2018, Office Action.
Marianne Shirai "Thermoplastic starch/polyester films: Effects of extrusion process and poly(lactic acid) addition," Elsevier, Materials Science and Engineering, 2013, pp. 4112-4117.
Emmanuel Schwach "Starch-based biodegradable blends: morphology and interface properties," Polymer International, 2004, pp. 2115-2124.
Jie Ren "Preparation, characterization and properties of binary and ternary blends with thermoplastic starch, poly (lactic acid) and poly(butylene adipate-co-terephthalate)," Elsevier, Carbohydrate Polymers, 2008, pp. 576-582.
S.K. Nayak "Biodegradable PBAT/Starach Nanocomposites" Polymer-Plastics Technology and Engineering, 2010, pp. 1406-1418.
U.S. Appl. No. 15/481,806, Nov. 6, 2019, Final Office Action.
Ruchuan et al., "Study on Starch-Polyethylene Film", Journal of Tianjin University, No. 2, 1990, pp. 23-29.

Huagong et al., "Green Manufacturing Process of Fine Chemical Industry", 2006, Guangdong Science & Technology Press (National Outstanding Press).
U.S. Appl. No. 15/481,823, Jul. 12, 2019, Final Office Action.
U.S. Appl. No. 15/481,823, Dec. 9, 2019, Office Action.
U.S. Appl. No. 15/691,588, Dec. 9, 2019, Final Office Action.
U.S. Appl. No. 16/456,303, Apr. 9, 2020, Office Action.
"Environmentally Degradable Plastics," Leonardo Da Vinci Program, Contract No. 1/98/2/05261 /PI/11.1.1.b/CONT, 202 pages.
"Biodegradation of starch-polyethylene films in soil and by microbial cultures", Nov. 1997, Dave, et al. World Journal of Microbiology and Technology, 13, 655-68., World Journal of Microbiology and Technology, 655-668, 13.
Applicant's Transmittal Letter labeled Information Disclosure Statement Under 37 CFR 1.97 dated Sep. 26, 2018.
Arvanitoyannis et al., Biodegradable films made from low density polyethylene (LDPE), rice starch and potato starch for food packaging applications: Part 1, Carbohydrate Polymers, vol. 36, (1998), pp. 89-104.
Biodegradable Plastics Standard to Bust Landfill Waste, ENSO Plastic Blog, printed Feb. 20, 2019, 3 pages.
Campo, E. Alfredo, Polymeric Materials and Properties, Science Direct.
Cardia Biohybrid, Film Blowing/ Blow Moulding Resin, Sep. 8, 2017.
Cardia Bioplastics FAQ [online] [site accessed Oct. 23, 2018] URL: http://www.cardiabioplastics.com/our-business/faq.
Cardia Compostable B-F, Blown Film Resin, Biodegradable during Composting in Professionally Managed Facilities, CBP Technical Data Sheet, Nov. 3, 2017, 2 pages.
Chen et al., "Environmental Degradation of Starch/Poly(Lactic Acid) Composite in Seawater," Key and Open Laboratory of Marine and Estuarine Fisheries Ministry of Agriculture, East China Sea Fisheries Research Institute, Chinese Academy of Fishery Sciences, Polymers and Polymer Composites, vol. 19, No. 7, 2011, pp. 559-566.
Corn Starch/Fisher Scientific, 3 pages [online] [site accessed Sep. 18, 2020] url: https://www.fishersci.com/shop/products/corn-starch-2/S25580 (undated).
Droge et al, WO 2016/134994 Machine Translation, Sep. 1, 2016 (Year: 2016).
Final Office Action received for U.S. Appl. No. 15/481,823, dated Jul. 20, 2020.
Final Office Action received for U.S. Appl. No. 15/836,555, dated Feb. 7, 2020.
Fine Chemical Engineering Green Production Process, I st edition, edited by Qihuang Song, Guangdong Science & Technology Press, published on Mar. 31, 2006, p. 174.
Meereboer et al., "Review of recent advances in the biodegradability of polyhydroxyalkanoate (PHA) bioplastics and their composites," Green Chem., vol. 22, 2020, pp. 5519-5558.
Ming et al, CN107793619 Machine Translation, Mar. 13, 2018 (Year: 2018).
Nayak, "Biodegradable PBAT/Starch Nanocomposites", Nov. 24, 2010, Polymer-Plastics Technology and Engineering, 49:14, pp. 1406-1418, accessed on Feb. 24, 2013.
Nguyen et al., "Biodegradability of polymer film based on low density polyethylene and cassava starch," International Biodeterioration & Biodegradation, vol. 115, 2016, pp. 257-265.
Notice of Allowance received for U.S. Appl. No. 16/456,303, dated Jul. 1, 2020.
Notice of Allowance received for U.S. Appl. No. 16/456,303, dated Jul. 28, 2020.
Office action for U.S. Appl. No. 14/853,725, dated Apr. 30, 2018, LaPray et al., "Articles Formed with Biodegradable Materials and Strength Characteristics of Same", 19 pages.
Office Action received for U.S. Appl. No. 15/836,555, dated Aug. 12, 2019.
Office Action received for U.S. Appl. No. 15/481,806, dated Jul. 29, 2020.
Office Action received for U.S. Appl. No. 16/287,884, dated Jul. 30, 2020.

(56) References Cited

OTHER PUBLICATIONS

Office Action received for U.S. Appl. No. 16/456,295, dated Jul. 22, 2020.
Ojeda, et al., "Degradability of linear polyolefins under natural weathering, Polymer Degradation and Stability," 2011, pp. 703-707.
Requirement for Restriction/Election received for U.S. Appl. No. 16/391,909, dated Sep. 8, 2020.
Sashiwa et al., "Microbial Degradation Behavior in Seawater of Polyester Blends Containing Poly(3-hydroxybutyrate-co-3-hydroxyhexanoate) (PHBHHx)," Mar. Drugs, vol. 16, 2018, 34, 11 pages.
Schwach et al., "Starch-based biodegradable blends: morphology and interface properties", 2004, Polymer International, vol. 53, pp. 2115-2124, DOI: 10.1002/pi.1636.
Shahin, "In-situ Nano Fibrillation of Polyethylene Terephthalate (PET) in Polypropylene (PP) through Spunbond Process," Department of Mechanical and Industrial Engineering, 2019, 89 pages.
U.S. Appl. No. 15/481,823, filed Apr. 7, 2017, LaPray.
U.S. Application Filed on Apr. 7, 2017, by LaPray, U.S. Appl. No. 15/481,806.
U.S. Application Filed on Aug. 21, 2020, by LaPray, U.S. Appl. No. 16/999,542.
U.S. Application Filed on Aug. 30, 2017, by LaPray., U.S. Appl. No. 15/691,588.
U.S. Application Filed on Jun. 20, 2017, by LaPray, U.S. Appl. No. 15/628,379.
U.S. Patent Application filed on Jul. 10, 2020 by LaPray, U.S. Appl. No. 16/925,705.
U.S. Patent Application filed on Jul. 10, 2020 by LaPray, U.S. Appl. No. 16/925,747.
U.S. Patent Application filed on Jul. 10, 2020 by LaPray, U.S. Appl. No. 16/925,952.
Vargha et al., "Behavior of Polyethylene Films in Soil, Periodica Polytechnica Chemical Engineering," DOI: 10.3311/PPch. 8281, Creative Commons Attribution, 2016, pp. 60-68.
Zhang et al., "Retrogradalion and Antiplasticization of Thermoplastic Starch," Richardson Centre for Functional Foods and Nutraceuticals, University of Manitoba, www.intechopen.com, 19 pages.
Zhong et al., "Biodegradable polymers and green-based antimicrobial packaging materials: A mini-review," Advanced Industrial and Engineering Polymer Research, vol. 3, 2020, pp. 27-35.
Ahmed et al. "Biodegradation of plastics: current scenario and future prospects for environmental safety." Environmental Science and Pollution Research 25.8 7287-7298. p. 7 col. 1 paragraph 2; Table 1; and Figure 1.
International Search Report issued in PCT Application PCT/US2019/28733.
English Abstract of BY 21006 C1. Apr. 2017.
Gilfillan, "Developing Starch-Based Polymer Composites", Doctor of Philosophy, 2015, pp. 1-128.
IDS Statement filed Aug. 21, 2020 in U.S. Appl. No. 16/999,542.
Machine translation of JP-2008013602-A (Year: 2008).
Non-Final Office Action received for U.S. Appl. No. 16/391,909, dated Dec. 1, 2020, 10 pages.
Notice of Allowance received for U.S. Appl. No. 15/481,806, dated Jan. 7, 2021, 11 pages.
Notice of Allowance received for U.S. Appl. No. 15/481,823, dated Dec. 9, 2020, 9 pages.
Notice of Allowance received for U.S. Appl. No. 15/481,823, dated Jan. 8, 2021, 2 pages.
Notice of Allowance received for U.S. Appl. No. 16/456,295, dated Dec. 15, 2020, 3 pages.
Notice of Allowance received for U.S. Appl. No. 16/456,295, dated Nov. 19, 2020, 11 pages.
Office Action received for U.S. Appl. No. 16/391,909, dated Dec. 1, 2020.
Non-Final Office Action received for U.S. Appl. No. 16/425,397, dated Feb. 5, 2021, 13 pages.
Notice of Allowance received for U.S. Appl. No. 15/691,588, dated Feb. 24, 2021, 11 pages.
Gadhave et al., Starch Based Bio-Plastics: The Future of Sustainable Packaging, Open Journal of Polymer Chemistry, 2018, vol. 8, pp. 21-33.
Non-Final Office Action received for U.S. Appl. No. 15/691,588, dated Sep. 24, 2020, 10 pages.
Yu et al., "Morphology and Mechanical Properties of Immiscible Polyethylene/Polyamide12 Blends Prepared by High Shear Processing," Chinese Journal of Polymer Science, 2017, 35(9):1132-1142.

\* cited by examiner

ARTICLES FORMED WITH RENEWABLE AND/OR SUSTAINABLE GREEN PLASTIC MATERIAL AND CARBOHYDRATE-BASED POLYMERIC MATERIALS LENDING INCREASED STRENGTH AND/OR BIODEGRADABILITY

CROSS-REFERENCE TO RELATED APPLICATIONS

This application claims the benefit of U.S. Provisional Application No. 62/483,219 filed Apr. 7, 2017. This application is also a continuation in part of U.S. application Ser. No. 14/853,725 filed on Sep. 14, 2015 which claims the benefit of U.S. Provisional Patent Application No. 62/187,231 filed on Jun. 30, 2015. This application is also a continuation in part of U.S. application Ser. No. 14/853,780 filed on Sep. 14, 2015, and a continuation in part of U.S. application Ser. No. 15/481,806 (21132.1) and Ser. No. 15/481,823 (21132.2), both filed on Apr. 7, 2017. This application is also a continuation in part of U.S. application Ser. No. 15/691,588 (21132.7) filed on Aug. 30, 2017. This application also claims the benefit of U.S. Provisional Patent Application No. 62/440,399 filed on Dec. 29, 2016, and U.S. Provisional Patent Application No. 62/442,432 filed on Jan. 4, 2017. The entire contents of each of the foregoing is incorporated by reference herein.

BACKGROUND

Traditional petrochemical-based plastics are formulated to be strong, lightweight, and durable. However, these plastics are not formed from renewable or sustainable resources (e.g., starting materials which can be renewed within about 100 years or less). The terms renewable and sustainable are used interchangeably herein. Rather, polyethylene (PE), polyethylene terephthalate (PET) and other typical plastics employed in large quantities in bottles, bags, and other packaging are made from petroleum product starting materials, which are not renewable or sustainable.

In an effort to increase sustainability, recently there have been some efforts to develop processes for making such plastic materials from renewable source materials, such as sugarcane, corn, or other plant products, which plant materials are sustainable. For example, such renewable materials may be used to produce ethanol, ethylene glycol, or other chemical building block materials than can be further reacted to produce monomers which can be polymerized. Such efforts have begun to show some promise in premium priced products where such "green" plastic resins may be blended with conventional petrochemical-based resins (e.g., to produce a bottle or other packaging in which a fraction (e.g., 30%) of the materials are sustainable. In fact, some products may now be made from 100% "green" plastic resins.

While blends of such "green" materials and conventional petro-chemical plastics have begun to become available, there are still practical difficulties in replacing the remaining conventional petro-chemical plastic materials with all sustainable materials, in terms of challenges in processing, cost, and other considerations.

In addition, even while reducing use of conventional non-sustainable plastic materials through substitution of some of the material with sustainable plastic materials, the resulting plastic packaging is still not biodegradable. For example, even a plastic package made from 100% "green" plastic or including a fraction of "green" PE or green "PET" is not biodegradable. Such lack of biodegradability presents an enormous continuing problem. For example, hundreds of millions of tons of non-biodegradable plastic sits in landfills or floats in the ocean, even if a portion of such plastic were sourced from sustainable materials. It would be a significant advance in the art if articles could be provided which were biodegradable. Increased strength would also be desirable. It would be a further advance if such an article were entirely formed from sustainable materials.

SUMMARY

This disclosure is directed to articles that are formed with renewable or sustainable "green" plastic materials and carbohydrate-based (e.g., starch-based) polymeric materials, which lend at least one of increased strength and/or biodegradability to the resulting blended material. For example, an embodiment is directed to an article comprising a carbohydrate-based (e.g., starch-based) polymeric material configured to provide other materials of the article with biodegrability, and a sustainable polymeric material sourced from sustainable plant sources (e.g., sugarcane, corn, or the like). In an embodiment, the sustainable polymeric material may be processed into a polymer that otherwise exhibits similar if not identical characteristics to a petro-chemical based polymer (e.g., it may be "green" polyethylene, "green" polypropylene, "green" polyethylene terephthalate (PET), or the like). Such a "green" polymer may have similar if not identical chemical and physical properties as compared to the same polymer (e.g., polyethylene) formed from a petro-chemical feedstock. The carbohydrate-based polymeric material may actually lend biodegradability characteristics to the sustainable polymeric material with which it is blended or otherwise formed, where such sustainable polymeric material may not otherwise exhibit such biodegradability characteristics (or such characteristics may be enhanced, if the sustainable polymeric material already did exhibit some biodegradability). For example, an amount of the article that biodegrades within 5 years under simulated landfill conditions (e.g., under any typical ASTM standard such as, but not limited to D-5511 and/or D-5526), simulated industrial compost conditions (such as ASTM D-5338), or simulated marine conditions (such as ASTM D-6691) is greater than the included amount of the carbohydrate-based polymeric material.

In other words, if the article is formed from a blend including 25% of the carbohydrate-based polymeric material, the amount of the article that biodegrades under such conditions is greater than 25% (i.e., some of the sustainable polymeric material is also degrading, even though such sustainable polymeric material may not degrade under similar conditions on its own).

Test results obtained by Applicant show that such degradation can occur relatively rapidly, e.g., sometimes within about 180 days (6 months), within about 1 year, within about 2 years, or within about 3 years.

In addition or alternative to biodegradability, such articles may exhibit increased strength as compared to otherwise similar articles, but formed within inclusion of the carbohydrate-based polymeric material. For example, an embodiment is directed to an article including one or more carbohydrate-based polymeric materials (e.g., such as those described above), and one or more sustainable polymeric materials sourced from sustainable plant sources, wherein a strength of the article is at least 5% greater than the article would have if made without the carbohydrate-based polymeric material. For example, the present inventors have discovered that inclusion of such a carbohydrate-based polymeric material in the article (e.g., as a blend of the two polymeric materials) can provide increased strength, as compared to what the sustainable polymeric material alone would provide.

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

I. Definitions

Figure 1:
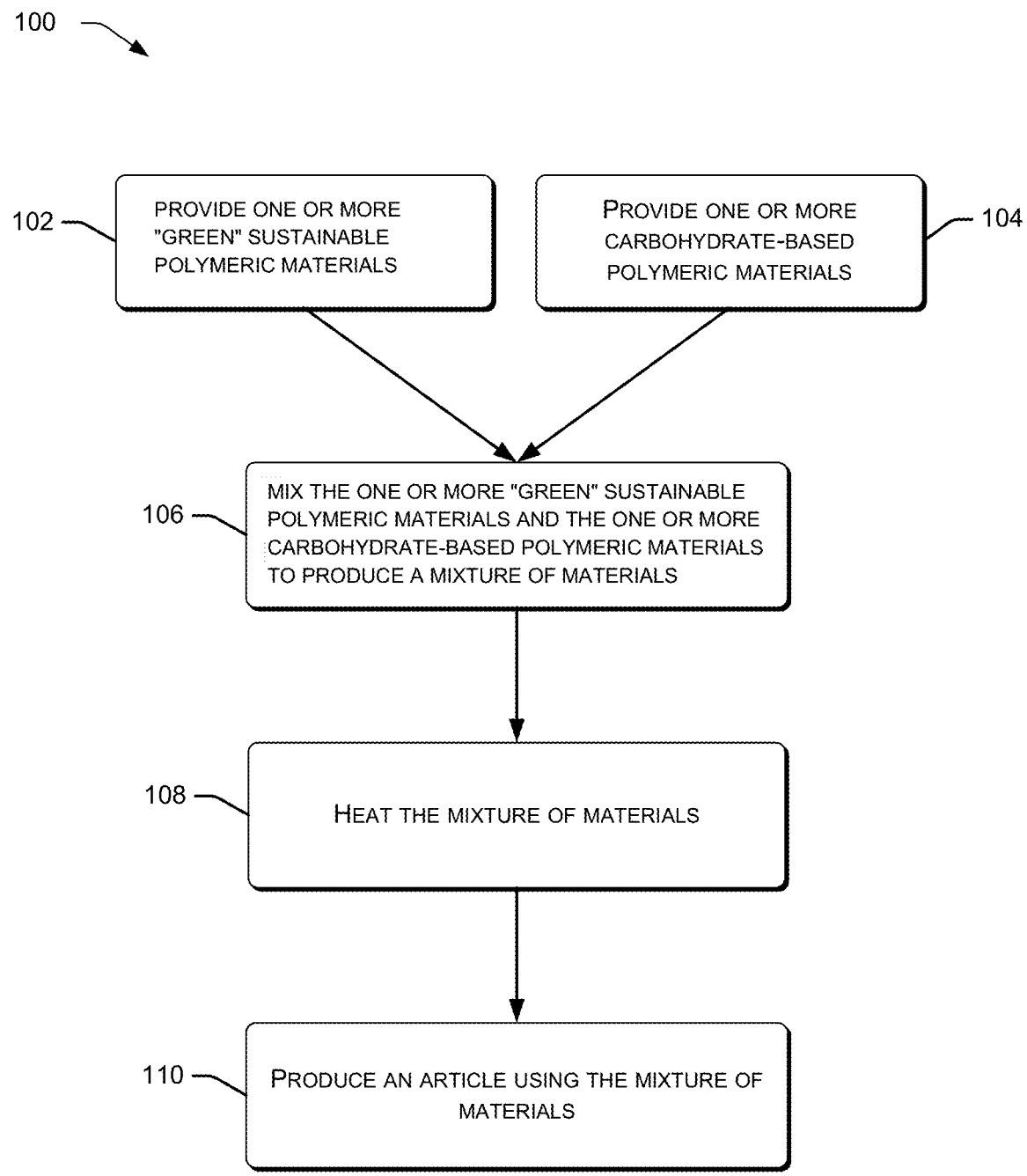
FIG. 1 illustrates a flow diagram of an example process of forming an article including biodegradable materials.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Film," as used herein, refers to a thin continuous article that includes one or more polymeric materials that can be used to separate areas or volumes, to hold items, to act as a barrier, and/or as a printable surface.

"Bag," as used herein, refers to a container made of a relatively thin, flexible film that can be used for containing and/or transporting goods.

"Bottle," as used herein, refers to a container that can be made from the presently disclosed plastics, typically of a thickness greater than a film, and which typically includes a relatively narrow neck adjacent an opening. Such bottles may be used to hold a wide variety of products (e.g., beverages, personal care products such as shampoo, conditioner, lotion, soap, cleaners, and the like).

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or value.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%.

II. Introduction

The present disclosure is directed to, among other things, articles that are formed from blends of polymeric materials, including a sustainable polymeric material formed from plant sources, as well as a carbohydrate-based (e.g., starch-based) polymeric material. A small amount of compatibilizer may also be present, such that all or substantially all of the polymeric content of the article can be formed from polymers sourced from plant sources. Such characteristic is particularly advantageous, from a sustainability perspective.

In addition to desirable sustainability characteristics, the carbohydrate-based polymeric material may be configured to provide the material with which it is blended (the "green" sustainable polymeric material, such as "green" PE (or biopolyethylene), "green" PP, or BioPET) with biodegradability. In other words, even where the "green" sustainable polymeric material is not alone itself biodegradable, its inclusion in the article which also includes the carbohydrate-based polymeric material can actually result in its becoming biodegradable. Such a result is also of great advantage.

In addition, many articles (e.g., particularly thin films) do not have particularly good strength when formed from conventional plastic materials (e.g., petrochemical-based polymeric materials), such that increased strength at a given thickness would be desirable. Because "green" plastic materials exhibit physical characteristics that are similar to their corresponding conventional petrochemical-based cousins, such "green" plastic materials also do not have particularly good strength, and a means for increasing strength, without increasing article thickness would be desirable. When blended with carbohydrate-based polymeric materials as described herein, such increased strength results are achieved. For example, while a polyethylene film (e.g., either biopolyethylene ("green" PE) or metallocene petrochemical-based PE) may have a dart impact strength of about 150 g for a 1 mil thick film, it would be advantageous if the strength could be increased, without increasing film thickness. The present embodiments can provide such increased strength. For example, upon blending with a carbohydrate-based polymeric material as described herein, strength may increase by at least 5%. Typical results of some embodiments may result in strength increases of 20% or even more.

The articles can be produced by mixing the carbohydrate-based polymeric material and the sustainable polymeric material, heating the mixture, and molding (e.g., injection molding) the mixture, extruding the mixture, blow molding the mixture, thermoforming the mixture, or the like. Various other plastic manufacturing processes will be apparent to those of skill in the art in light of the present disclosure.

The articles described herein can be produced in the form of any conceivable structure, including, but not limited to bottles, boxes, other containers, sheets, films, bags, and the like. Thin films for bags and film wraps (e.g., for wrapping around or over a product) can easily be made using blown film equipment.

Examples of suitable carbohydrate-based or starch-based polymeric materials for use in forming such articles are available from BiologiQ, under the tradename ESR ("Eco Starch Resin" or "Eco Sustainable Resin"). Specific examples include, but are not limited to GS-270, GS-300, and GS-330. Specific characteristics of such ESR materials will be described in further detail herein. Other carbohydrate-based or starch-based polymeric materials may also be suitable for use, such that ESR available from BiologiQ is merely a non-limiting example of a suitable carbohydrate-based or starch based polymeric material. Thermoplastic starch (TPS) materials available from other suppliers that may provide one or more desirable characteristics as described herein may alternatively or additionally be used.

III. Exemplary Articles and Methods

The techniques and processes described herein can be implemented in a number of ways. Example implementations are provided below with reference to the following figures.

FIG. 1 illustrates an exemplary process 100 for manufacturing an article according to the present invention. At 102, the process 100 can include providing one or more sustainable polymeric materials (e.g., biopolyethylene ("green" PE), "green" PP, bioPET or the like). At 104, the process 100 can include providing one or more carbohydrate-based polymeric materials. In some cases, the one or more carbohydrate-based polymeric materials can include one or more starch-based polymeric materials. The one or more carbohydrate-based polymeric materials and the one or more sustainable polymeric materials can be provided in any particular form, such as pellets, powders, nurdles, slurry, and/or liquids. In some embodiments, pellets can be used.

In addition, providing the one or more sustainable polymeric materials and the one or more carbohydrate-based polymeric materials can include feeding the one or more sustainable polymeric materials and the one or more carbohydrate-based polymeric materials into an extruder. For example, the polymeric materials can be fed into one or more hoppers of an extruder. The polymeric materials can be fed into the extruder into the same chamber, into different chambers, at approximately the same time (e.g., through the same hopper), or at different times (e.g., through different hoppers, one being introduced into the extruder earlier on along the screw than the other). It will be apparent that many various possibilities may be suitable.

In some cases, the sustainable polymeric material can include a polyolefin. For example, the sustainable polymeric materials can include, but are not limited to, a "green" polyethylene (bioPE), a "green" polypropylene (bioPP), a bioPET, or other plastic material that can be formed from sustainable plant sources. By way of non-limiting example, "green" PE can be derived from ethanol that may be formed from sugarcane, other sugar crops (e.g., sugar beets) or a grain (e.g., corn, wheat, or the like). "Green" PE (also sometimes referred to as "bioPE" has a similar chemical structure as PE formed from a petrochemical feedstock, but in which the ethanol, or the ethylene monomer used in polymerization is derived from sustainable sources, rather than a petrochemical feedstock. "Green" PP could similarly be formed from propylene that may be derived from propanol (or perhaps isopropanol) derived from sugarcane, other sugar crops, or grains (e.g., corn). Another example of a "green" sustainable polymeric material is bioPET, e.g., where the monomers used in forming the poly(ethylene terephthalate) (e.g., typically ethylene glycol and terephthalic acid) may similarly be derived from plant sources such as sugarcane, other sugar crops, or grains. PET is the most common thermoplastic resin of the polyester family. Another polyester that could similarly be formed from sustainable plant sources is polybutyrate adipate terephthalate (bioPBAT). PBAT can be formed as a copolyester of adipic acid, 1,4 butanediol and dimethyl terephthalate. One or more of such starting materials can be derived from sustainable plant sources. Another possible "green" polymeric resin material that may be used is poly(lactic acid). PLA is typically produced from monomers of lactic acid and/or lactide esters, as will be appreciated by those of skill in the art. One or more starting materials for PLA production could be derived from sustainable plant sources. Other possible "green polymers that will be familiar to those of skill in the art that could be used include PBS (polybutylene succinate) or PCL (polycaprolactone). Those of skill in the art will be familiar with processes for synthesizing such polymers. One or more of the components used for manufacture of such polymers could be derived from a suitable renewable plant or other renewable biological source (e.g., bacterial generation). "Green" PE is available from Braskem, bioPET is available from and used in Coca Cola™'s Plant Bottle and likely from other plastics manufacturers as well. While PE, PP, PET and PBAT are examples of "green" bioplastics that may be formed from materials derived from sustainable plant sources, it will be appreciated that numerous other "green" plastics may also be suitable for use, so long as they can be formed at least in part from sustainable materials (e.g., plant sources). In addition, while sugarcane, other sugar crops, corn, wheat and other grains may be exemplary nonlimiting examples of plant materials from which such "green" polymeric materials can be derived, it will be appreciated that numerous other plants and materials may also suitably be used.

The carbohydrate-based polymeric materials can be formed from a plurality of materials (e.g., a mixture) including one or more starches. For example, the one or more starches can be produced from one or more plants, such as corn starch, tapioca starch, cassava starch, wheat starch, potato starch, rice starch, sorghum starch, and the like. In some embodiments, a mixture of different types of starches may be used, which Applicant has found to result in a synergistic increase in strength. A plasticizer is also present within the mixture of components from which the carbohydrate-based polymeric materials are formed. Water may also be used in forming the carbohydrate-based polymeric material, although only a small to negligible amount of water is present in the finished carbohydrate-based polymeric material.

It will be appreciated that in some embodiments then, the entire polymeric content (or substantially the entire polymeric content) of the article may be derived from plant materials. While the "green" polymeric material typically employs polymerizable monomers or other small molecule polymerizable components that may be derived from ethanol (or the like) formed from a desired plant material, the carbohydrate-based (or starch-based) polymeric material may be formed from starch (and glycerin or another plasticizer), rather than processing such starch or other plant materials to form smaller polymerizable monomers. Thus, the molecular weight of the starch(es) used to make the starch-based polymeric material may typically be orders of magnitude greater than the molecular weight of the relatively small molecule monomers produced for use in making the "green" sustainable polymeric material. For example, the plant sourced monomers or other polymerizable components used in making the "green" sustainable polymeric material may typically be less than about 500 Daltons, less than 400 Daltons, less than 300 Daltons, less than 200 Daltons, or less than 100 Daltons, while the molecular weight of the starch(es) used in making the starch-based polymeric material may typically be significantly higher, often more than 500 Daltons, often measured in thousands, tens of thousands, or even higher (e.g., more than 500 Daltons, at least 1000 Daltons, at least 10,000 Daltons, at least 25,000 Daltons, at least 40,000 Daltons, or the like). In other words, the starch materials (e.g., native starches) used in forming the starch-based material are typically more complex molecules than the monomers or other polymerizable components used in making the "green" sustainable polymeric material. For example, corn starch may have a molecular weight of about 693 Daltons. Potato starch may have a molecular weight that may vary widely, e.g., from about 20,000 Daltons to about 400 million Daltons (e.g., amylose may range from about 20,000 Daltons to about 2 million Daltons, while amylopectin may range from about 65,000 Daltons to about 400 million Daltons). Tapioca starch may have a molecular weight ranging from about 40,000 Daltons to about 340,000 Daltons. The glycerin employed in forming the starch-based polymeric material may also be derived from sustainable sources. Glycerin of course has a molecular weight of 92 Daltons.

The one or more carbohydrate-based polymeric materials can be formed from mostly starch. For example, at least 65%, at least 70%, at least 75%, or at least 80% by weight of the carbohydrate-based polymeric material may be attributable to the one or more starches. In an embodiment, from 65% to 90% by weight of the finished carbohydrate-based polymeric material may be attributed to the one or more starches. Other than negligible water content, the balance of the finished carbohydrate-based polymeric material may be attributed to the plasticizer (e.g., glycerin). The percentages above may represent starch percentage relative to the starting materials from which the carbohydrate-based polymeric material is formed, or that fraction of the finished carbohydrate-based polymeric material that is derived from or attributable to the plasticizer (e.g., at least 65% of the carbohydrate based polymeric material may be attributed to (formed from) the starch(es) as a starting material). Although some water may be used in forming the carbohydrate-based polymeric material, substantially the balance of the carbohydrate-based polymeric material may be attributed to glycerin, or another plasticizer. Very little residual water (e.g., less than 2%, typically no more than about 1%) may be present in the finished carbohydrate-based polymeric material.

For example, the materials from which the one or more carbohydrate-based polymeric materials are formed can include at least 12%, at least 15%, at least 18%, at least 20%, at least 22%, no greater than 35%, no greater than 32%, no greater than 30%, no greater than 28%, or no greater than 25% by weight of a plasticizer. Such percentages may represent that fraction of the finished carbohydrate-based polymeric material that is derived from or attributable to the plasticizer (e.g., at least 12% of the carbohydrate based polymeric material may be attributed to (formed from) the plasticizer as a starting material).

Exemplary plasticizers include, but are not limited to glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, tearates, lactic acid esters, citric acid esters, adipic acid esters, stearic acid esters, oleic acid esters, other acid esters, or combinations thereof. Glyerin may be preferred.

The finished carbohydrate-based polymeric material may include no greater than 5%, no greater than 4%, no greater than 3%, no greater than 2%, no greater than 1.5%, no greater than 1.4%, no greater than 1.3%, no greater than 1.2%, no greater than 1.1%, or no greater than 1% by weight water. The ESR materials available from BiologiQ are examples of such finished carbohydrate-based polymeric materials, although it will be appreciated that other materials available elsewhere (e.g., at some future time) may also be suitable for use.

In some embodiments, mixtures of different starches may be used in forming the carbohydrate-based polymeric material. Use of such a mixture of different starches (e.g., coming from different plants) has been found to surprisingly be associated with a synergistic increase in strength in articles including such carbohydrate-based polymeric materials. In such a mixture of starches, a starch can be present in the mixture in an amount of at least 1%, at least 2%, at least 3%, at least 4%, at least 5%, at least 10%, at least 15%, at least 20%, at least 25%, at least 30%, at least 35%, at least 40%, no greater than 95%, no greater than 90%, no greater than 85%, no greater than 80%, no greater than 75%, no greater than 70%, no greater than 65%, no greater than 60%, no greater than 55%, no greater than 50%, or from 10% to 50% by weight relative to the combined weight of the plurality of starches. Some non-limiting exemplary mixtures may include 90% of a first starch, and 10% of a second starch, or 30% of a first starch and 70% of a second starch, or 50% of a first starch and 50% of a second starch. Mixtures of more than two starches (e.g., using 3 or 4 different starches) can also be used.

Examples of suitable carbohydrate-based (e.g., starch-based) polymeric materials for use in forming films and other articles are available from BiologiQ, located in Idaho Falls, Id., under the tradename ESR ("Eco Starch Resin"). Specific examples include, but are not limited to GS-270, GS-300, and GS-330. Additional details relative to fractions of starch and glycerin or other plasticizers used in forming ESR are described in Applicant's other patent applications, already incorporated herein by reference. ESR may be provided in pellet form. Physical characteristics for GS-270 and GS-300 are shown in Table 1 below.

TABLE 1

| PROPERTY | TEST METHOD | GS-270 NOMINAL VALUE | GS-300 NOMINAL VALUE |
| --- | --- | --- | --- |
| Density | ASTM D-792 | 1.40 g/cm³ | 1.42 g/cm³ |
| THERMAL PROPERTIES | | | |
| Melt Flow Index 200° C./5 kg | ASTM D-1238 | 1.98 g/10 min | 1.95 g/10 min |
| Melting Temp. Range | ASTM D-3418 | 166-180° C. | 166-180° C. |
| Glass Transition Temp. | ASTM D-3418 | 81-100° C. | 81-100° C. |
| MECHANICAL PROPERTIES | | | |
| Tensile Strength @ Yield | ASTM D-638 | >30 MPa | >14 MPa |
| Tensile Strength @ Break | ASTM D-638 | >30 MPa | >14 MPa |
| Young's Modulus | ASTM D-638 | 1.5 GPa | 1.5 GPa |
| Elongation at Break | ASTM D-638 | <10% | <10% |
| Impact Resistance (Dart) | ASTM D-5628 | 3.5 kg | 4.5 kg |
| ADDITIONAL PROPERTIES | | | |
| Water Content | ASTM D-6980 | ≤1.5%, or ≤1% | ≤1.5%, or ≤1% |

The above characteristics shown for GS-270 and GS-300 are exemplary of other ESR products available from BiologiQ, although values may vary somewhat. For example, ESR products from BiologiQ may generally have a glass transition temperature ranging from about 70° C. to about 100° C. Those of skill in the art will appreciate that glass transition temperature can be indicative of degree of crystallinity. Values for melting temperature range, density, Young's Modulus, and water content may be identical or similar to those shown above in Table 1. Some characteristics may similarly vary somewhat (e.g., ±25%, or ±10%) from values shown for GS-270 and GS-300. ESR has an amorphous structure (e.g., more amorphous than typical raw starch). For example, typical raw starch powder has a mostly crystalline structure (e.g., greater than 50%), while ESR has a mostly amorphous structure (e.g., less than 10% crystalline).

ESR has a low water content, as described. As ESR absorbs moisture, it exhibits plastic behavior and becomes flexible. When removed from a humid environment, the material dries out and becomes stiff again (e.g., again exhibiting less than about 1% water content). The moisture present in ESR (e.g., in pellet form) may be released in the form of steam during processing such as that shown in FIG. 1. As a result, films or other articles produced from a starch-based polymeric material such as ESR blended with a sustainable polymeric material may exhibit even lower water content, as the sustainable polymeric material typically will include no or negligible water, and the water in the ESR may typically be released during manufacture of a desired article.

Such low water content in the carbohydrate-based polymeric material can be important, as significant water content can result in incompatibility with the sustainable polymeric material, particularly if the article requires formation of a thin film. For example, as the water vaporizes, this can result in voids within the film or other article, as well as other problems. When blowing a thin film, the carbohydrate-based polymeric material used may preferably include no more than about 1% water.

Low water content is not achieved in the ESR material through esterification, as is common in some conventional TPS materials that may include relatively low water content. Such esterification can be expensive and complex to perform. Furthermore, the ESR materials that are exemplary of the carbohydrate-based polymeric materials employable herein also typically do not themselves actually include any identifiable starch, or identifiable glycerin, as such, as the starting materials of the ESR or other carbohydrate-based polymeric material have been chemically reacted and/or altered. X-ray diffraction patterns of exemplary carbohydrate-based polymeric materials as described below (e.g., and shown in FIG. 4) evidence such chemical alteration, showing that the finished polymeric material may be substantially devoid of starch in such identifiable, native form. In other words, the carbohydrate-based polymeric material is not simply recognized as a mixture including starch and glycerin. The low water content achievable in the carbohydrate-based polymeric material is believed to be due at least in part to the chemical alteration of the starch and plasticizer materials into a thermoplastic polymer, which does not retain water as would native starch, or conventional thermoplastic starches.

Returning to FIG. 1, processing at relatively high temperatures may result in some release of volatized glycerin (e.g., visible as smoke). If needed (e.g., where stored pellets may have absorbed additional water), drying of pellets can be performed by simply introducing warm dry air, e.g., at 60° C. for 1-4 hours, which is sufficient to drive off any absorbed water. Pellets should be dried to less than about 1% moisture content prior to processing, particularly if forming a film. ESR pellets may simply be stored in a sealed container with a desiccant in a dry location, away from heat to minimize water absorption, and to prevent undesired degradation.

In addition to ESR being thermoplastic, the ESR may also be thixotropic, meaning that the material is solid at ambient temperature, but flows as a liquid when heat, pressure and/or frictional movement are applied. Advantageously, pellets of ESR can be used the same as petrochemical based pellets (or "green" plastic pellets) in standard plastic production processes. ESR materials and products made therefrom may exhibit gas barrier characteristics. Products (e.g., films) made using such ESR pellets exhibit oxygen gas barrier characteristics (e.g., see Example 5 for specific exemplary results). ESR materials may be non-toxic and edible, made using raw materials that are all edible. ESR and products made therefrom may be water resistant, but water soluble. For example, ESR may resist swelling under moist heated conditions to the point that pellets (e.g. with a size of 3-4 mm) thereof may not completely dissolve in boiling water within 5 minutes, but a pellet will dissolve in the mouth within about 10 minutes. ESR may be stable, in that it may not exhibit any significant retrogradation, even if left in relatively high humidity conditions, which characteristic differs from many other thermoplastic starch materials. Of course, products made with ESR may also exhibit such characteristics. If ESR is stored in humid conditions, the excess absorbed water can simply be evaporated away, and once the water content is no more than about 1%, it can be used in forming a film or other article.

The ESR material also does not typically undergo biodegradation under typical storage conditions, even in relatively humid conditions, as the other conditions typical of a landfill, compost or similar disposal environment containing the particular needed microorganisms are not present. Of course, where such conditions are present, not only does the ESR biodegrade, but otherwise non-biodegradable sustainable polymeric materials blended therewith surprisingly also biodegrade.

ESR can be cost competitive, being manufactured at a cost that is competitive with traditional polyethylene plastic resins. ESR can be mixed with other (e.g., "green" or even petrochemical-based) polymers, including, but not limited to PE, PP, PET, PBAT, PLA, or others. In some embodiments, the ESR could be provided in a masterbatch formulation that may include the starch-based polymeric material as described above, and an amount of one or more compatibilizers. The masterbatch may also include one or more "green" polymeric materials, and/or even one or more petrochemical-based polymeric materials, if such were desired. Such masterbatch formulation pellets could be mixed with pellets of the "green" sustainable polymeric material at the time of processing. Any conceivable ratios may be used in mixing such different pellets, depending on the desired percentage of ESR and/or compatibilizer and/or "green" sustainable polymeric material in the finished article.

ESR includes very low water content. For example, although raw starch (e.g., used in forming ESR) may typically include about 13% water by weight, the finished ESR pellets available from BiologiQ include less than about 1% water. ESR materials are biodegradable, and as described herein, not only is the starch-based ESR material biodegradable, but when blended with other polymers, such as "green" polyethylene, bioPET, bioPBAT, or the like, which may not be biodegradable, the blended material becomes substantially entirely biodegradable. Such results are quite surprising, and particularly advantageous. The Examples herein evidence such surprising results. Applicant is not aware of any typical thermoplastic starch materials that claim to, or are capable of providing such characteristics when blended with other polymers.

The ESR material may exhibit some elasticity, although its elasticity may be less than many other polymers (e.g., particularly "green" sustainable polymers that mimic their petrochemical-based polymer cousins). Films and other articles may be formed from blends of ESR and any desired "green" sustainable polymer(s), providing elasticity results exhibiting increased strength, at a given article thickness. While films are described and often used in the Examples herein, where strength is often of critical importance, it will be apparent that increased strength can also be provided in articles other than films (e.g., bottles, sheets, boxes, or other forms). Table 2 below shows elongation at break and elastic modulus values for various standard plastic ("SP") materials, various "environmentally-friendly" plastic materials, and ESR, for comparison. By "environmentally friendly", the material may have one or more environmentally desirable characteristics, such as its being at least partially derived from a sustainable material, being compostable, and/or being biodegradable. The ESR in Table 2 had a tensile strength of 40 MPa.

TABLE 2

| MATERIAL | ENVIRONMENTALLY FRIENDLY OR STANDARD PLASTIC | ELONGATION AT BREAK | ELASTIC MODULUS |
|---|---|---|---|
| EcoFlex C1200 | EP | 700% | 0.10 GPa |
| ESR | EP | 100% | 1.5 GPa |
| HDPE | SP | 650% | 0.80 GPa |
| LDPE | SP | 550% | 0.40 GPa |
| PBS | EP | 450% | 0.50 GPa |
| PCL | EP | 600% | 0.20 GPa |
| PHA | EP | 300% | 3.40 GPa |
| PLA | EP | 150% | 3.50 GPa |
| PET | SP | 200% | 2.50 GPa |
| PP | SP | 500% | 1.75 GPa |
| ABS | SP | 25% | 2.00 GPa |
| Nylon | SP | 100% | 3.00 GPa |

Figure 3:
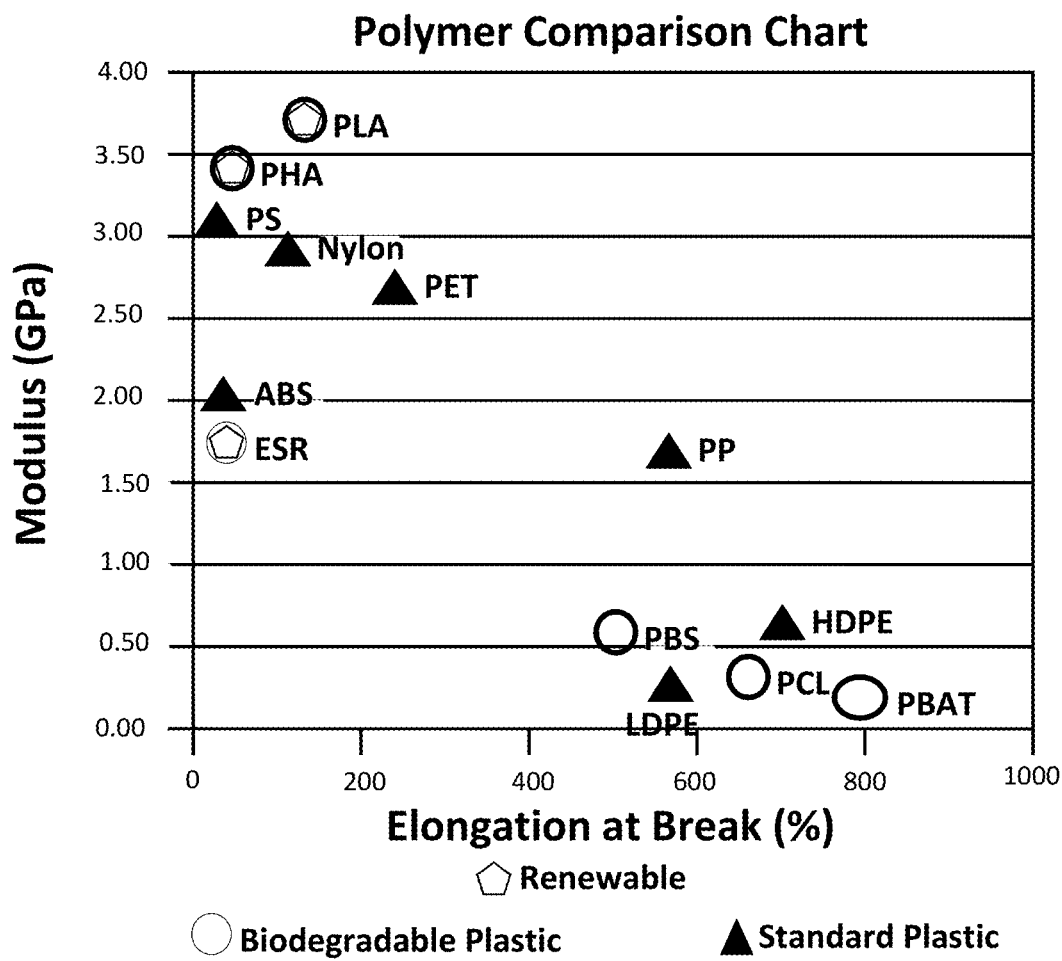
FIG. 3 shows elastic modulus and elongation at break data for various petrochemical plastics that are typically neither biodegradable nor compostable (labeled standard plastics) as well as various plastics that are more "environmentally friendly" in one or more aspects.

FIG. 3 shows similar data as in Table 2, in chart form. Of course, some of the products listed in the table and shown in FIG. 3 that are listed as standard plastics have "green" cousins that can be derived from sustainable sources, such as, but not limited to, BioPET, "green" PP, "green" PE, and bioPBAT. PLA is compostable, meaning that it can degrade under elevated temperature conditions (i.e., composting conditions), but is technically not "biodegradable". The other exemplary materials listed above such as EcoFlex, PBS, PCL, PHA may be both biodegradable and compostable. FTC Green guidelines stipulate that a plastic cannot make an unqualified claim that it is "degradable" unless it will degrade within a "reasonably short period of time" (most recently defined as within 5 years) "after customary disposal".

The ESR materials described as suitable for use herein as the carbohydrate-based (e.g., starch-based) polymeric material are substantially amorphous. For example, raw starch powder (e.g., such as is used in making ESR and various other thermoplastic starch materials) has approximately a 50% crystalline structure. ESR materials available from BiologiQ differ from many other commercially available thermoplastic starch (TPS) materials in crystallinity versus amorphous characteristics. For example, p. 62-63 of "Thermoplastic Starch Composites and Blends" a PhD thesis by Kris Frost (September 2010) states "[o]f particular interest in TPS is completeness of gelatinisation during processing, and any subsequent tendency toward retrogradation to form V-type amylose crystals". Frost further continues "[g]elatinisation involves loss of granular and crystalline structures by heating with water and often including other plasticizers or modifying polymers. Retrogradation is due to the re-coiling of amylose helical coils. Starch molecules disrupted during gelatinisation slowly re-coil into their native helical arrangements or new single helical conformations known as V type, causing TPS films to rapidly become brittle and lose optical clarity". Thus, conventional TPS tends to re-form a crystalline structure after the gelatinization process used to produce the TPS from raw starch. On the contrary, the ESR material available from BiologiQ does not re-form a crystalline structure and does not become brittle. It remains flexible. In addition, it can maintain a stable, high degree of optical clarity, so as to be useful in forming relatively optically clear films (e.g., particularly by sandwiching ESR between polyethylene or other polyolefin layers).

Figure 4:
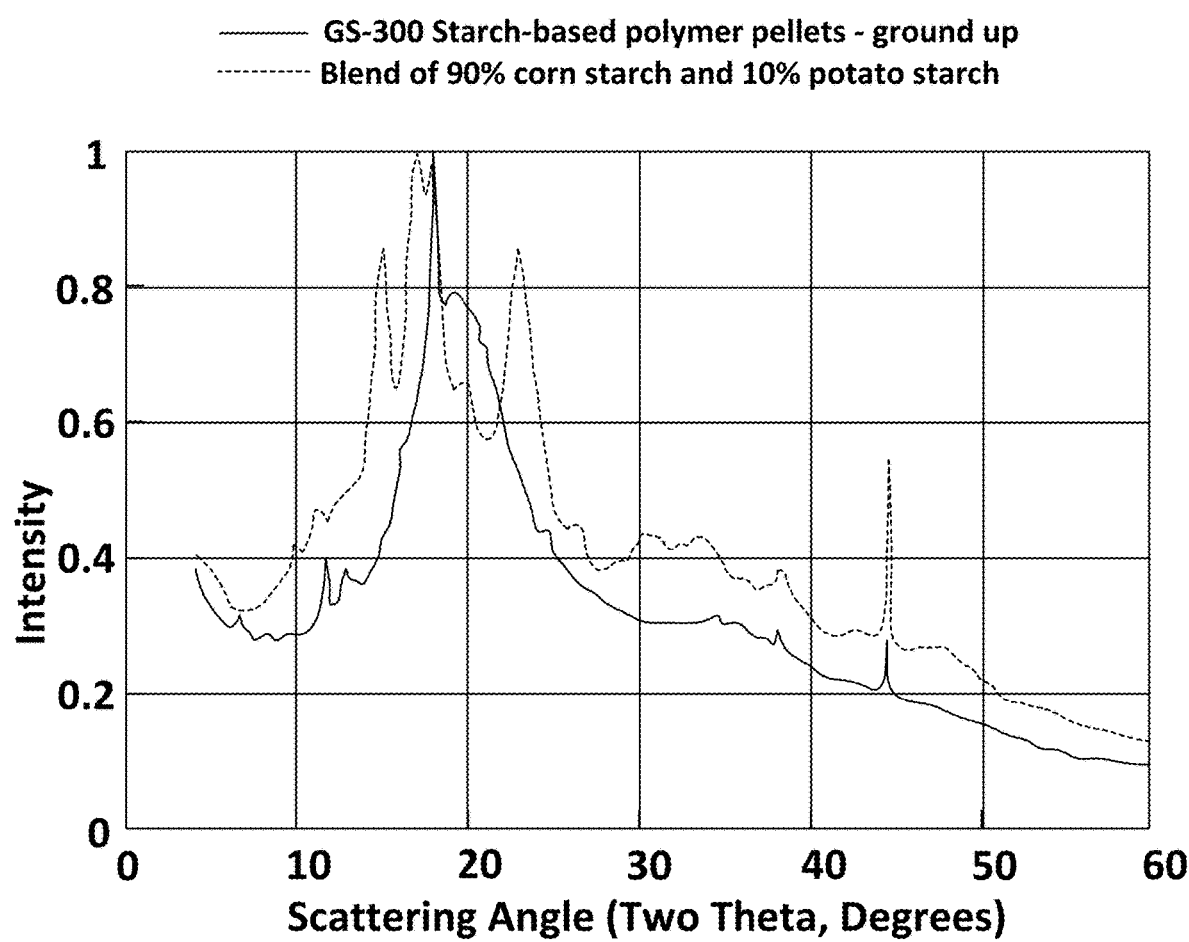
FIG. 4 shows X-ray diffraction patterns for an exemplary "ESR" carbohydrate-based polymeric material commercially available from BiologiQ as compared to that of the blend of native corn starch and native potato starch used to form the ESR.

In contrast to typical TPS materials, the ESR materials that are suitable examples of starch-based polymeric materials for use in forming articles described in the present application have an amorphous microstructure, and physical characteristics as shown in Table 1. The difference in the molecular structure between conventional TPS and ESR materials is evidenced by the ESR materials as described herein being much less crystalline than conventional thermoplastic starch-based materials as shown by X-ray diffraction, shown in FIG. 4, comparing FTIR diffraction pattern results for ESR material available from BiologiQ (sample 1) as compared to a blend of native raw corn starch and native raw potato starch, from which the ESR in FIG. 4 was formed. The diffraction pattern of the ESR as seen in FIG. 4 is much less crystalline (e.g., crystallinity of less than about 10%) than that of the native starch blend (crystallinity of about 50%). The difference in diffraction pattern evidences that a substantial chemical change has occurred in the material, due to processing from the native starches into ESR. For example, while there is a prominent diffraction peak between 20-25° with the native starch, no such peak is exhibited in the ESR. The native starch further shows a strong peak at about 45° (at an intensity of 0.5 to 0.6), which peak is greatly reduced in the ESR (only of about 0.25 to 0.3). Across nearly the entire spectrum, the diffraction intensities are higher for the native starches than for the ESR, with the exception of from about 18° to about 22°, as shown. The elevated diffraction intensity seen across a wide spectrum is indicative of greater crystallinity of the native starches as compared to the ESR. Numerous other differences also exist, as shown.

By way of example, the carbohydrate-based (e.g., starch-based) polymeric material used in making films according to the present disclosure may have a crystallinity of less than about 40%, less than about 35%, less than about 30%, less than about 25%, less than about 20%, less than about 15%, less than about 10%, less than about 8%, less than about 6%, less than about 5%, or less than about 3%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

In addition to the differences in the microstructure of the finished ESR as compared to the starting materials, films, bottles, sheets, disposable utensils, plates, cups, or other articles produced from a blend including the starch-based polymeric material are different from articles that are otherwise similar, but formed using conventional TPS and starch powder, or "green" sustainable polymeric materials alone. For example, articles formed by blending the starch-based polymeric materials such as ESR as described herein with a sustainable polymeric material do not have "sea-island" features that are common when blending conventional TPS materials with polymeric materials such as polyethylene. Properties of the different films can be seen by comparing the physical properties of films as shown in Table 11 of Example 5 below. In particular, Table 11 compares the physical properties of films made by blending starch-based polymeric materials as contemplated herein with polyethylene versus a conventional TPS blended with PE (Cardia BL-F). In addition to the differences in properties seen in Table 11, films based on conventional TPS materials such as Cardia BL-F, even if they were to incorporate a "green" sustainable polymeric material in place of the PE are not biodegradable, and not compostable. As described herein, use of the carbohydrate or starch-based polymeric materials as described herein in forming an article with a sustainable polymeric material results in not just the carbohydrate-based or starch-based material being biodegradable, but at least a portion of the sustainable polymeric material becoming biodegradable (even where the sustainable polymeric material alone may not be biodegradable). Such results do not occur when blending with typical TPS materials. Such differences in biodegradability clearly illustrate that there are significant structural differences in the resulting films and other articles, as the entire composite structure (i.e., the film or other structure) may be capable of being biodegraded, as shown by the various examples below.

Without being bound to any particular theory, it is believed that the carbohydrate-based polymeric resins may reduce the crystallinity of the blended products, interrupting the crystallinity and/or hygoscopic barrier characteristics of the biopolyethylene or other sustainable plastic material in a way that allows water and bacteria to degrade the arrangements and linkages of otherwise non-biodegradable plastic molecules of the blend along with the carbohydrate-based polymeric resin material, where the sustainable "green" polymer originally had such characteristics. In other words, the long polymer chains of biopolyethylene or other non-biodegradable sustainable plastic material are more easily broken by chemical and mechanical forces that exist in environments that are rich in bacteria and microorganisms, when blended with carbohydrate-based polymeric materials as contemplated herein. Subsequently, the microorganisms that exist naturally in a disposal environment (e.g., in a landfill) can consume the remaining smaller molecules so that they are converted back into natural components (such as $CO_2$, $CH_4$, and $H_2O$).

For example, truly biodegradable plastics decompose into natural elements or compounds such as carbon dioxide, methane, water, inorganic compounds, or biomass via microbial assimilation (e.g., the enzymatic action of microorganisms on the plastic molecules). Biodegradation of plastics can be enabled by first breaking down the polymer chains via either chemical or mechanical action but may only be fully accomplished through decomposition of the molecules by microbial assimilation.

Plastics made from petrochemical feedstocks or derived from plant sources begin life as monomers (e.g., single small molecules that can react chemically with other small molecules). When monomers are joined together, they become polymers ("many parts"), known as plastics. Before being joined together, many monomers are readily biodegradable, although after being linked together through polymerization, the molecules become so large and joined in such arrangements and linkages that microbial assimilation by microorganisms is not practical within any reasonable time frame.

Polymers are formed with both crystalline (regularly packed) structures and amorphous (randomly arranged) structures. Many polymers contain a high degree of crystallinity with some amorphous regions randomly arranged and entangled throughout the polymeric structure.

ESR materials available from BiologiQ are formed from starting starch materials which are highly crystalline, but in which the finished ESR plastic resin material exhibits low crystallinity (substantially amorphous). Such starch-based polymer materials are used as a starting material in the production of articles as described herein. ESR is, therefore, plastic that is made from starch. Because of its natural, starch-based origin and carefully controlled linkage types, the molecules (size and links) of plastic made with ESR are highly susceptible to biodegradation by enzymatic reactions caused from the introduction of humidity (water) and bacteria or other microorganisms, as evidenced by the experimental test results included herein.

Polyolefins such as rigid forms of polyethylene and polypropylene have a high degree of crystallinity and are made by converting monomer molecules (whether petroleum derived or derived from ethanol or other small building block molecules derived from plant sources) into long chain polymers. The bonds created when connecting the monomers to form long polymer chains are strong and difficult to break. Films and other articles formed from such polymeric materials (whether petrochemical-based or sustainable are often not biodegradable (e.g., at least in the case of "green" PE, "green" PP, and bioPET). Even if a given article were formed from a blend of such "green" sustainable polymeric materials and TPS, it would not normally suddenly acquire biodegradability characteristics (other than the starch portion of the blend which may sometimes biodegrade).

Applicant has developed a process for making articles from a blend of a starch-based polymeric material having low crystallinity with polyolefin-based or other polymeric materials, such as polyethylene, that have a relatively high crystallinity. The resulting thermoplastic blend has a higher elastic modulus (stiffness, or strength) than polyethylene or other plastic and can be used to make plastic films or other articles that are stronger than the same articles made with pure polyethylene or other pure plastic. For example, Table 11 of Example 5 shows physical properties of films produced with a blend of PE and a starch-based polymeric material (such as ESR) as compared to a 100% polyethylene film and as compared to a film formed from a blend of a conventional TPS and polyethylene (i.e., Cardia BL-F). Results from third party testing detailed in the Examples provide evidence that films according to the present invention will exhibit biodegradation of not just the renewable content (i.e., the ESR), but any petrochemical-based or the "green" sustainable polymeric material as well. Such results are particularly surprising, unexpected, and advantageous.

Returning to FIG. 1, at 106, the process 100 includes mixing the one or more sustainable polymeric materials and the one or more carbohydrate-based polymeric materials to produce a mixture of materials. In some cases, the mixing of the one or more sustainable polymeric materials and the one or more carbohydrate-based materials can be performed using one or more mixing devices. In a particular implementation, a mechanical mixing device can be used to mix the one or more sustainable polymeric materials and the one or more carbohydrate-based polymeric materials. In an implementation, at least a portion of the components of the mixture of the materials can be combined in an apparatus, such as an extruder, an injection molding machine, or the like. In other implementations, at least a portion of the components of the mixture of the materials can be combined before being fed into the apparatus.

The one or more carbohydrate-based polymeric materials can be present in the mixture of materials an amount of at least 1%, at least 2%, at least 3%, at least 4%, at least 5%, at least 10%, at least 15%, at least 20%, at least 25%, at least 30%, at least 35%, at least 40%, at least 45%, no greater than 99%, no greater than 95%, no greater than 90%, no greater than 80%, no greater than 70%, no greater than 60%, no greater than 50%, from 2% to 98%, from 20% to 40%, from 10% to 40%, from 20% to 30%, from 50% to 80%, or from 40% to 60% by weight of the mixture of materials. More than one carbohydrate-based polymeric material may be used, if desired.

The "green" sustainable polymeric material can be present in the mixture of materials in an amount of at least 1%, at least 2%, at least 3%, at least 4%, at least 5%, at least 10%, at least 15%, at least 20%, at least 25%, at least 30%, at least 35%, at least 40%, at least 45%, at least 50%, no greater than 99%, no greater than 95%, no greater than 90%, no greater than 85%, no greater than 80%, no greater than 75%, no greater than 70%, no greater than 65%, or no greater than 60%, from 2% to 98%, from 50% to 90%, from 65% to 75%, from 20% to 50%, or from 40% to 60% by weight of the mixture of materials. More than one sustainable polymeric material may be used in the mixture, if desired.

A compatibilizer may be present in the mixture of materials. The compatibilizer can be mixed with the sustainable polymeric material, the carbohydrate-based polymeric material, mixed with both, or provided separately. Often the compatibilizer may be provided with at least one of the polymeric materials, included in the masterbatch formulation. The compatibilizer can be a modified polyolefin, such as a maleic anhydride grafted polypropylene, a maleic anhydride grafted polyethylene, a maleic anhydride grafted polybutene, or a combination thereof. The compatibilizer can also include an acrylate based co-polymer. For example, the compatibilizer can include an ethylene methyl acrylate co-polymer, an ethylene butyl-acrylate co-polymer, or an ethylene ethyl acrylate co-polymer. Additionally, the compatibilizer can include a poly(vinyacetate) based compatibilizer. In an embodiment, the compatibilizer may be a grafted version of the sustainable polymeric material (e.g., maleic anhydride grafted polyethylene where the sustainable polymeric material is "green" polyethylene).

The mixture of materials may include at least 0.5%, at least 1%, at least 2%, at least 3%, at least 4%, at least 5%, no greater than 50%, no greater than 45%, no greater than 40%, no greater than 35%, no greater than 30%, no greater than 25%, no greater than 20%, no greater than 15%, no greater than 10%, no greater than 9%, no greater than 8%, no greater than 7%, no greater than 6%, from 0.5% by weight to 12%, from 2% to 7%, or from 4% to 6% by weight of a compatibilizer.

Although certainly not required, and in at least some embodiments the inclusion of such would be best avoided, it is within the scope of the present invention to include any of a variety of UV and OXO degradable additives, such as PDQ-M, PDQ-H, BDA, and OxoTerra™ from Willow Ridge Plastics, OX1014 from LifeLine, or organic additives such as Restore® by Enso, EcoPure® by Bio-Tec Environmental, ECM Masterbatch Pellets 1M by ECM Biofilms, or Biodegradable 201 and/or Biodegradable 302 BioSphere®. Other additives, for example, for increased strength (e.g., Biomax® Strong from Dupont), or otherwise may be included.

One or more additives can be included in the mixture of materials in an amount of at least 0.5%, at least 1%, at least 1.5%, at least 2%, at least 2.5%, at least 3%, at least 4%, of no greater than 10%, no greater than 9%, no greater than 8%, no greater than 7%, no greater than 6%, no greater than 5%, from 0.2% to 12%, from 1% to 10%, from 0.5% to 4%, or from 2% by weight to 6% by weight of the mixture.

Referring to FIG. 1, at 108, the process 100 includes heating the mixture of materials. In an implementation, the mixture of materials can be heated to a temperature of at least 100° C., at least 110° C., at least 115° C., at least 120° C., at least 125° C., at least 130° C., at least 135° C., at least 140° C., no greater than 200° C., no greater than 190° C., no greater than 180° C., no greater than 175° C., no greater than 170° C., no greater than 165° C., no greater than 160° C., no greater than 155° C., no greater than 150° C., from 95° C. to 205° C., from 120° C. to 180° C., or from 125° C. to 165° C.

The mixture of materials including the sustainable polymeric material and carbohydrate-based polymeric material can be heated in one or more chambers of an extruder. In some cases, one or more chambers of the extruder can be heated at different temperatures. The speed of one or more screws of the extruder can be any desired rate.

At 110, an article is produced using the mixture of materials. In some cases, the article can include a film. In other cases, the article can be formed from a film. In other embodiments, the article can have a shape based on a design, such as a mold (e.g., injection molded). Any conceivable article formed of plastic may be formed from the mixture, e.g., including but not limited to films, bags, bottles, caps, lids, sheets, boxes, plates, cups, utensils, and the like. Where the article is a film, the film can be formed using a die by injecting a gas into the heated mixture of material to form the film (i.e., blowing the film). Films can be sealed and/or otherwise modified to be in the form of a bag or other article.

Where the article is a film, the film can be comprised of a single layer or multiple layers. The film or any individual layers can have a thickness of at least 0.001 mm, at least 0.002 mm, at least 0.004 mm, at least 0.01 mm, at least 0.02 mm, at least 0.03 mm, at least 0.05 mm, at least 0.07 mm, at least 0.10 mm, no greater than 1 mm, no greater than 0.5 mm, no greater than 0.1 mm, from about 0.05 mm to about 0.5 mm, or from 0.02 mm to 0.05 mm.

Films or other articles can have strength characteristics that are characterized through testing, such as a dart drop impact test (ASTM D-1709), tensile strength at break test (ASTM D-882), tensile elongation at break test (ASTM D-882), a secant modulus test (ASTM D-882), and/or an Elmendorf Tear test (ASTM D-1922). Films can have a dart drop impact test value of at least 100 g, 150 g, at least 175 g, at least 200 g, at least 225 g, at least 250 g, at least 275 g, at least 300 g, no greater than 450 g, no greater than 400 g, no greater than 375 g, no greater than 350 g, or no greater than 325 g, from 140 g to 425 g, from 200 g to 400 g, from 250 g to 350 g, from 265 g to 330 g. In an implementation, such values may be for whatever the thickness of the film is. In another implementation, such values may for a 1 mil thickness film formed from the mixture of materials.

The article can have a tensile strength at break test value in the machine direction of at least 3.5 kpsi, at least 3.7 kpsi, at least 3.9 kpsi, at least 4.1 kpsi, at least 4.3 kpsi, or at least 4.5 kpsi, no greater than 5.5 kpsi, no greater than 5.3 kpsi, no greater than 5.1 kpsi, no greater than 4.9 kpsi, or no greater than 4.7 kpsi, from 3.5 kpsi to 5.5 kpsi, or from 4.1 kpsi to 4.9 kpsi.

The article can have a tensile strength at break test value in the transverse direction of at least 3.2 kpsi, at least 3.4 kpsi, at least 3.6 kpsi, at least 3.8 kpsi, at least 4.0 kpsi, at least 4.2 kpsi, no greater than 5.7 kpsi, no greater than 5.5 kpsi, no greater than 5.3 kpsi, no greater than 5.1 kpsi, no greater than 4.9 kpsi, no greater than 4.7 kpsi, no greater than 4.5 kpsi, from 3.2 kpsi to 5.7 kpsi, or from 3.6 kpsi to 5.0 kpsi.

The article can have a tensile elongation at break test value in the machine direction of at least 550%, at least 560%, at least 570%, at least 580%, at least 590%, at least 600%, at least 610%, at least 620%, no greater than 725%, no greater than 710%, no greater than 700%, no greater than 680%, no greater than 665%, no greater than 650%, no greater than 635%, from 550% to 750%, or from 600% to 660%.

The article can have a tensile elongation at break test value in the transverse direction of at least 575%, at least 590%, at least 600%, at least 615%, at least 630%, or at least 645%, no greater than 770%, no greater than 755%, no greater than 740%, no greater than 725%, no greater than 710%, no greater than 695%, no greater than 680%, from 575% to 775%, or from 625% to 700%.

Where applicable the article can have an Elmendorf tear force test value in the machine direction of at least 280 g/mil, at least 300 g/mil, at least 320 g/mil, at least 340 g/mil, or at least 360 g/mil, no greater than 450 g/mil, no greater than 430 g/mil, no greater than 410 g/mil, no greater than 390 g/mil, or no greater than 370 g/mil, from 275 g/mil to 475 g/mil, or from 325 g/mil to 410 g/mil.

Where applicable the article can have an Elmendorf tear force test value in the transverse direction of at least 475 g/mil, at least 490 g/mil, at least 500 g/mil, at least 525 g/mil, at least 540 g/mil, or at least 550 g/mil, no greater than 700 g/mil, no greater than 680 g/mil, no greater than 650 g/mil, no greater than 625 g/mil, no greater than 600 g/mil, no greater than 580 g/mil, or no greater than 570 g/mil, from 475 g/mil to 725 g/mil, or from 490 g/mil to 640 g/mil.

Where applicable the article can have a secant modulus of elasticity test value in the machine direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi.

Where applicable the article can have a secant modulus of elasticity test value in the transverse direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi.

In some cases, articles including a carbohydrate-based polymeric material formed from a mixture of two or more starches have values of strength properties that are greater than articles including a carbohydrate-based polymeric material formed from a single starch. For example, an article including a carbohydrate-based polymeric material formed from a mixture of two or more starches can have a dart drop impact test value (in grams or g/mil of thickness) that is at least about 10% greater than an article where the carbohydrate-based polymeric material is formed from a single starch, at least about 25% greater, at least about 50% greater, at least about 75% greater, from 10% greater to 150% greater or from 60% greater to 120% greater than the same article but including a carbohydrate-based polymeric material formed from a single starch.

In other words, where the starch-based polymeric material that goes into the article is formed from two or more different types of starches the resulting strength is greater than if either starch were used alone to make the starch-based polymeric material. There is thus a synergistic strengthening effect that is achieved when using two or more different starches to make the starch-based polymeric material that is included in the article.

Furthermore, it is not necessary that a mixture of starches be used in forming the carbohydrate-based polymeric material to achieve increased strength results. For example, two different carbohydrate-based polymeric materials (one formed from one starch (e.g., corn), and the other formed from another starch (e.g., potato) could similarly be blended with a polyolefin or other plastic to form a film or other desired article that would exhibit increased strength as compared to such an article that was formed from only one or the other of the starches.

When subjected to biodegradation testing (e.g., whether biomethane potential testing, or any applicable ASTM standard, such as ASTM D-5511, ASTM D-5526, ASTM D-5338, or ASTM D-6691. Under such testing, and within a given time period (e.g., 30 days, 60 days, 90 days, 180 days, 365 days (1 year), 2 years, 3 years, 4 years, or 5 years, the article may show substantial biodegradation of the total polymeric content, and/or the sustainable polymeric content (apart from the starch-based polymeric content). Biomethane potential testing is typically conducted over 30 or 60 days, although sometimes for as long as 90 days. The longer time period tests are more typically applicable under any of the above mentioned ASTM standards. For example, an article that may be free or substantially free of a biodegradation enhancing additive may show biodegradation that is greater than the starch-based polymeric material content thereof, indicating that the other polymeric material(s) are also biodegrading (or exhibit the potential to biodegrade under a biomethane potential test).

Particularly when subjecting the articles to testing simulating biodegradation under landfill or other degradation conditions (e.g., composting conditions, or marine conditions) for 180 days, 200 days, 365 days (1 year), 2 years, 3 years, or 5 years, the biodegradation can be greater than the weight percent of carbohydrate-based polymeric materials within the article. In other words, inclusion of the described carbohydrate-based polymeric materials can result in at least some biodegradation of the sustainable polymeric material (which materials alone are not biodegradable, at least in the case of "green" PE, "green" PP, and bioPET). For example, an article that is formed from a blend of the carbohydrate-based polymeric materials and "green" PE may exhibit biodegradation after such periods of time that is greater than the weight fraction of the carbohydrate-based polymeric materials in the film, indicating that the "green" PE (heretofore considered to not be biodegradable) is actually being biodegraded, with the carbohydrate-based polymeric material. Such results are surprising, and particularly advantageous. For example, such an article not only exhibits increased environmental sustainability (as potentially the entirety of the polymeric content of the article is derived from sustainable plant materials in the form of starch for the carbohydrate-based polymeric material and ethanol (or another small molecule building block) in the case of the sustainable polymeric material), but it now also exhibits biodegradability characteristics, where the comparable bag or other film formed from 100% "green" PE (or even a blend of conventional TPS and "green" PE) did not have such characteristics. Furthermore, as described above, the strength of the article can be greater than that of the 100% "green" PE article. Even cost can potentially be comparable. Such a collection of characteristics marks a significant advancement in the art.

Biomethane potential testing determines the potential for anaerobic biodegradation based on methanogenesis as a percent of total methanogenesis potential. Biomethane potential testing can be used to predict biodegradability of the tested samples according to the ASTM D-5511 standard and the biomethane potential testing can be conducted using one or more conditions from the ASTM D-5511 standard. For example, the biomethane potential testing can take place at a temperature of about 52° C. Additionally, the biomethane potential testing can have some conditions that are different from those of ASTM D-5511, e.g., to accelerate the test to be completed within the typical 30, 60, or sometimes as long as 90 days. Biomethane potential testing can employ an inoculum having from 50% to 60% by weight water and from 40% to 50% by weight organic solids. For example, an inoculum used in biomethane potential testing can have 55% by weight water and 45% by weight organic solids. Biomethane potential testing can also take place at other temperatures, such as from 35° C. to 55° C. or from 40° C. to 50° C.

When subjected to biodegradation testing, an article having no greater than about 2% by weight of a biodegradation enhancing additive (or being free thereof) and having an amount of carbohydrate-based polymeric material and sustainable polymeric material as described herein can exhibit enhanced degradation, as a result of the introduction of the carbohydrate-based polymeric material into the article. For example, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or even at least 95% of the non-carbohydrate-based polymeric material (e.g., the "green" sustainable polymeric material) may biodegrade over a period of at least about 1 year, at least about 2 years, at least about 3 years, or at least about 5 years when subjected to landfill, composting, and/or marine conditions (or conditions simulating such). Such biodegradation is particularly remarkable and advantageous. Thus not only does the carbohydrate-based polymeric material biodegrade, but the "green" sustainable polymeric material does as well.

The Examples show that with increased time, the amount of biodegradation can be very high, such that in at least some implementations, substantially the entire article biodegrades (e.g., biodegradation of at least about 85%, at least about 90%, or at least about 95% within 180 days, or 200 days, or 365 days (1 year), within 2 years, within 3 years, within 5 years, or other period).

Figure 2:
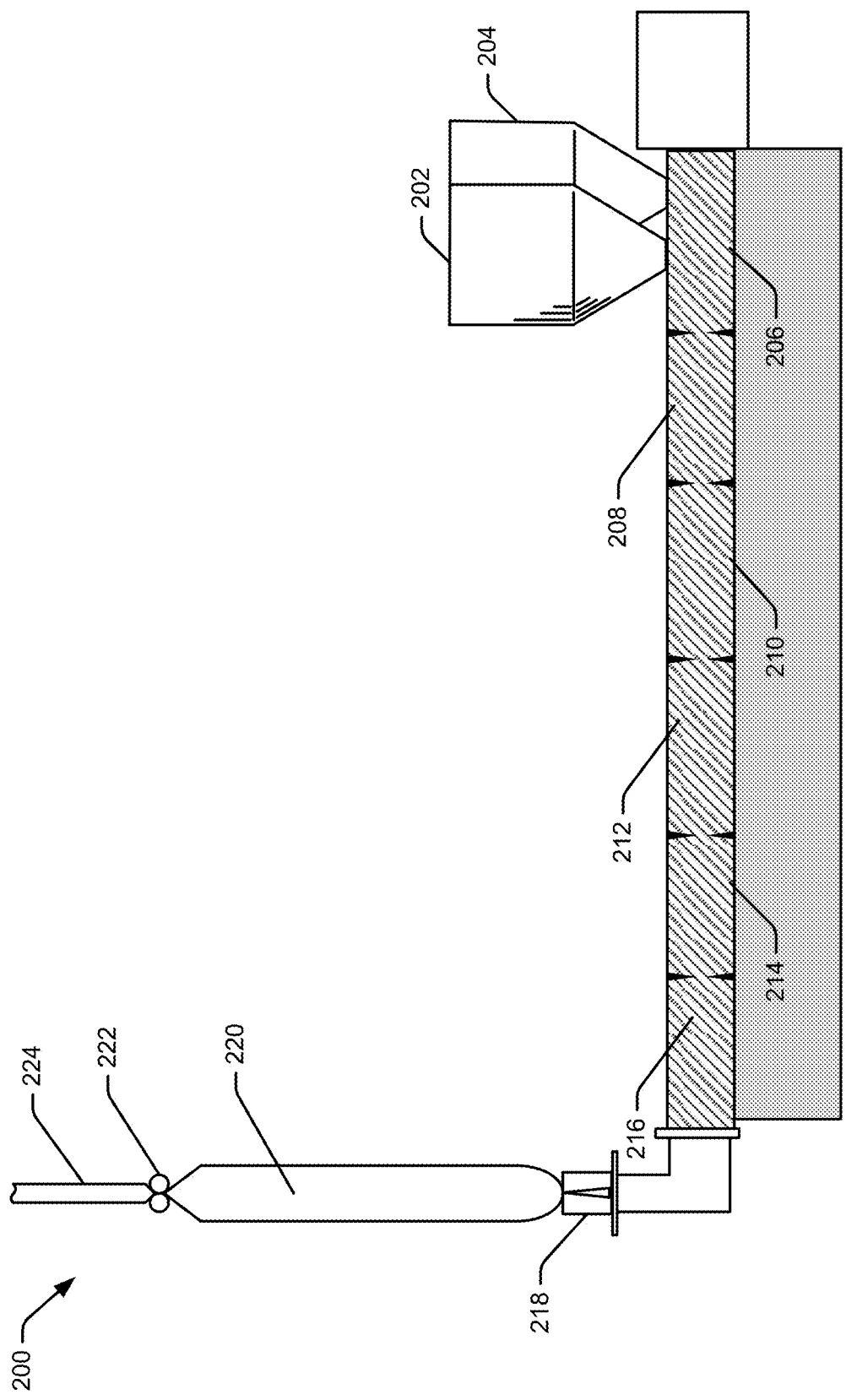
FIG. 2 illustrates components of an example manufacturing system to produce articles including biodegradable materials.

FIG. 2 illustrates components of an example manufacturing system 200 to produce articles according to the present disclosure. In some cases, the manufacturing system 200 can be used in the process 100 of FIG. 1. In an illustrative example, the manufacturing system 200 is an extruder, such as a single screw extruder or a twin screw extruder.

In an implementation, one or more sustainable polymeric materials and one or more carbohydrate-based polymeric materials are provided via a first hopper 202 and a second hopper 204. The one or more sustainable polymeric materials can include one or more "green" sustainable polyolefin-based polymeric materials. For example, the one or more sustainable polymeric materials can include a "green" polyethylene. Additionally, the one or more carbohydrate-based polymeric materials can include one or more starch-based polymeric materials. A compatibilizer may be included with either or both polymeric materials (e.g., in a masterbatch thereof).

The one or more carbohydrate-based polymeric materials and the one or more sustainable polymeric materials can be mixed in a first chamber 206 to produce a mixture of materials. In some cases, the mixture of materials can include from 10% by weight to 40% by weight of the one or more carbohydrate-based polymeric materials, from 60% by weight to 89% by weight of the one or more sustainable polymeric materials, and from 1% by weight to 9% by weight of the one or more compatibilizers. The ranges of course may be varied outside the above ranges, depending on desired characteristics.

In the example implementation shown in FIG. 2, the mixture of materials can pass through a number of chambers, such as the first chamber 206, a second chamber 208, a third chamber 210, a fourth chamber 212, a fifth chamber 214, and an optional sixth chamber 216. The mixture of materials can be heated in the chambers 206, 208, 210, 212, 214, 216. In some cases, a temperature of one of the chambers can be different from a temperature of another one of the chambers. In an illustrative example, the first chamber 206 is heated to a temperature from 120° C. to 140° C.; the second chamber 208 is heated to a temperature from 130° C. to 160° C.; the third chamber 210 is heated to a temperature from 135° C. to 165° C.; the fourth chamber 212 is heated to a temperature from 140° C. to 170° C.; the fifth chamber 214 is heated to a temperature from 145° C. to 180° C.; and the optional sixth chamber 216 is heated to a temperature from 145° C. to 180° C.

The heated mixture can then be extruded using a die 218 to form an extruded object, such as a film, sheet, or the like. Injection molding, thermoforming, or other plastic production processes may be used to manufacture various articles such as utensils, plates, cups bottles, caps or lids therefore, or the like. In film blowing, a gas can be injected into the extruded object to expand it with a pressure from 105 bar to 140 bar. The resulting tube 220 can be drawn up through rollers 222 to create a film 224 with a thickness typically from 0.02 mm (about 0.8 mil) to 0.05 mm (about 2 mil). Even thinner films can be made using the blends as described herein, e.g., having a thickness as little as 0.1 mil (0.004 mm). Of course, thicknesses greater than 2 mil can also be achieved. In some cases, the film 224 can be comprised of a single layer. In other cases, the film 224 can be comprised of multiple layers. For example, the film 224 can be comprised of multiple layers. Where multiple layers are present, at least one of the layers may include the carbohydrate-based polymeric material. In some embodiments, the carbohydrate-based polymeric material may be present in one or more outer layers. In another embodiment, the carbohydrate-based polymeric material may be present in an inner layer. Where no carbohydrate-based polymeric material is included in the outer layer(s), biodegradation of the outer layer(s) may not occur.

The concepts described herein will be further described in the following examples, which do not limit the scope encompassed by the claims.

EXAMPLES

Example 1

A starch-based polymer was formed from 27% tallow glycerin (99% pure glycerin), and 73% starch, exclusive of the water used. The finished-starch-based polymer included <1% water. The starch-based polymer was mixed with LLDPE and anhydride-modified LLDPE in proportions of 25%, 70%, and 5%, respectively, by weight. Eleven samples were prepared and blown into films. The temperature settings of the extruder used are shown in Table 3. B1, B2, B3, B4, and B5 refer to temperature settings at different locations of the barrel of the extruder and AD1, D1, and D2 refer to the temperature settings at different locations in the die section of the extruder.

TABLE 3

| Temp. | Extruder | | | | | | | |
|---|---|---|---|---|---|---|---|---|
| | B1 | B2 | B3 | B4 | B5 | AD1 | D1 | D2 |
| Set Value | 130 | 140 | 145 | 150 | 160 | 160 | 160 | 160 |

The extruder blow settings are shown in Table 4.

TABLE 4

| Blow | Extruder | | | | | |
|---|---|---|---|---|---|---|
| | Melt Temperature Setting (° C.) | Pressure (bar) | Screw RMP | Extruder Motor Setting (Amps) | Blower Speed | Take-Up Speed (meters/min) |
| Set Value (Samples 1-11) | 148 | 132 | 17 | 32.0 | 0 | 7.0 |
| Set Value (Sample 12) | 147 | 115 | 17 | 32.0 | 0 | 7.0 |

70% of each film was LLDPE, 25% was the starch-based polymer, and 5% of each film was anhydride-modified LLDPE. The films then were tested using a falling dart impact test according to ASTM D-1709. The strength test results of these tests are shown in Table 5. Dart strength per mil of thickness can simply be calculated by dividing the measured dart impact strength (e.g., from ASTM D-1709) by the thickness of the tested film. This example could be performed with a "green" PE, and similar results showing increased strength would be achieved. Example 16 hereafter shows strength data where a film was actually blown from biopolyethylene, a compatibilizer, and the starch-based polymer.

TABLE 5

| Sample No. | Film Thickness (Mil) | Dart Test (g) |
|---|---|---|
| 1 | 1.535 | >387 |
| 2 | 1.50 | >387 |

TABLE 5-continued

| Sample No. | Film Thickness (Mil) | Dart Test (g) |
|---|---|---|
| 3 | 1.50 | >387 |
| 4 | 1.50 | 347 |
| 5 | 1.45 | 347 |
| 6 | 1.55 | 387 |
| 7 | 1.55 | 387 |
| 8 | 1.50 | >387 |
| 9 | 1.55 | 387 |
| 10 | 1.55 | >387 |
| 11 | 1.50 | >387 |
| 12 | 2.00 | 227 |

Example 2

A starch-based polymer was formed from 27% tallow glycerin (99% pure glycerin) and 73% starch, exclusive of the water used. The finished starch-based polymer included <1% water. The starch-based polymer was mixed with LLDPE and anhydride-modified LLDPE in proportions of 25%, 70%, and 5%, respectively, by weight. Two samples were prepared and blown into films. The temperature settings of the extruder used are shown in Table 6.

TABLE 6

| Temp. | Extruder | | | | | | | | |
|---|---|---|---|---|---|---|---|---|---|
| | B1 | B2 | B3 | B4 | B5 | B6 | AD1 | D1 | D2 |
| Set Value | 130 | 150 | 155 | 160 | 165 | 165 | 165 | 170 | 170 |

The extruder blow settings are shown in Table 7.

TABLE 7

| | Extruder | | | | | |
|---|---|---|---|---|---|---|
| | Melt Temperature Setting (° C.) | Pressure (bar) | Screw RPM | Extruder Motor Setting (Amps) | Blower Speed | Take-Up Speed (meters/minute) |
| Set Value | 149 | 121 | 16.0 | 35.0 | 0 | 6.0 |

70% of each film was LLDPE, 25% was the starch-based polymer, and 5% of each film was anhydride-modified LLDPE. The films then were tested using a falling dart impact test according to ASTM D-1709. The strength test results (in grams) of these tests are shown in Table 8. This example could be performed with a "green" PE, and similar results showing increased strength would be achieved. Example 16 hereafter shows strength data where a film was actually blown from biopolyethylene, a compatibilizer, and the starch-based polymer.

TABLE 8

| Sample No. | Film Thickness (Mil) | Dart Test (g) |
|---|---|---|
| 1 | 1.575 | 347 |
| 2 | 1.335 | 362 |

Example 3

In order to test the strength characteristics resulting from various combinations of starch, 17 starch-based polymers were formed using water, tallow glycerin (99% pure glycerin) and starch. Exclusive of the water, the fraction of the starch-based polymer formed from glycerin varied from 27% to 32%, while the fraction formed from the starch varied from 68% to 73%. All finished starch-based polymers exhibited <about 1% water, and were mixed with LLDPE and anhydride-modified LLDPE in proportions of 25%, 70%, and 5%, respectively, by weight. The resulting mixtures were then extruded and blown into films. The films were then tested using a falling dart drop impact test according to ASTM D-1709. The combinations of starches tested and strength test results are shown in Table 9A. The two thickness values for each sample in Table 9A correspond to the minimum and maximum measured thickness for each sample (as there was some variation within each film). As can be seen from the results shown in Table 9A-9B, samples formed from a mixture of starches have a dart drop impact test value (in grams) that is greater than the dart drop impact test value of samples formed from a single starch. Table 9B shows the calculated percentages in increased strength as compared to what might be expected (e.g., a weighted strength based on percentage of each starch in the mixture). The increases in strength are remarkable, and unexpected. This example could be performed with a "green" PE, and similar results of increased strength would be achieved.

TABLE 9A

| Sample No. | Water Content (Starch-based Polymers) | Starch Content (%) | | | Thickness (mm) | | Dart Test (g) |
|---|---|---|---|---|---|---|---|
| | | Potato | Corn | Tapioca | | | |
| 1 | 0.58 | 0 | 100 | 0 | 0.040 | 0.045 | 137 |
| 2 | 0.73 | 100 | 0 | 0 | 0.040 | 0.045 | 167 |
| 3 | 0.80 | 0 | 100 | 0 | 0.040 | 0.045 | 167 |
| 4 | 0.93 | 100 | 0 | 0 | 0.030 | 0.035 | 167 |
| 5 | 0.49 | 0 | 0 | 100 | 0.035 | 0.040 | 197 |
| 6 | 0.55 | 0 | 0 | 100 | 0.030 | 0.035 | 212 |
| 7 | 1.03 | 33.33 | 33.33 | 33.33 | 0.030 | 0.035 | 242 |
| 8 | 1.04 | 20 | 20 | 60 | 0.030 | 0.035 | 267 |
| 9 | 0.97 | 60 | 20 | 20 | 0.025 | 0.030 | 252 |
| 10 | 0.93 | 0 | 0 | 100 | 0.025 | 0.030 | 257 |
| 11 | 0.94 | 20 | 0 | 80 | 0.025 | 0.030 | 257 |
| 12 | 1.37 | 20 | 80 | 0 | 0.025 | 0.030 | 257 |
| 13 | 0.95 | 80 | 0 | 20 | 0.030 | 0.035 | 302 |
| 14 | 1.19 | 20 | 60 | 20 | 0.030 | 0.035 | 322 |
| 15 | 0.96 | 0 | 80 | 20 | 0.025 | 0.030 | 277 |
| 16 | 1.05 | 80 | 20 | 0 | 0.025 | 0.030 | 317 |
| 17 | 0.81 | 0 | 20 | 80 | 0.025 | 0.030 | 322 |

TABLE 9B

| Sample No. | ESR Used | Mean Film Thickness (mil) | Dart Strength (g/mil) | Percent Increase in Dart Strength (%) |
|---|---|---|---|---|
| 1 | GS-270 | 1.673 | 81.9 | N/A |
| 2 | GS-270 | 1.673 | 99.8 | N/A |
| 3 | GS-300 | 1.673 | 99.8 | N/A |
| 4 | GS-300 | 1.280 | 130.5 | N/A |
| 5 | GS-270 | 1.476 | 133.4 | N/A |
| 6 | GS-300 | 1.280 | 165.7 | N/A |
| 7 | GS-300 | 1.280 | 189.1 | 43.3% |
| 8 | GS-300 | 1.280 | 208.7 | 43.4% |
| 9 | GS-300 | 1.083 | 232.8 | 77.1% |
| 10 | GS-330 | 1.083 | 237.4 | N/A |
| 11 | GS-300 | 1.083 | 237.4 | 49.6% |
| 12 | GS-300 | 1.083 | 237.4 | 124.0% |
| 13 | GS-300 | 1.280 | 236.0 | 71.6% |
| 14 | GS-300 | 1.280 | 251.7 | 111.3% |
| 15 | GS-300 | 1.083 | 255.8 | 126.4% |
| 16 | GS-300 | 1.083 | 292.8 | 135.4% |
| 17 | GS-300 | 1.083 | 297.4 | 95.0% |

Example 4

Using the same protocols as described in Example 3, 11 additional combinations of starches were tested. Specifically, 11 starch-based polymers were formed from 27% tallow glycerin (99% pure glycerin) and 73% starch, exclusive of the water. Each finished starch-based polymer exhibited <about 1% water, and was mixed with LLDPE and anhydride-modified LLDPE in proportions of 25%, 70%, and 5%, respectively, by weight. The resulting mixtures were then extruded and blown into films. 70% of each film was LLDPE, 25% was the starch-based polymer, and 5% of each film was anhydride-modified LLDPE. The films were then tested using a falling dart impact test according to ASTM D-1709. The combinations of starches tested and strength test results (in grams) are shown in Table 10. As with the results shown in Tables 9A-9B, the results of Table 10 show that samples formed from a mixture of starches have dart drop impact test values that are greater than the dart drop impact test values of samples formed from a single starch. Such an increase in strength achieved by using a mixture of different starches in forming the starch-based polymeric material, from which the film is formed (with the LLDPE) is surprising an unexpected.

TABLE 10

| Sample No. | Starch Content (%) | | | Thickness (mil) | Dart Test (g) | Dart Strength (g/mil) | Percent Increase in Dart Strength (%) |
|---|---|---|---|---|---|---|---|
| | Potato | Corn | Tapioca | | | | |
| 1 | 0 | 100 | 0 | 1.535 | 347 | 226.1 | N/A |
| 2 | 100 | 0 | 0 | 1.535 | 362 | 235.8 | N/A |
| 3 | 0 | 0 | 100 | 1.550 | 367 | 236.8 | N/A |
| 4 | 80 | 20 | 0 | 1.550 | 387 | 249.7 | 6.8% |
| 5 | 0 | 20 | 80 | 1.550 | 387 | 249.7 | 6.4% |
| 6 | 0 | 80 | 20 | 1.550 | 387 | 249.7 | 9.4% |
| 7 | 0 | 10 | 90 | 1.550 | 387 | 249.7 | 5.9% |
| 8 | 33.33 | 33.33 | 33.33 | 1.500 | 387 | 258 | 10.9% |
| 9 | 80 | 0 | 20 | 1.500 | 387 | 258 | 9.3% |
| 10 | 10 | 0 | 90 | 1.500 | 387 | 258 | 9.0% |
| 11 | 0 | 90 | 10 | 1.500 | 387 | 258 | 13.6% |

Although the strength increase values seen in Table 10 differ from those of Example 3 (in Tables 9A-9B), both show a synergistic strength increase, beyond what would be expected, when different starches are used in forming the ESR. Various specific process conditions, such as temperature, blow up ratio, and the like may affect actual increases achieved.

Figure 5:
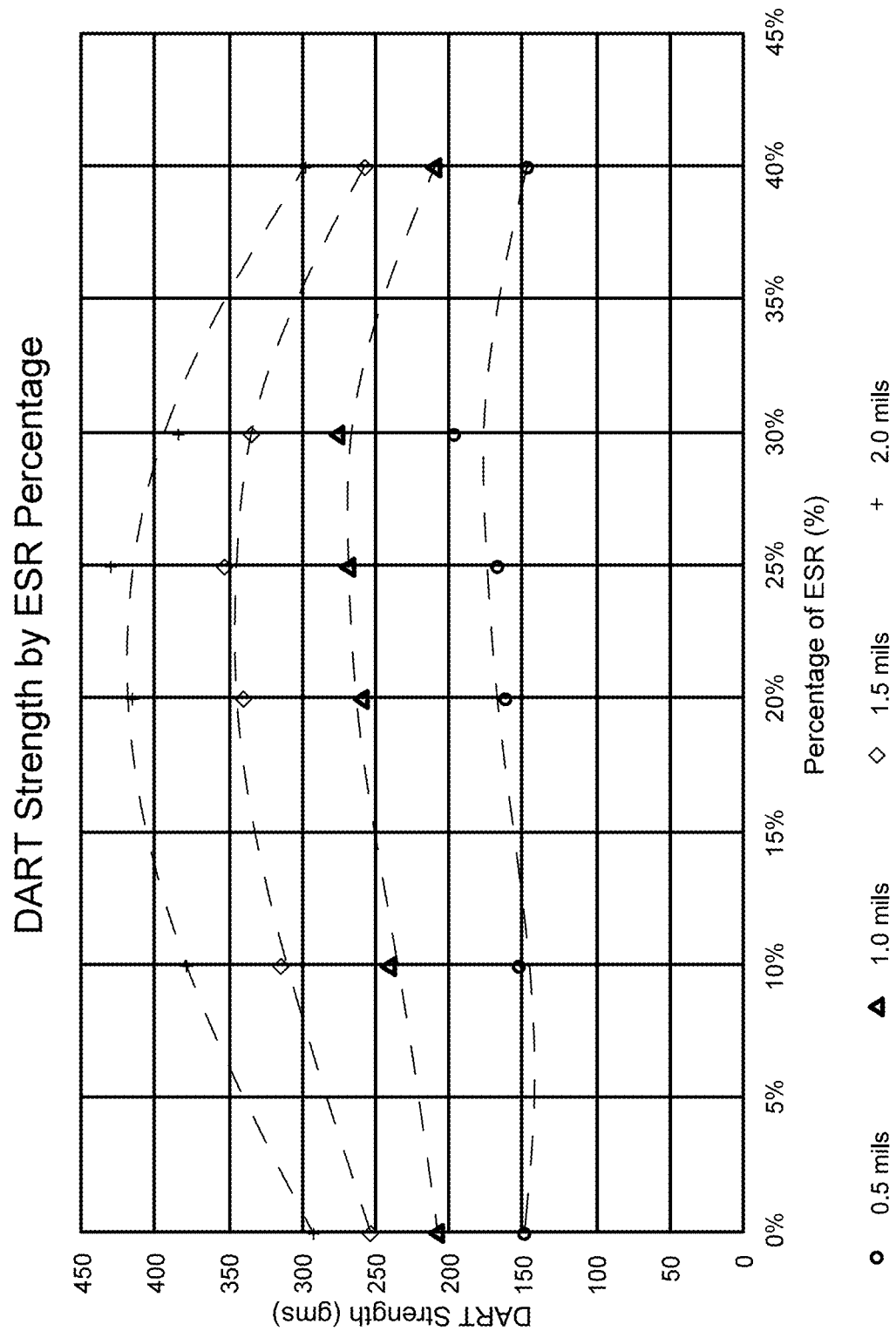
FIG. 5 shows dart strength for different thickness films based on percentage of carbohydrate-based polymeric material in the film.

FIG. 5 charts dart impact test strength for different thickness films (0.5 mil, 1 mil, 1.5 mil, 2.0 mils) based on percentage of starch-based "ESR" in the film. The ESR used in the films formed shown in FIG. 5 was formed from a blend of starches including 90% corn starch and 10% potato starch. FIG. 5 shows how the strength of the film increases with increasing ESR percentage, up to a maximum strength at about 20% to about 25% ESR. The balance of the blend included polyethylene and an appropriate compatibilizer, as described herein.

Figure 6:
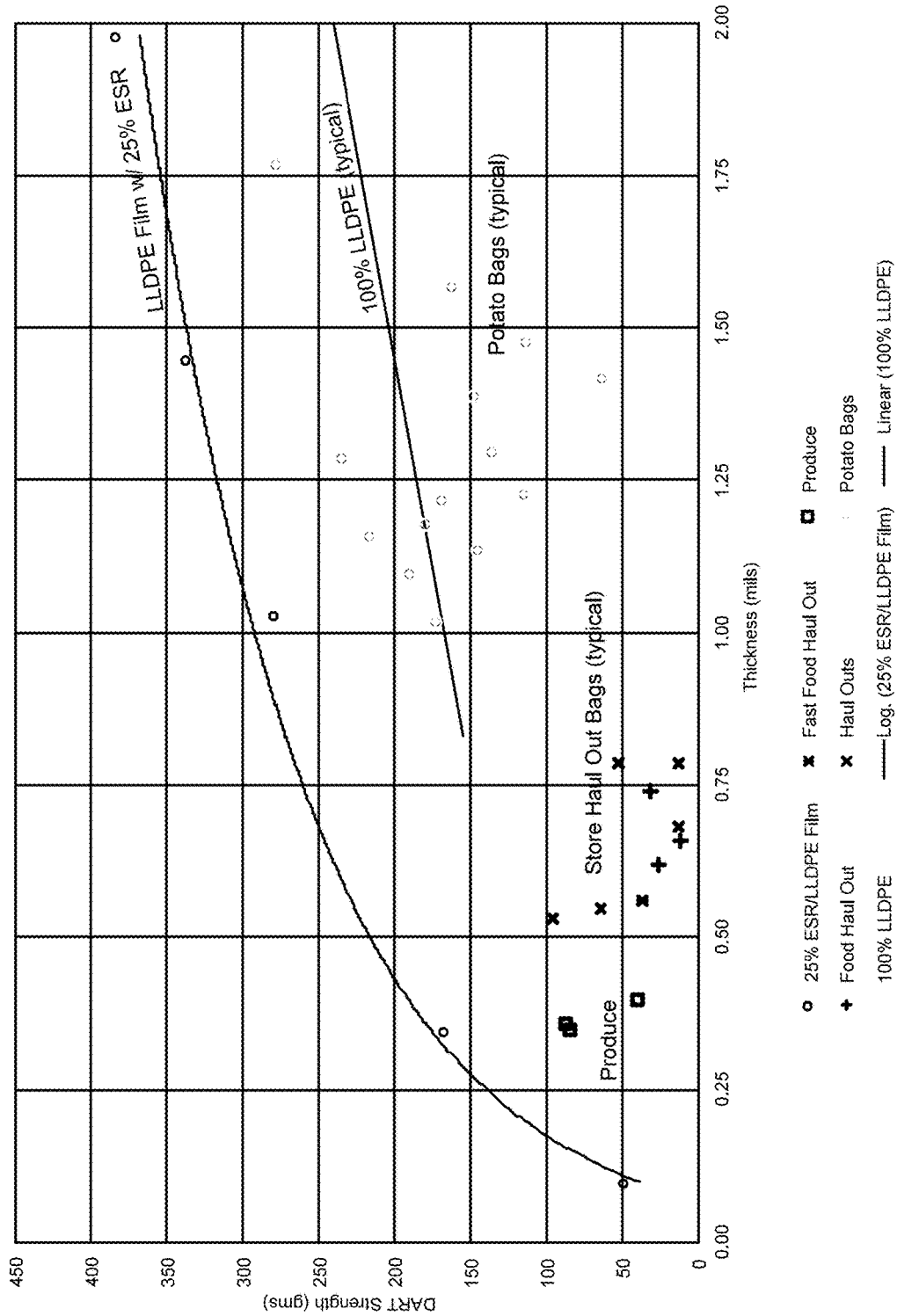
FIG. 6 shows dart strength for different thickness films (from about 0.1 mil up to 2 mils) formed from a blend of 25% carbohydrate-based polymeric material, about 5% compatibilizer, and about 70% PE, as compared to 100% PE film, and also showing comparison for existing produce bags, haul out bags, and potato bags.

FIG. 6 charts dart impact test strength for different thickness films (from about 0.1 mil up to 2 mils) for films including 25% carbohydrate-based polymeric material, with the balance being a small fraction of compatibilizer (e.g., about 5%) as described herein, and PE (about 70%). Although the actual plotted data are for synthetic petrochemical based PE, values for biopolyethyelene are expected to be similar. FIG. 6 also shows comparative strength for 100% PE films (which would be similar for 100% green PE), which are at all points lower than for the blend according to the present disclosure. FIG. 6 further shows various other tested reference points for produce bags (e.g., bags provided to consumers in a supermarket produce section for holding produce), for various "haul out" bags (e.g., grocery and other plastic bags provided for carry out), and for potato bags (plastic bags used to hold typically 5, 10 or 20 pounds of potatoes in the produce section of a supermarket). While the actual measurements shown in FIG. 6 were taken using LLDPE, it is expected that the values will be similar when using "green" PE. Such expectation that "green" PE will perform similarly to other forms of PE is supported by Example 16, in which films were blown from "green" PE and blends of such with ESR.

Figure 7:
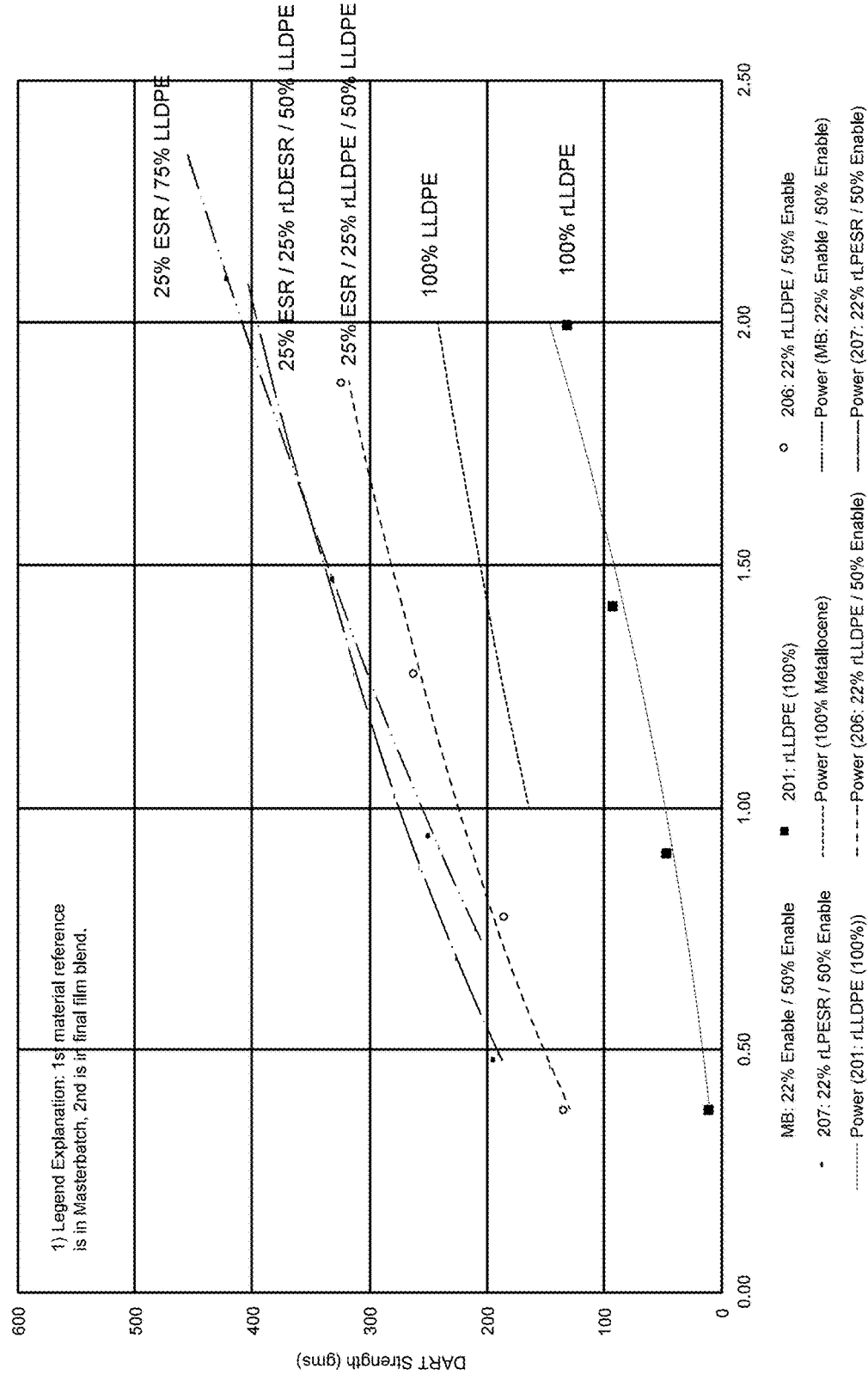
FIG. 7 shows dart strength for different thickness films for various blended films including ESR, as well as comparative films formed from virgin or recycled materials.

FIG. 7 charts dart impact test strength for different thickness films (from less than 0.5 mil to about 2 mils) for various blended films according to the present disclosure, as well as comparative films (e.g., 100% LLDPE, 100% recycled LLDPE (rLLDPE). In addition to showing strength characteristics for a film formed from virgin materials (25% ESR, 70% LLDPE, 5% compatibilizer (labeled 25% ESR/ 75% LLDPE), FIG. 7 also shows strength resulting when such a recycled material (rLDESR) is then blended with virgin materials (labeled 25% ESR/25% rLDESR/50% LLDPE), or where recycled LLDPE (rLLDPE) is used in the blend (labeled 25% ESR/25% rLLDPE/50% LLDPE). The strength results are improved as compared to use of PE polymeric materials, as shown, in addition to the previously described characteristics of increased renewability and biodegradability. While the actual measurements shown in FIG. 7 were taken using LLDPE formed from non-sustainable sources, it is expected that the values will be similar when using "green" PE.

Example 5

A starch-based polymer formed from water, tallow glycerin (99% pure glycerin) and starch, and exhibiting <about 1% water after manufacture was mixed with LLDPE and anhydride-modified LLDPE in proportions of 25%, 70%, and 5%, respectively, by weight. The starch used in forming the starch-based polymer was a blend of 90% corn starch and 10% potato starch, by weight. The mixture of the starch-based polymer and the LLDPE was extruded and blown into a film. 70% was LLDPE, 25% of the film was the starch-based polymer, and 5% was anhydride-modified LLDPE. For comparison purposes, a second film containing 100% LLDPE was also prepared. Using a variety of testing methods a number of strength characteristics were tested, the results of which are shown in Table 9. In Table 11, transverse directions is abbreviated (TD) and machine directions is abbreviated (MD). The results shown in Table 11 indicate that the sample formed from the starch-based polymer blend has values for some of the strength tests that are greater than corresponding values for the LLDPE sample. This example could be performed with a "green" PE, and similar results would be achieved.

TABLE 11

| | Sample Form | Test Method | CP14102701 | LLDPE | Cardia BL-F |
|---|---|---|---|---|---|
| Film Thickness (mil) | Film | | 1.35 | 1.35 | 1.2 |
| Mass Density (SG): | Film or Pellets | ASTM D-792 | 1.04 | 0.92 | |
| Secant Modulus MD, kpsi | Film | ASTM D-882 | 30 +/− 1 | 37.7 +/− 2.2 | |
| Secant Modulus TD, kpsi | Film | ASTM D-882 | 30 +/− 1.3 | 32.1 +/− 2.4 | |
| Tensile Strength MD Break, kpsi | Film | ASTM D-882 | 4.5 +/− 0.4 | 4.4 +/− 0.2 | 2.9 |
| Tensil Strength TD Break, kpsi | Film | ASTM D-882 | 4.3 +/− 0.7 | 4.7 +/− 1.1 | |
| Tensil Elongation MD Break, % | Film | ASTM D-882 | 632 +/− 27 | 571 +/− 25 | 330 |
| Tensile Elongation TD Break, % | Film | ASTM D-882 | 664 +/− 32 | 651 +/− 65 | |
| Elmendorf Tear MD, g/mil | Film | ASTM D-1922 | 367 +/− 38 | 254 +/− 41 | |
| Elmendorf Tear TD, g/mil | Film | ASTM D-1922 | 568 +/− 70 | 481 +/− 41 | |
| Dart Drop Impact, g | Film | ASTM D-1709 | 320 +/− 10 | 175 +/− 10 | 200 |
| Barrier: OPV 23° C, 0% RH | Film | cc-25, mic/m$^2$ day-atm $O_2$ | 2,916 +/− 49 | 4,346 +/− 130 | |
| Barrier: MVPV 39° C, 100% RH | Film | gm/m$^2$-day | 24 +/− 3 | 14 +/− 0 | |
| Optical Transparency % | Film | ASTM D-1746 | 7 +/− 1 | 44 +/− 1 | |
| Heat Seal Strength | Film | 40 psi, 0.5 sec | 1,400 g/in | 1,497 g/in | |
| Heat Seal Temperature Range | Film | | 130-180° C. | 130-180° C. | |
| Melt Flow Rate | Pellets | ASTM D-1238 | 0.47 g/10 min | 1.0 g/10 min | |

TABLE 11-continued

|  | Sample Form | Test Method | CP14102701 | LLDPE | Cardia BL-F |
|---|---|---|---|---|---|
| Bio Content | Film or Pellets |  | 25% | 0% | 33% |
| Water Content | Pellets | ASTMD-6980 | 0.35% | 0% | 0.60% |

Example 6

Figure 8A:
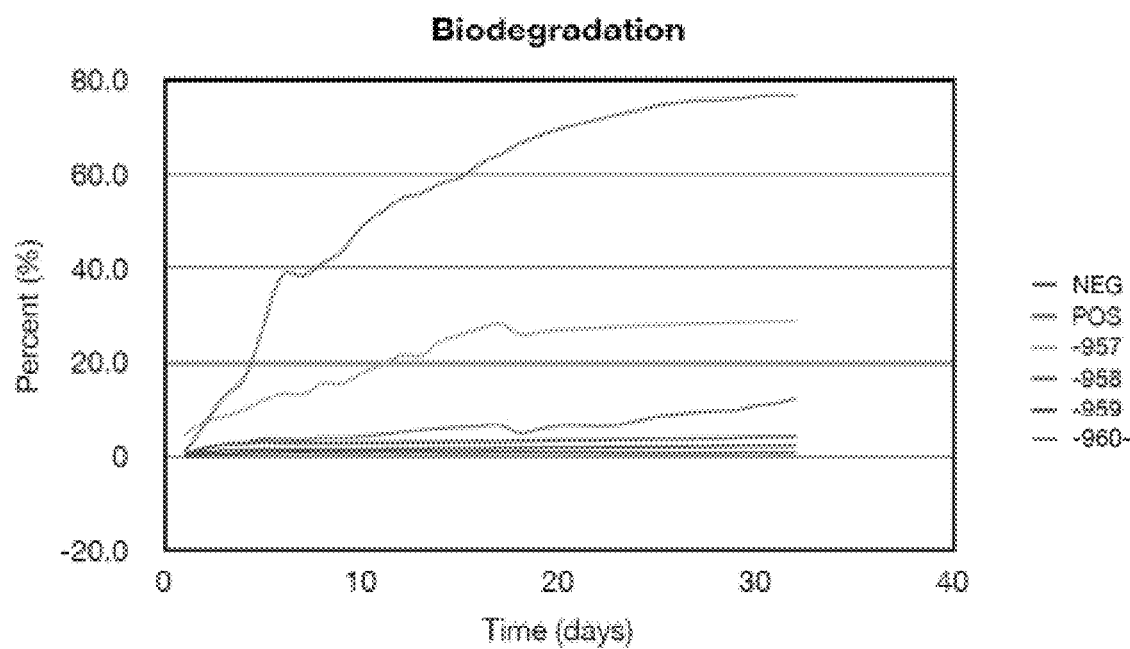
FIG. 8A and FIG. 8B illustrate percent biodegradation measured over 32 days according to biomethane potential testing of four samples formed according to techniques described herein.
Figure 8B:
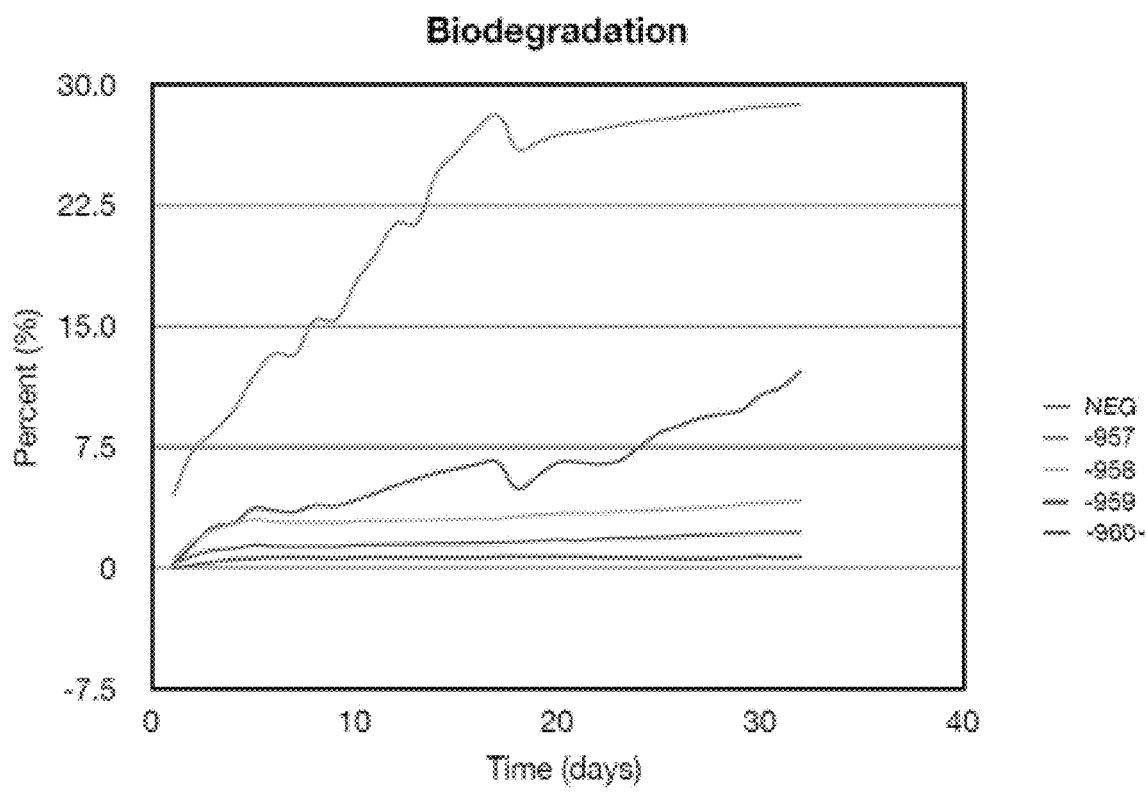

Seven samples were tested for 32 days to determine biodegradability characteristics using biomethane potential testing, to determine the potential for anaerobic biodegradation based on methanogenesis as a percent of total methanogenesis potential. The biomethane potential test was intended to replicate the conditions of a full-scale anaerobic digester (landfill). The biomethane potential test was conducted at a temperature of about 52° C. using an inoculum having about 55% by weight water and about 45% by weight organic solids. The positive control sample was cellulose and the negative control sample was untreated polyethylene. The results of four samples (referred to as 957, 958, 959, and 960) are shown in FIGS. 8A and 8B and in Table 12.

TABLE 12

|  | Inoculum | Negative | Positive | 957 | 958 | 959 | 960 |
|---|---|---|---|---|---|---|---|
| Cumulative Gas Volume (mL) | 729.6 | 962.5 | 8184.2 | 13366.8 | 2805.7 | 2995.4 | 5599.0 |
| Percent CH$_4$ (%) | 18.4 | 19.3 | 35.4 | 29.2 | 21.8 | 0.0 | 33.6 |
| Volume CH$_4$ (mL) | 134.2 | 185.5 | 2898.2 | 3904.4 | 612.4 | 0.0 | 1880.7 |
| Mass CH$_4$ (g) | 0.10 | 0.13 | 2.07 | 2.79 | 0.44 | 0.00 | 1.34 |
| Percent CO$_2$ (%) | 49.9 | 44.0 | 44.5 | 43.4 | 43.2 | 40.2 | 45.4 |
| Volume CO$_2$ (mL) | 364.0 | 423.3 | 3639.8 | 5799.9 | 1211.8 | 1204.2 | 2544.1 |
| Mass CO$_2$ (g) | 0.72 | 0.83 | 7.15 | 11.39 | 2.38 | 2.37 | 5.00 |
| Sample Mass (g) | 1,000 | 10 | 10 | 20.0 | 20.0 | 20 | 20 |
| Theoretical Sample Mass (g) | 0.0 | 8.6 | 4.2 | 17.1 | 17.1 | 17.1 | 17.1 |
| Biodegraded Mass (g) | 0.27 | 0.33 | 3.50 | 5.20 | 0.98 | 0.65 | 2.37 |
| Percent Biodegraded (%) |  | 0.7 | 76.7 | 28.8 | 4.1 | 2.2 | 12.3 |
| Adjusted Percent Biodegraded (%) |  | 0.9 | 100.0 | 37.5 | 5.4 | 2.9 | 16.0 |

Figure 9A:
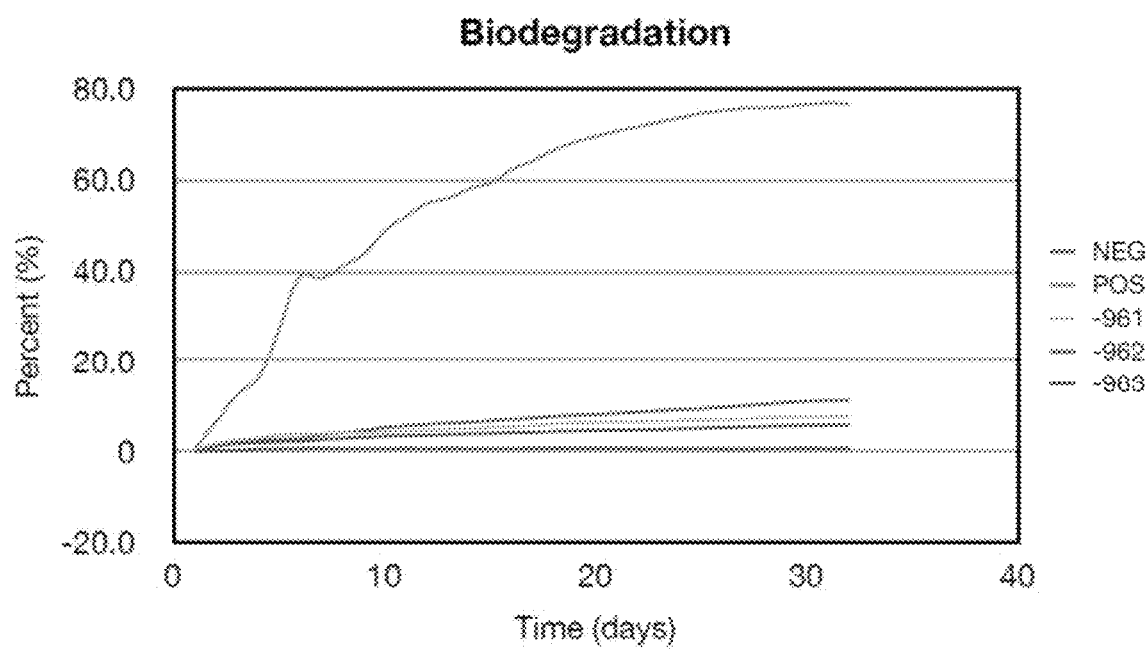
FIG. 9A and FIG. 9B illustrate percent biodegradation measured over 32 days according to biomethane potential testing of three additional samples formed according to techniques described herein.
Figure 9B:
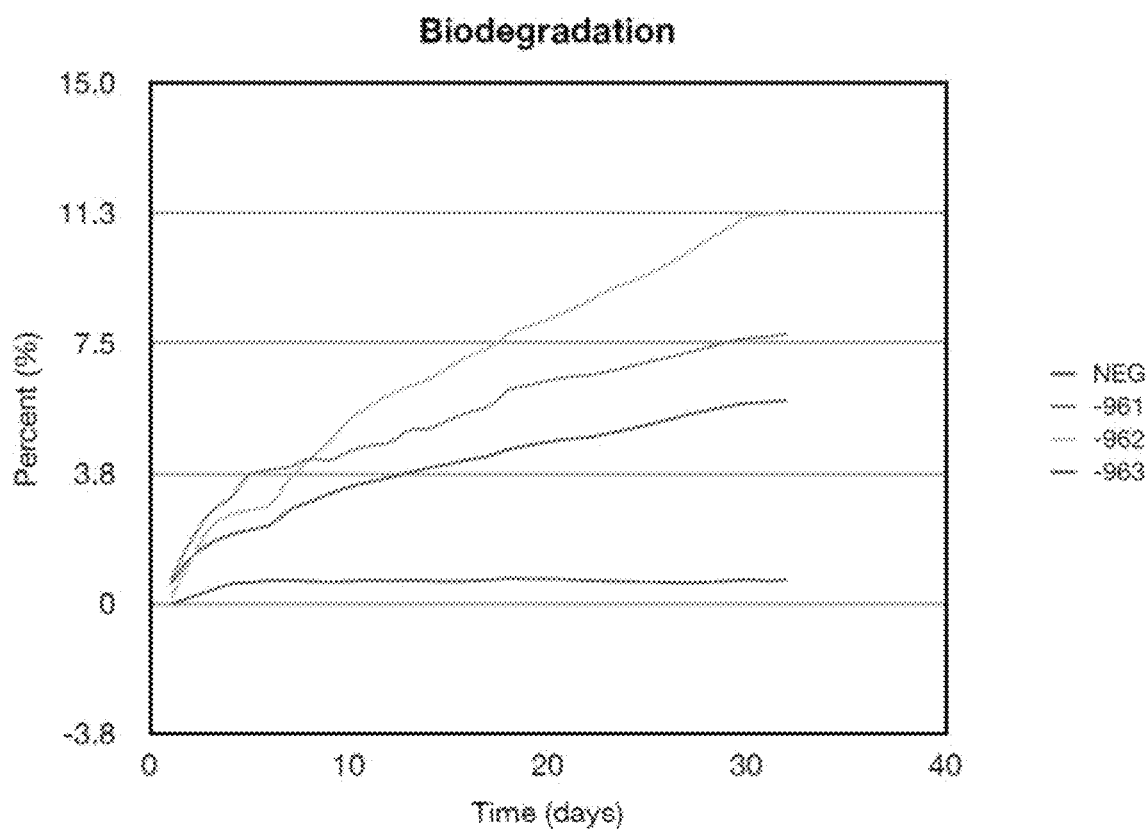

The results of biomethane potential testing for samples 961, 962, and 963 are shown in FIGS. 9A and 9B, and Table 13.

TABLE 13

|  | Inoculum | Negative | Positive | 961 | 962 | 963 |
|---|---|---|---|---|---|---|
| Cumulative Gas Volume (mL) | 729.6 | 962.5 | 8184.2 | 4286.4 | 5538.9 | 5796.5 |
| Percent CH$_4$ (%) | 18.4 | 19.3 | 35.4 | 27.1 | 31.8 | 0.0 |
| Volume CH$_4$ (mL) | 134.2 | 185.5 | 2898.2 | 1161.9 | 1759.5 | 0.0 |
| Mass CH$_4$ (g) | 0.10 | 0.13 | 2.07 | 0.83 | 1.26 | 0.00 |
| Percent CO$_2$ (%) | 49.9 | 44.0 | 44.5 | 42.5 | 42.7 | 40.9 |
| Volume CO$_2$ (mL) | 364.0 | 423.3 | 3639.8 | 1821.0 | 2363.9 | 2370.7 |
| Mass CO$_2$ (g) | 0.72 | 0.83 | 7.15 | 3.58 | 4.64 | 4.66 |
| Sample Mass (g) | 1,000 | 10 | 10 | 20.0 | 20.0 | 20 |
| Theoretical Sample Mass (g) | 0.0 | 8.6 | 4.2 | 17.1 | 17.1 | 17.1 |
| Biodegraded Mass (g) | 0.27 | 0.33 | 3.50 | 1.60 | 2.21 | 1.27 |
| Percent Biodegraded (%) |  | 0.7 | 76.7 | 7.8 | 11.3 | 5.9 |
| Adjusted Percent Biodegraded (%) |  | 0.9 | 100.0 | 10.1 | 14.8 | 7.6 |

The content and form of the samples tested can be found in Table 14. The starch-based polymer material was formed from 27% glycerin (99% pure) and 73% starch (exclusive of the water), and exhibited <about 1% water after manufacture. "Ecoflex" refers to the Ecoflex® plastic product available from BASF. Bio-B refers to a degradation enhancing additive available from BiologiQ. This example could be performed with a "green" PE, and similar results would be achieved.

TABLE 14

| Sample No. | Starch-Based Polymer (%) | Poly-ethylene (%) | Ecoflex (%) | Maleic Anhydride Modified LLDPE (%) | Additive (%) | Biodegradation-Enhancing Additive | Form |
|---|---|---|---|---|---|---|---|
| 957 | 100 | 0 | | 0 | 0 | — | Press-outs |
| 958 | 25 | 70 | | 5 | 0 | — | Film |
| 959 | 30 | 65 | | 5 | 0 | — | Film |
| 960 | 25 | 70 | | 5 | 0 | — | Bag |
| 961 | 25 | 69 | | 5 | 1 | Enso Restore | Film |
| 962 | 25 | 69.5 | | 5 | 0.5 | Bio-B | Film |
| 963 | 30 | 15 | 50 | 5 | 0 | — | Film |

Example 7

Figure 10A:
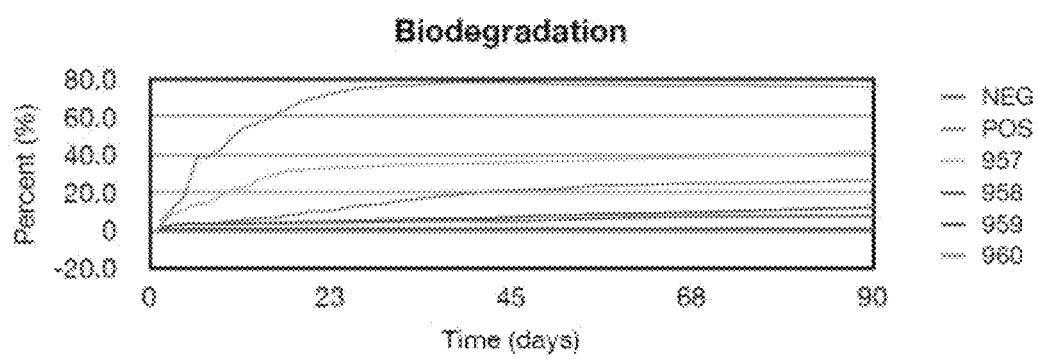
FIG. 10A and FIG. 10B illustrate percent biodegradation measured over 91 days according to biomethane potential testing of four samples formed according to techniques described herein.
Figure 10B:
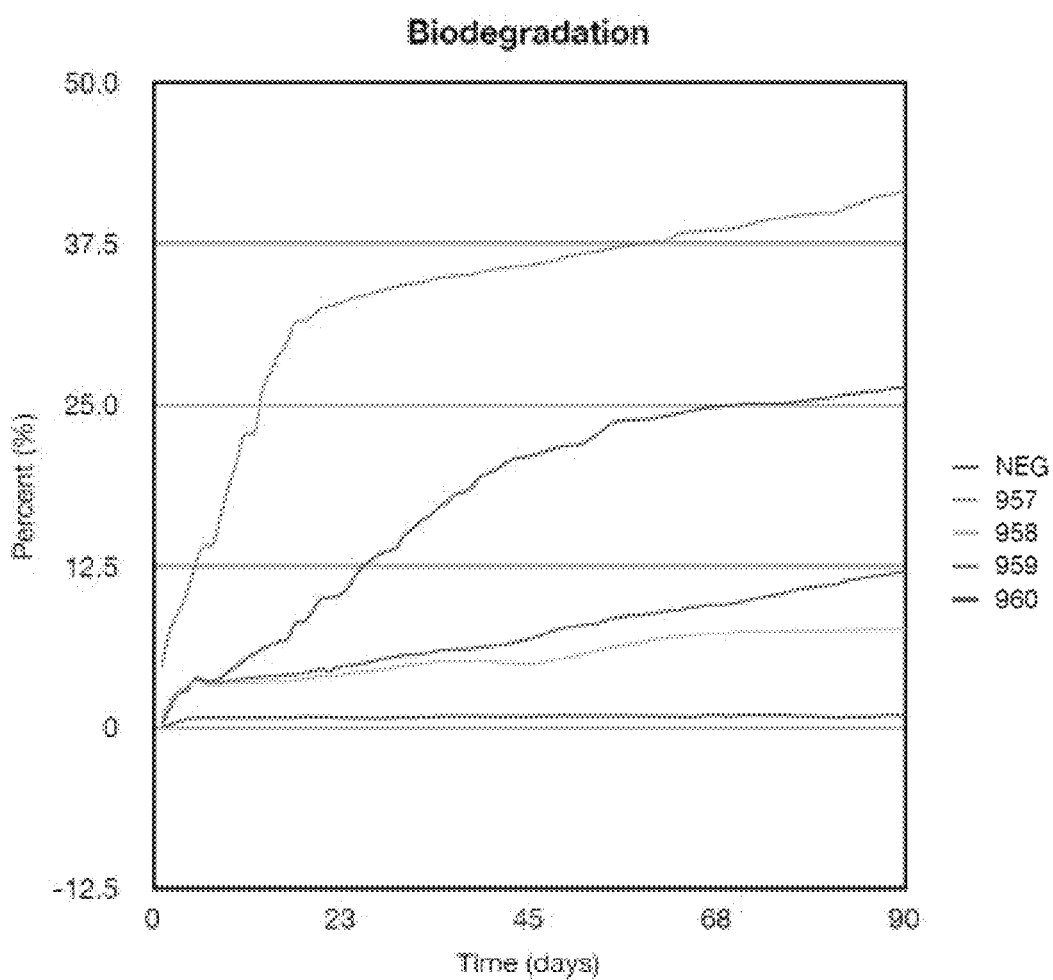

Seven samples were tested for 91 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The results of sample numbers 957, 958, 959, and 960 (compositions shown in Table 14) are shown in FIGS. 10A and 10B and in Table 15.

TABLE 15

|  | Inoculum | Negative | Positive | 957 | 958 | 959 | 960 |
|---|---|---|---|---|---|---|---|
| Cumulative Gas Volume (mL) | 811.3 | 1067.4 | 8211.9 | 18074.3 | 4045.8 | 5643.8 | 10915.8 |
| Percent CH$_4$ (%) | 22.3 | 23.2 | 35.5 | 34.7 | 32.7 | 39.4 | 42.2 |
| Volume CH$_4$ (mL) | 180.6 | 248.1 | 2914.5 | 6273.2 | 1321.2 | 2224.8 | 4608.8 |
| Mass CH$_4$ (g) | 0.13 | 0.18 | 2.08 | 4.48 | 0.94 | 1.59 | 3.29 |
| Percent CO$_2$ (%) | 48.4 | 43.1 | 44.4 | 42.6 | 42.1 | 39.7 | 40.3 |
| Volume CO$_2$ (mL) | 392.4 | 460.3 | 3649.4 | 7692.5 | 1703.2 | 2238.1 | 4401.5 |
| Mass CO$_2$ (g) | 0.77 | 0.90 | 7.17 | 15.11 | 3.35 | 4.40 | 8.65 |
| Sample Mass (g) | 1,000 | 10 | 10 | 20.0 | 20.0 | 20 | 20 |
| Theoretical Sample Mass (g) | 1.0 | 8.6 | 4.2 | 17.1 | 17.1 | 17.1 | 17.1 |
| Biodegraded Mass (g) | 0.31 | 0.38 | 3.52 | 7.48 | 1.62 | 2.39 | 4.83 |
| Percent Biodegraded (%) |  | 0.8 | 76.1 | 41.9 | 7.7 | 12.2 | 26.4 |
| Adjusted Percent Biodegraded (%) |  | 1.1 | 100.0 | 55.0 | 10.1 | 16.0 | 34.7 |

Figure 11A:
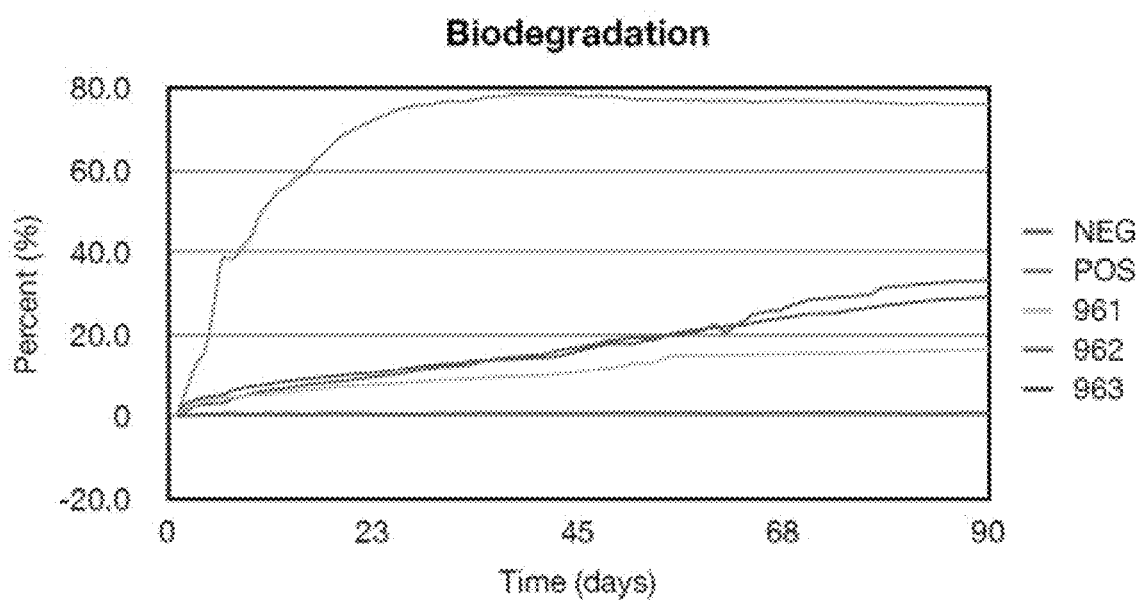
FIG. 11A and FIG. 11B illustrate percent biodegradation measured over 91 days according to biomethane potential testing of three additional samples formed according to techniques described herein.
Figure 11B:
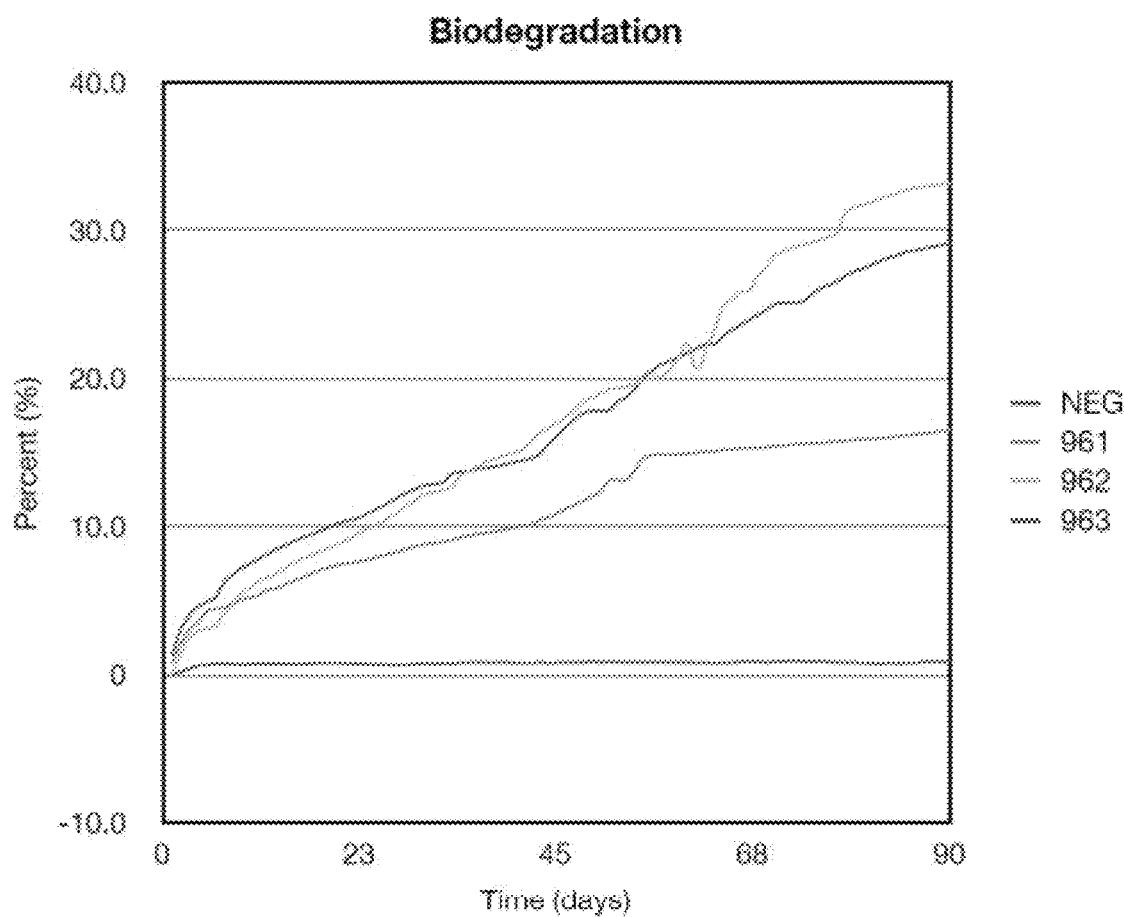

The biomethane potential testing results of sample numbers 961, 962, and 963 (compositions shown in Table 14) are shown in FIGS. 11A and 11B and in Table 16. This example could be performed with a "green" PE or other "green" polymeric material, and similar results would be achieved.

TABLE 16

|  | Inoculum | Negative | Positive | 961 | 962 | 963 |
|---|---|---|---|---|---|---|
| Cumulative Gas Volume (mL) | 811.3 | 1067.4 | 8211.9 | 7385.2 | 13059.8 | 11733.3 |
| Percent CH$_4$ (%) | 22.3 | 23.2 | 35.5 | 38.6 | 46.3 | 45.2 |
| Volume CH$_4$ (mL) | 180.6 | 248.1 | 2914.5 | 2849.9 | 6052.3 | 5302.2 |
| Mass CH$_4$ (g) | 0.13 | 0.18 | 2.08 | 2.04 | 4.32 | 3.79 |
| Percent CO$_2$ (%) | 48.4 | 43.1 | 44.4 | 40.9 | 39.8 | 39.6 |
| Volume CO$_2$ (mL) | 392.4 | 460.3 | 3649.4 | 3023.8 | 5197.1 | 4643.4 |
| Mass CO$_2$ (g) | 0.77 | 0.90 | 7.17 | 5.94 | 10.21 | 9.12 |
| Sample Mass (g) | 1,000 | 10 | 10 | 20.0 | 20.0 | 20 |
| Theoretical Sample Mass (g) | 0.0 | 8.6 | 4.2 | 17.1 | 17.1 | 17.1 |
| Biodegraded Mass (g) | 0.31 | 0.38 | 3.52 | 3.15 | 6.03 | 5.33 |
| Percent Biodegraded (%) |  | 0.8 | 76.1 | 16.6 | 33.4 | 29.3 |
| Adjusted Percent Biodegraded (%) |  | 1.1 | 100.0 | 21.8 | 43.9 | 38.5 |

Example 8

Figure 12A:
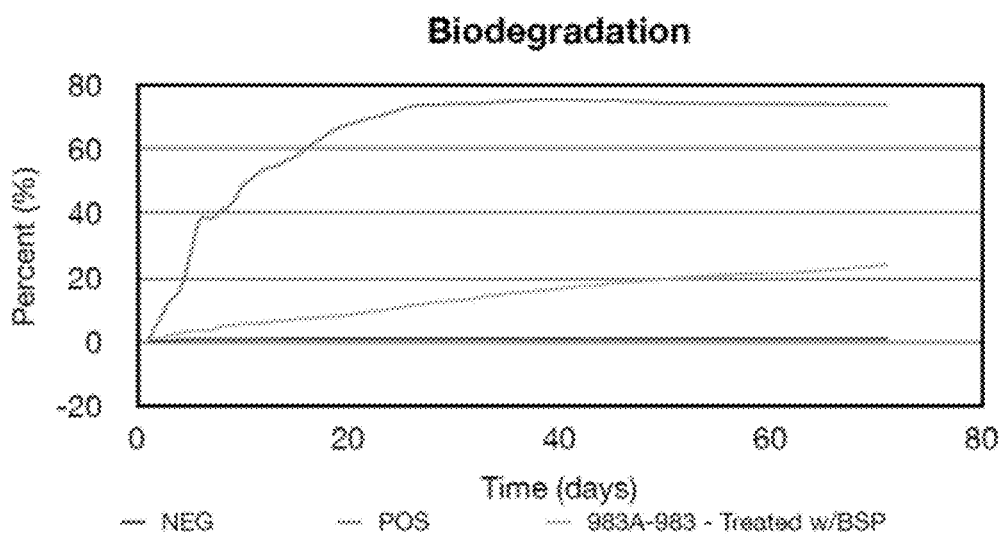
FIG. 12A and FIG. 12B illustrate percent biodegradation measured over 71 days according to biomethane potential testing of one sample formed according to techniques described herein.
Figure 12B:
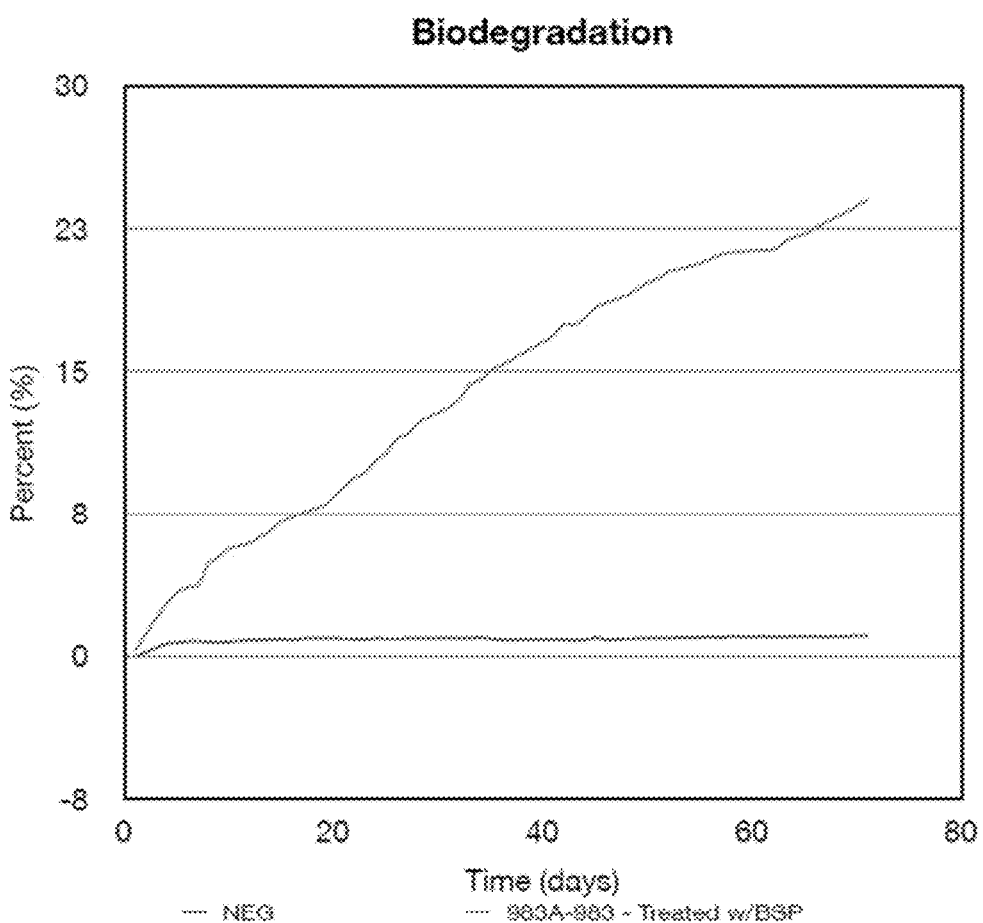

A film was tested for 71 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The film contained 25% starch-based polymer material (with 27% of the starch-based polymer material being formed from glycerin (99% pure) and 73% of the starch-based polymer material being formed from starch, exclusive of the water), and exhibited <about 1% water after manufacture). In addition to the 25% by weight starch-based polymer, the film also included 1% Biosphere® additive; 5% maleic anhydride compatibilizer; and 69% modified LLDPE. The results of the biomethane potential testing of sample number 983 are shown in FIGS. 12A and 12B and in Table 17. This example could be performed with a "green" PE and similar results would be achieved.

TABLE 17

|  | Inoculum | Negative | Positive | 983 |
|---|---|---|---|---|
| Cumulative Gas Volume (mL) | 1021.1 | 1326.5 | 8225.8 | 10104.5 |
| Percent $CH_4$ (%) | 26.3 | 27.4 | 35.5 | 41.7 |
| Volume $CH_4$ (mL) | 268.4 | 363.3 | 2922.7 | 4214.4 |
| Mass $CH_4$ (g) | 0.19 | 0.26 | 2.09 | 3.01 |
| Percent $CO_2$ (%) | 47.6 | 42.3 | 44.4 | 41.9 |
| Volume $CO_2$ (mL) | 185.7 | 561.2 | 3654.2 | 4230.1 |
| Mass $CO_2$ (g) | 0.95 | 1.10 | 7.18 | 8.31 |
| Sample Mass (g) | 1,000 | 10 | 10 | 20.0 |
| Theoretical Sample Mass (g) | 0.0 | 8.6 | 4.2 | 17.1 |
| Biodegraded Mass (g) | 0.40 | 0.50 | 3.52 | 4.52 |
| Percent Biodegraded (%) |  | 1.1 | 73.9 | 24.0 |
| * Adjusted Percent Biodegraded (%) |  | 1.4 | 100.0 | 32.5 |

Example 9

Eight samples (sample numbers 957-963 and 983; compositions shown in Examples 5 and 7) were tested for 91 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The results are shown in Table 18. The results shown in Table 18 indicate that samples formed from a mixture of a starch-based polymer and a polyolefin based polymer biodegrades an amount that is greater than the amount of the starch-based polymer. In some cases, the sample that biodegraded more than an amount of the starch-based polymer present was free of a biodegradation enhancing additive. Such results are surprising, and particularly advantageous. This example could be performed with a "green" PE or other "green" polymeric material, and similar results would be achieved.

TABLE 18

| | % Degraded | | | | |
|---|---|---|---|---|---|
| Item # | 32 Days | 42 Days | 62 Days | 71 Days | 91 Days |
| 957 | 37.50% |  | 48.40% |  | 55.00% |
| 958 | 5.40% |  | 8.10% |  | 10.10% |
| 959 | 2.90% |  | 11.30% |  | 16.00% |
| 960 | 16.00% |  | 30.00% |  | 34.70% |
| 961 | 10.10% |  | 19.40% |  | 21.80% |
| 962 | 14.80% |  | 26.40% |  | 43.90% |
| 963 | 7.60% |  | 28.10% |  | 38.50% |
| 983 |  | 19.20% |  | 32.50% |  |

Example 10

Four samples (sample numbers 100, 200, 300, and 400) were tested for compostability using the ASTM D-6400 standard at the time of filing of this patent application. The ASTM D-6400 standard specifies a phytotoxicity testing procedure, indicates that the biodegradation of articles is to be measured according to the ASTM D-5338-11 test, and that an elemental analysis is to utilize Table 3 of 40 C.P.R. Part 503.13. The compositions of the samples and the biodegradation portion of the compostability test results are shown in Table 19. The starch-based polymeric material was formed from a blend of starches including 90% corn starch and 10% potato starch. The first polymeric material was a linear low-density polyethylene produced using a metallocene catalyst. A "green" PE material could have been used, and would provide similar results. The compatibilizer for samples 100 and 200 was a Bynel® compatibilizer from DuPont® and the compatibilizer for samples 300 and 400 was an Amplify compatibilizer from Dow®. The biodegradation enhancing additive for samples 100 and 200 was from Biosphere® and the biodegradation enhancing additive for sample 300 was from ENSO. The second polymeric material was Ecoflex® from BASF, which is a fossil raw materials-based plastic that is compostable according to the ASTM D-6400 standard. The 98 day biodegradability results indicated the test chamber carbon dioxide measurement as a percentage of a theoretical maximum amount of carbon dioxide for the sample after 98 days. The 180 day biodegradability results indicated the test chamber carbon dioxide measurement as a percentage of a theoretical maximum amount of carbon dioxide after 180 days.

Figure 13A:
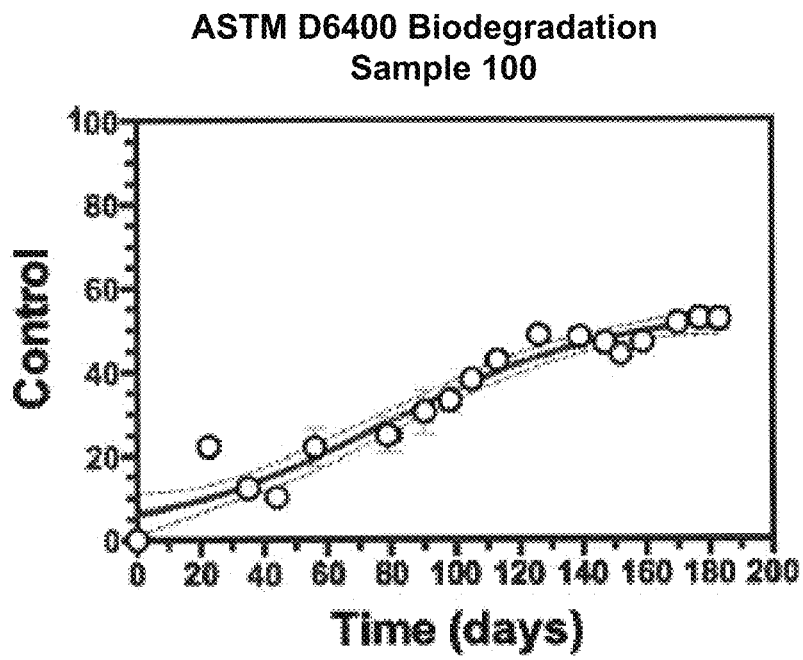
FIG. 13A and FIG. 13B show the results of the biodegradation portion of the ASTM D-6400 test performed according to ASTM D-5338 for a first sample and a second sample formed according to techniques described herein.
Figure 13B:
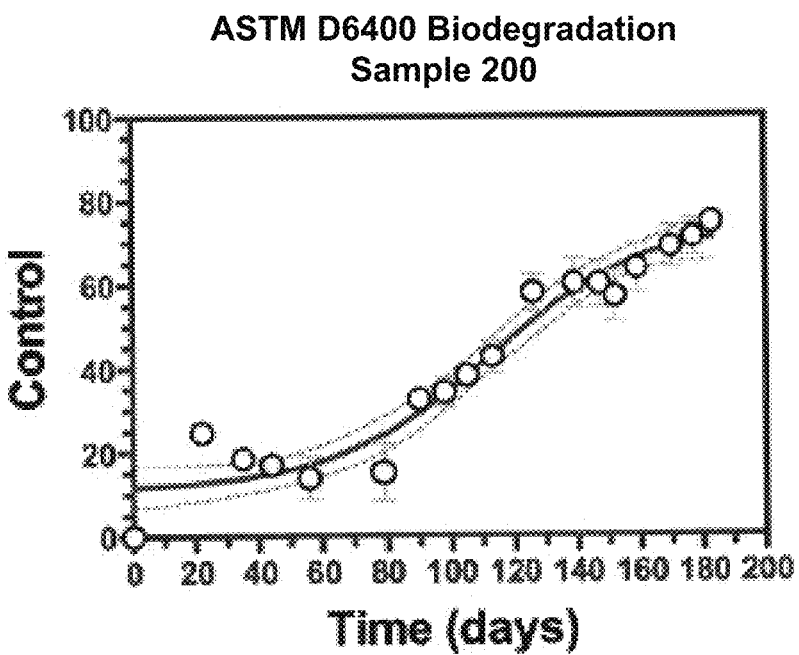
Figure 14A:
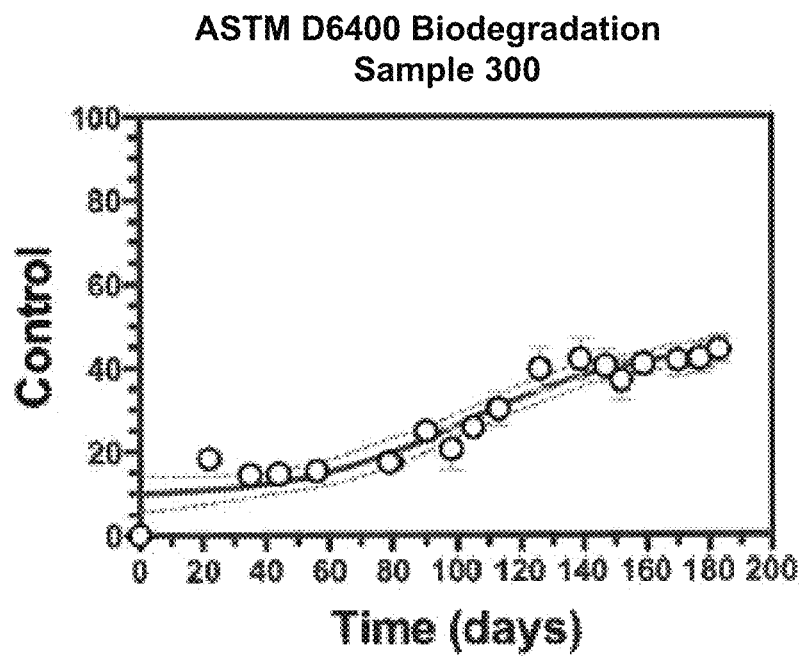
FIG. 14A and FIG. 14B show the results of the biodegradation portion of the ASTM D-6400 test performed according to ASTM D-5338 for a third sample and a fourth sample formed according to techniques described herein.
Figure 14B:
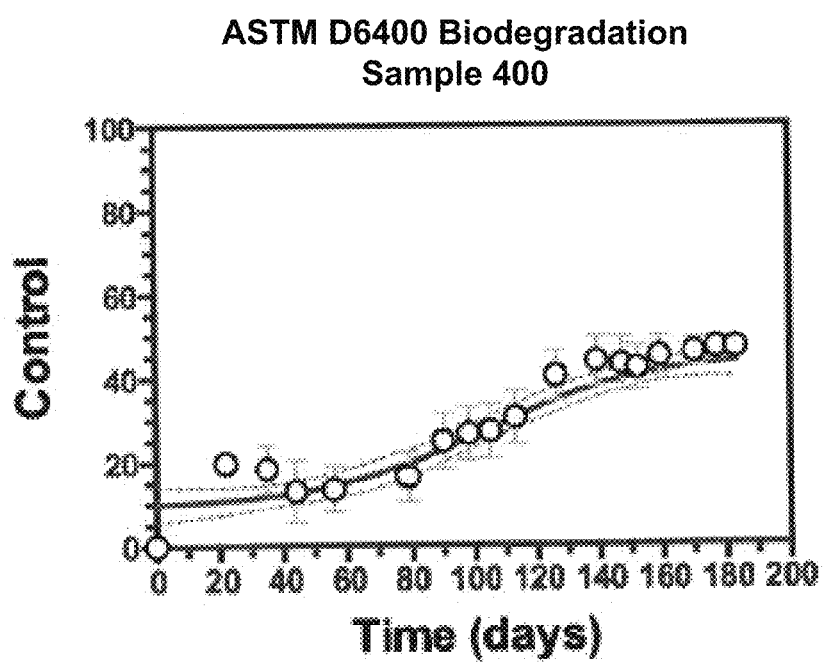

FIG. 13A shows the results of the biodegradation portion of the ASTM D-6400 test performed according to ASTM D-5338 for sample 100. FIG. 13B shows the results of the biodegradation portion of the ASTM D-6400 test performed according to ASTM D-5338 for sample 200. FIG. 14A shows the results of the biodegradation portion of the ASTM D-6400 test performed according to ASTM D-5338 for sample 300 and FIG. 14B shows the results of the biodegradation portion of the ASTM D-6400 test performed according to ASTM D-5338 for sample 400. The results of the biodegradation portion of the ASTM D-6400 test indicate that, after 180 days, an amount of first polymeric material in samples 100, 300, and 400 has degraded partially because the amount of carbon dioxide measured in the test chamber is greater than the percentage of the starch-based polymeric material included in these samples. Thus, at least a portion of the remainder of the carbon dioxide emissions is due to the degradation of the first polymeric material. This observation includes sample 400, which is free of a biodegradation enhancing additive. Such a result is surprising and advantageous. This example could be performed with a "green" PE or other "green" polymeric material, and similar results would be achieved.

TABLE 19

|  | Sample No. 100 | Sample No. 200 | Sample No. 300 | Sample No. 400 |
|---|---|---|---|---|
| Starch-Based Polymeric Material | 30% | 30% | 40% | 25% |
| First Polymeric Material | 64% | 15% | 50% | 70% |
| Compatibilizer | 5% | 5% | 5% | 5% |
| Biodegradation Enhancing Additive | 1% | 1% | 5% | 0% |
| Second Polymeric Material | 0% | 49% | 0% | 0% |
| Film Thickness (mm) | 0.34 | 0.34 | — | 0.44 |
| 98 Day Biodegradability Results | 33% | 29% | 20% | 22% |
| 180 Day Biodegradability Results | 55% | 74% | 45% | 48% |

Example 11

Figure 15:
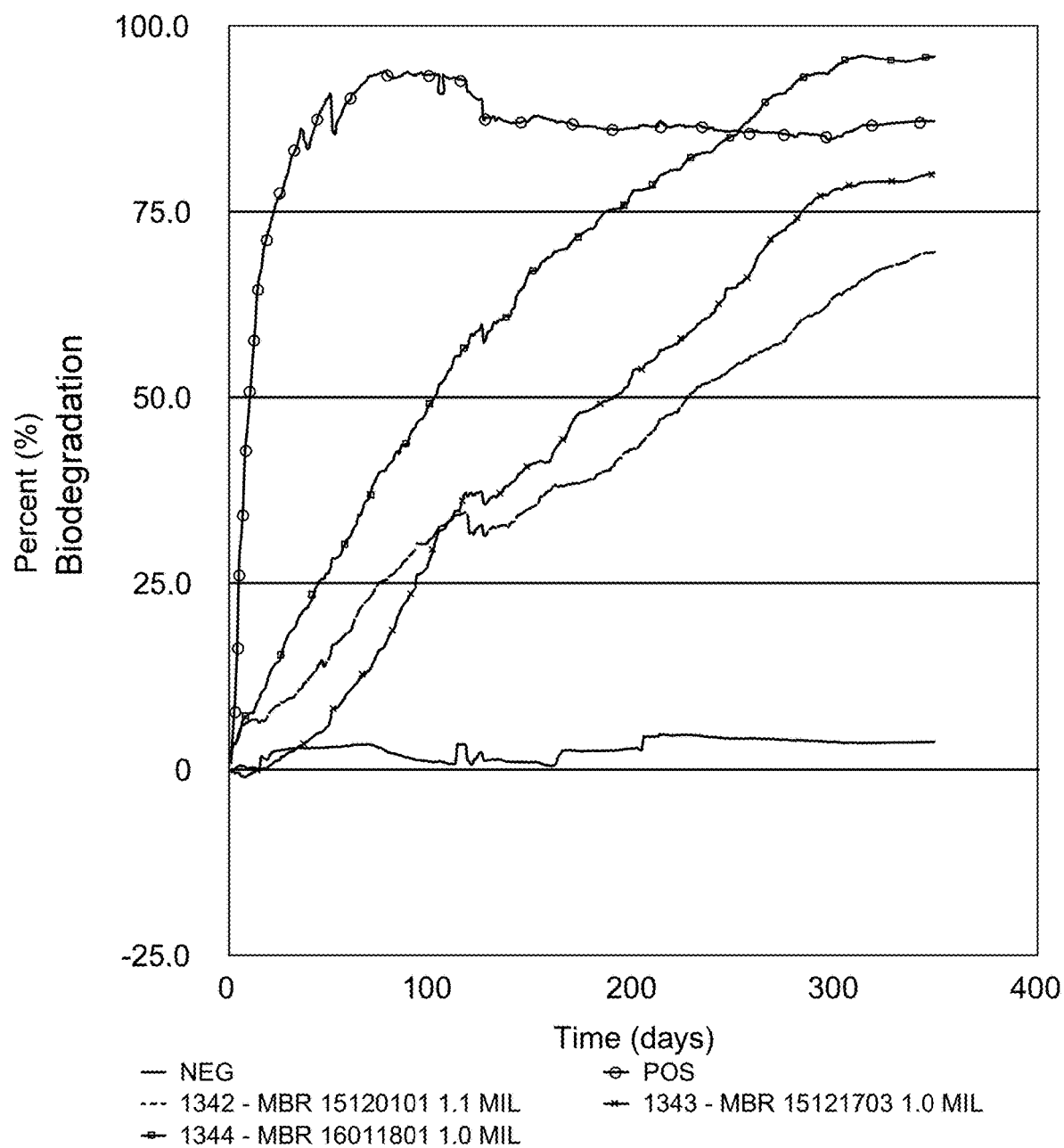
FIG. 15 shows percent biodegradation measured over 349 days according to testing conducted under ASTM D-5511 for three samples formed according to the present disclosure.

Three samples were tested for 349 days to determine biodegradability characteristics according to ASTM D-5511. The test was intended to replicate the conditions of a full-scale anaerobic digester (landfill). The results of the three samples (referred to as 1342, 1343, and 1344) are shown in FIG. 15 and in Table 20. Sample 1342 was formed from 30% ESR (the starch-based polymeric material), 67% PBAT, and 3% compatibilizer, and had a thickness of 1.1 mil. Sample 1343 was formed from 27.5% ESR, 70% PBAT and 2.5% compatibilizer, and had a thickness of 1.0 mil. Sample 1344 was formed from 40% ESR, 56% LLDPE and 4% compatibilizer, and had a thickness of 1.0 mil.

TABLE 20

|  | Inoculum | Negative | Positive | 1342 | 1343 | 1344 |
|---|---|---|---|---|---|---|
| Cumulative Gas Volume (mL) | 4064.3 | 4898.8 | 12330.2 | 18429.0 | 20233.7 | 31171.1 |
| Percent $CH_4$ (%) | 43.2 | 43.6 | 41.4 | 48.8 | 53.7 | 51.7 |
| Volume $CH_4$ (mL) | 1757.0 | 2135.1 | 5101.0 | 8992.6 | 10865.0 | 16106.6 |
| Mass $CH_4$ (g) | 1.26 | 1.53 | 3.64 | 6.42 | 7.76 | 11.5 |
| Percent $CO_2$ (%) | 40.4 | 37.8 | 41.9 | 35.5 | 35.7 | 38.0 |
| Volume $CO_2$ (mL) | 1643.0 | 1852.9 | 5160.5 | 6547.5 | 7230.7 | 11838.7 |
| Mass $CO_2$ (g) | 3.23 | 3.64 | 10.14 | 12.86 | 14.20 | 23.25 |
| Sample Mass (g) | 10 | 10 | 10 | 20.0 | 20.0 | 20 |
| Theoretical Sample Mass (g) | 0.0 | 8.6 | 4.2 | 9.8 | 9.8 | 13.7 |
| Biodegraded Mass (g) | 1.82 | 2.14 | 5.50 | 8.33 | 9.69 | 14.97 |
| Percent Biodegraded (%) |  | 3.7 | 87.1 | 66.4 | 80.2 | 95.8 |

FIG. 15 shows that after 204 days, the negative control showed 2.5% degradation, the positive control showed 86.5% degradation, sample 1342 showed 43.3% degradation, sample 1343 showed 53.9% degradation, and sample 1344 showed 77.2% degradation. At 349 days, the degradation values are as shown in Table 20.

The biodegradation after 349 days is particularly excellent. For example, while samples including PBAT (1342 and 1343) show very good biodegradation, with the percent biodegraded being far greater than the fraction of the starch-based polymeric material included in the film, sample 1344 is even more surprising, showing nearly 96% biodegradation (even higher than the positive control), where the non-starch-based polymeric material is polyethylene, which under normal circumstances is not biodegradable (e.g., see the negative control, in Table 20 which was 100% polyethylene). Such biodegradation results are remarkable, and particularly advantageous. This example could be performed with a "green" PE, "green" PBAT, or other "green" polymeric material, and similar results would be achieved.

Example 12

Figure 16:
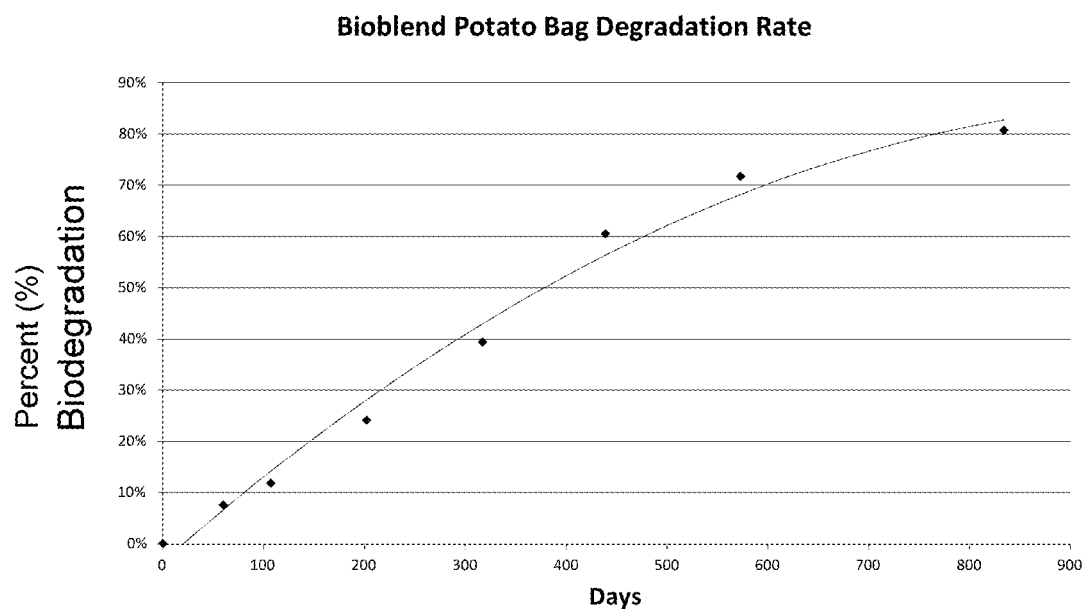
FIG. 16 shows percent biodegradation measured over 843 days according to testing conducted under ASTM D-5526 for potato bags made with 25% ESR, 70% PE, and 5% compatibilizer under simulated landfill conditions.

Potato packaging bags made with a blend of 25% ESR, 70% LLDPE and 5% compatibilizer were tested for anaerobic biodegradation after 60 days, 107 days, 202 days, 317 days, 439 days, 573 days, and 834 days according to ASTM D-5526. The test was intended to replicate the conditions of a full-scale anaerobic digester (landfill). The test was conducted under various conditions, with an inoculum having about 35%, 45%, and 60% organic solids with the balance being water. The results for the inoculum including 35% organic solids (and 65% water) are shown in FIG. 16 and Table 21A. Table 21B shows results for other inoculum values, and for other samples. The potato bags had a thickness of 1.35 mils. These bags are referred to as sample 1072.

TABLE 21A

| 35% Solids @ 60 Days | 35% Solids @ 107 Days | 35% Solids @ 202 Days | 35% Solids @ 317 Days | 35% Solids @ 439 Days | 35% Solids @ 573 Days | 35% Solids @ 834 Days |
|---|---|---|---|---|---|---|
| 7.60% | 11.80% | 24.10% | 39.40% | 60.50% | 71.70% | 80.70% |

The potato bags made with 25% ESR, and 70% LLDPE showed a remarkable 81% biodegradation over 834 days under simulated landfill conditions. The ESR is homogeneously blended with the polyethylene, and advantageously results in the long carbon chains of the polyethylene being broken up, and digested by the same microorganisms that consume the starch-based polymeric ESR material. Such results show that the entire bag, including the polyethylene is being biodegraded into carbon dioxide, methane, and water. Such results are surprising and particularly advantageous.

The testing conducted with 45% organic solids and 60% organic solids also showed results in which the percent of biodegradation exceeded the percent of ESR included in the potato bag. Tests were also run with similar potato bags including 1% of a biodegradation enhancing additive (sample 1073), and other similar potato bags including Ecoflex® compostable resin, and metallocene LLDPE (sample 1075). This example could be performed with a "green" PE or other "green" polymeric material, and similar results would be achieved.

TABLE 21B

|  | Negative Control | | | Positive Control | | |
|---|---|---|---|---|---|---|
| Percent Solids | 60% | 45% | 35% | 60% | 45% | 35% |
| Percent Biodegraded @ 834 days | 1.20% | 0.5% | 1.5% | 91.2% | 91.2% | 91.4% |

|  | Sample 1072 | | | Sample 1073 | | |
|---|---|---|---|---|---|---|
| Percent Solids | 60% | 45% | 35% | 60% | 45% | 35% |
| Percent Biodegraded @ 834 days | 58.3% | 67.7% | 80.7% | 54.5% | 67.9% | 80.3% |

|  | Sample 1075 | | |
|---|---|---|---|
| Percent Solids | 60% | 45% | 35% |
| Percent Biodegraded @ 834 days | 72.7% | 83.3% | 86.1% |

Example 13

Figure 17:
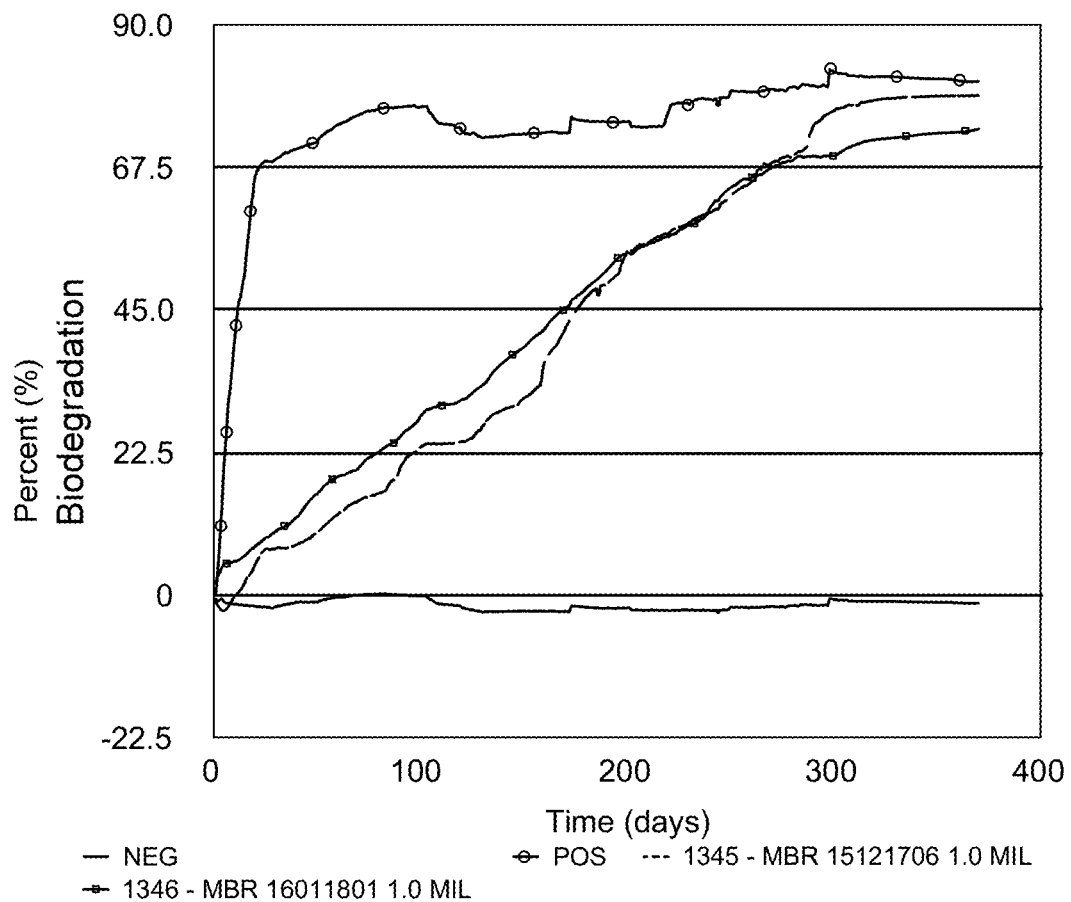
FIG. 17 shows percent biodegradation measured over 370 days according to testing conducted under ASTM D-5338 for various samples made according to the present disclosure, as well as comparative controls.

Films made with a blend of ESR and LLDPE were tested for anaerobic biodegradation after 201 days and 370 days according to ASTM D-5338. The conditions were meant to simulate aerobic digestion and/or industrial compost conditions. The tested films are labeled 1345 and 1346 in Table 22 and FIG. 17, which show the results after 370 days. At 201 days, samples 1345 and 1346 respectively showed adjusted percent biodegraded values of 74.2% and 72.4%, while the negative control showed −3.3% and the positive control showed 100%. FIG. 17 plots actual % biodegradation. Sample 1345 included 25% ESR, 72.5% LLDPE, and 2.5% compatibilizer. Sample 1346 included 40% ESR, 56% LLDPE, and 4% compatibilizer. Both films had a thickness of 1.0 mil. This example could be performed with a "green" PE or other "green" polymeric material, and similar results would be achieved.

TABLE 22

|  | Inoculum | Negative | Positive | 1345 | 1346 |
|---|---|---|---|---|---|
| Cumulative Gas Volume (mL) | 3168.2 | 2864.3 | 10740.0 | 27603.2 | 24364.9 |
| Percent CO$_2$ (%) | 81.4 | 82.6 | 83.5 | 89.3 | 87.8 |
| Volume CO$_2$ (mL) | 2577.8 | 2366.4 | 8965.3 | 24638.1 | 21400.0 |
| Mass CO$_2$ (g) | 5.06 | 4.65 | 17.61 | 48.40 | 42.04 |
| Sample Mass (g) | 1000 | 10 | 10 | 20.0 | 20.0 |
| Theoretical Sample Mass (g) | 0.0 | 8.6 | 4.2 | 15.0 | 13.7 |
| Biodegraded Mass (g) | 1.38 | 1.27 | 4.80 | 13.20 | 11.46 |

TABLE 22-continued

|  | Inoculum | Negative | Positive | 1345 | 1346 |
|---|---|---|---|---|---|
| Percent Biodegraded (%) | −1.3 | | 81.1 | 78.8 | 73.5 |
| Adjusted Percent Biodegraded (%) | −1.6 | | 100.0 | 97.2 | 90.7 |

Example 14

Figure 18:
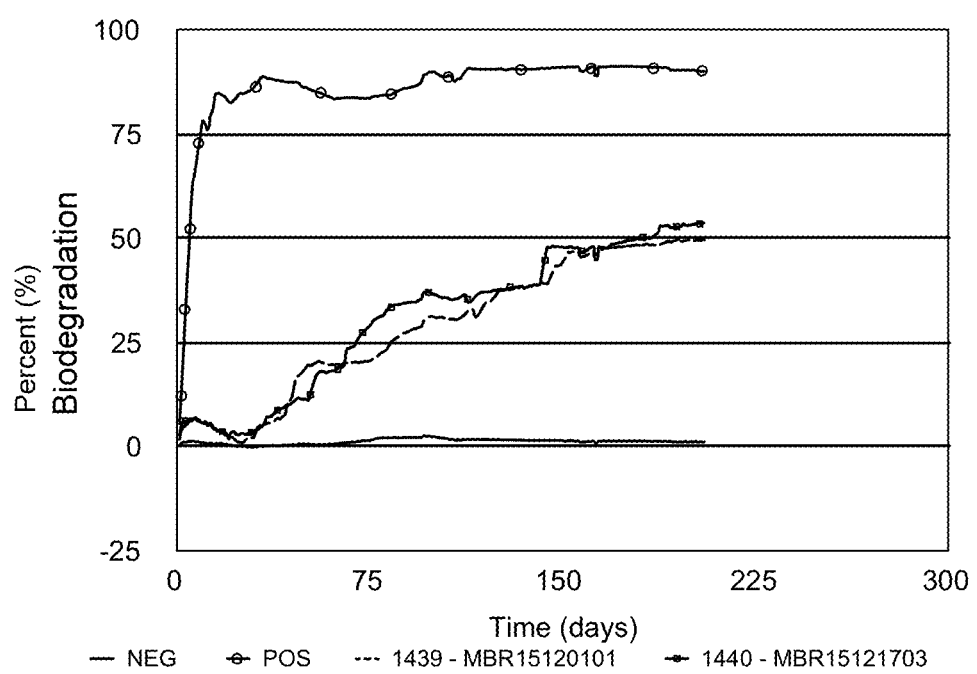
FIG. 18 shows percent biodegradation measured over 205 days according to ASTM D-6691, meant to simulate marine conditions, for various samples made according to the present disclosure, as well as comparative controls.

Films made with a blend of ESR and PBAT were tested for anaerobic biodegradation after 205 days according to ASTM D-6691, which is meant to simulate marine conditions. The tested films are labeled 1439 and 1440 in Table 23 and FIG. 18. At 205 days, samples 1439 and 1440 respectively showed adjusted percent biodegraded values of 49.6% and 53.6%. Sample 1439 included 30% ESR, 67% PBAT, and 3% compatibilizer. Sample 1440 included 27% ESR, 70% PBAT, and 2.5% compatibilizer. Sample film 1439 had a thickness of 1.1 mil, and sample film 1440 had a thickness of 1.0 mil.

TABLE 23

|  | Inoculum | Negative | Positive | 1439 | 1440 |
|---|---|---|---|---|---|
| Cumulative Gas Volume (mL) | 22.0 | 25.4 | 86.7 | 61.6 | 65.2 |
| Percent CO$_2$ (%) | 91.8 | 85.4 | 88.7 | 91.7 | 91.3 |
| Volume CO$_2$ (mL) | 20.2 | 21.7 | 76.9 | 56.4 | 59.5 |
| Mass CO$_2$ (g) | 0.040 | 0.043 | 0.151 | 0.111 | 0.117 |
| Sample Mass (g) |  | 0.080 | 0.080 | 0.080 | 0.080 |
| Theoretical Sample Mass (g) |  | 0.069 | 0.034 | 0.039 | 0.039 |
| Biodegraded Mass (g) | 0.011 | 0.012 | 0.041 | 0.030 | 0.032 |
| Percent Biodegraded (%) |  | 1.2 | 90.0 | 49.6 | 53.6 |

The films showed a greater degree of biodegradation over 205 days relative to the percentage of ESR included in the film. In other words, the long carbon chains of the polymer are being broken up, and digested by the same microorganisms that consume the starch-based polymeric ESR material. This example could be performed with a "green" PBAT or other "green" polymeric material, and similar results would be achieved.

Example 15

Additional manufactured films were tested for biodegradability. Table 24 below summarizes the results of such testing, some of which are described in detail above (e.g., Examples 13 and 14). Such testing shows excellent biodegradability results across a wide range of fractions of carbohydrate-based polymeric materials, and different polymeric materials, under various simulated conditions (e.g., landfills, composting, marine environments). These examples could be performed with a "green" PE, "green" PP, bioPET, "green" PBAT, or other "green" polymeric material, and similar results would be achieved.

TABLE 24

| | Sample 1072 | Sample MBR 16011801 | Sample MBR 15121706 | Sample MBR 16011801 | Sample MBR 16070601 | Sample MBR 15120101 | Sample MBR 15121703 |
|---|---|---|---|---|---|---|---|
| Test Condition | Landfill ASTM D-5526 | Landfill ASTM D-5511 | Compost ASTM D-5338 | Compost ASTM D-5338 | Compost ASTM D-5338 | Marine ASTM D-6691 | Marine ASTM D-6691 |
| ESR % | 25% | 40% | 25% | 40% | 40% | 30% | 27% |
| Compatibilizer + PE % | 75% | 60% | 75% | 60% | 11% | 3% | 3% |
| PBAT % | 0% | 0% | 0% | 0% | 49% | 67% | 70% |
| Thickness | 1.35 mil | 1 mil | 1 mil | 1 mil | 1.5 mil | 1 mil | 1 mil |
| Days | 573 | 204 | 201 | 201 | 59 | 205 | 205 |
| % Degraded | 71.1% | 77.2% | 74.2% | 72.4% | 96.9% | 49.6% | 53.6% |

Example 16

Films were manufactured from a blend of bio-polyethlene (sourced from Braskem), ESR, and a Bynel® compatibilizer. Once formed, the resulting films were tested for dart strength (e.g., according to ASTM D-1709). Films were blown at various thicknesses, from 0.5 mil up to 2 mils, and at various percentages of a starch-based polymeric material (ESR) ranging from 0% to 35% ESR by weight. The results are shown in FIGS. 19A and 19B.

Figure 19A:
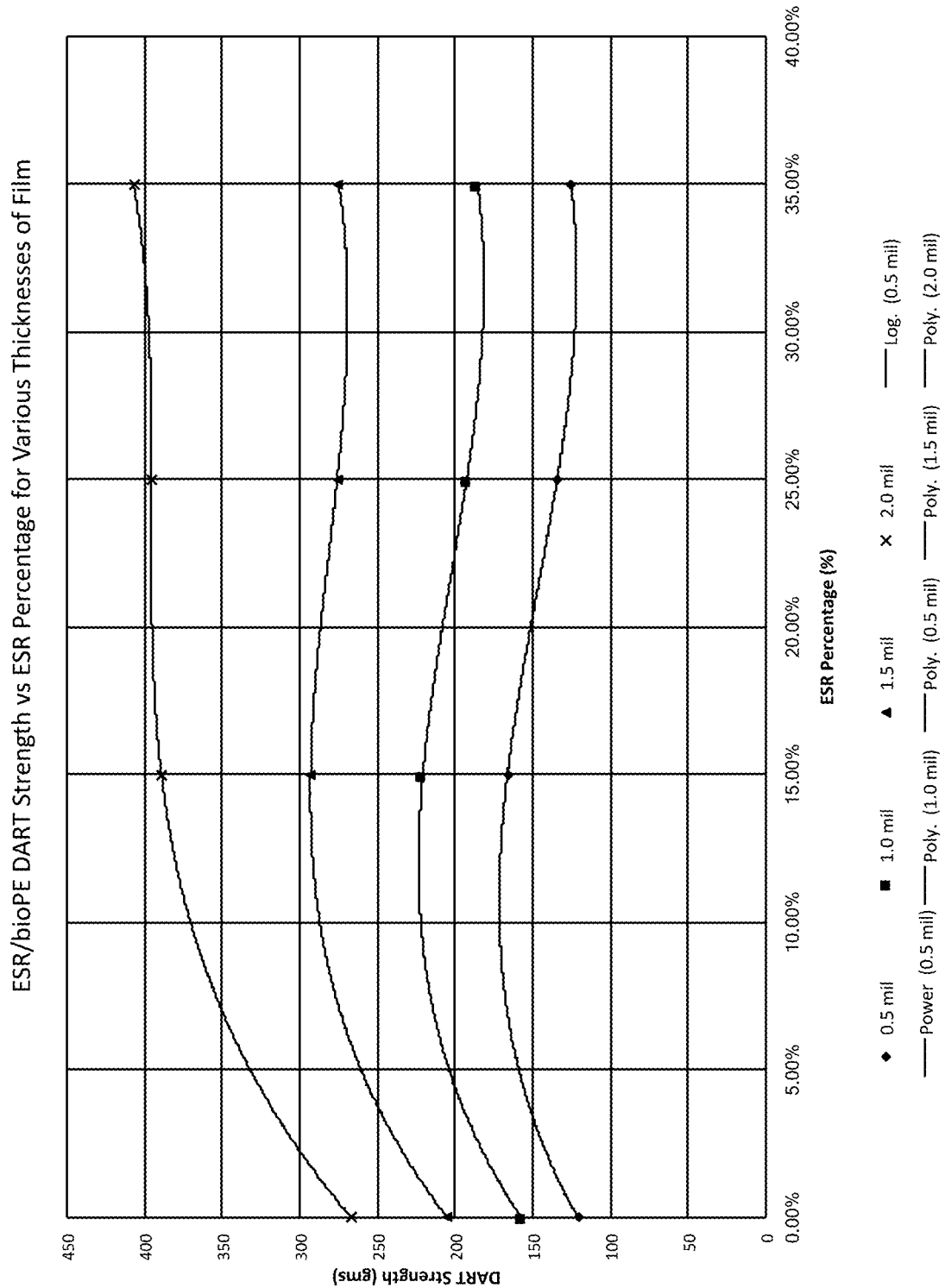
FIG. 19A shows dart strength for films made with a blend of ESR carbohydrate-based polymeric material and a biopolyethylene or "green" PE. Dart strength is shown as a function of ESR percentage, for films of various thicknesses.
Figure 19B:
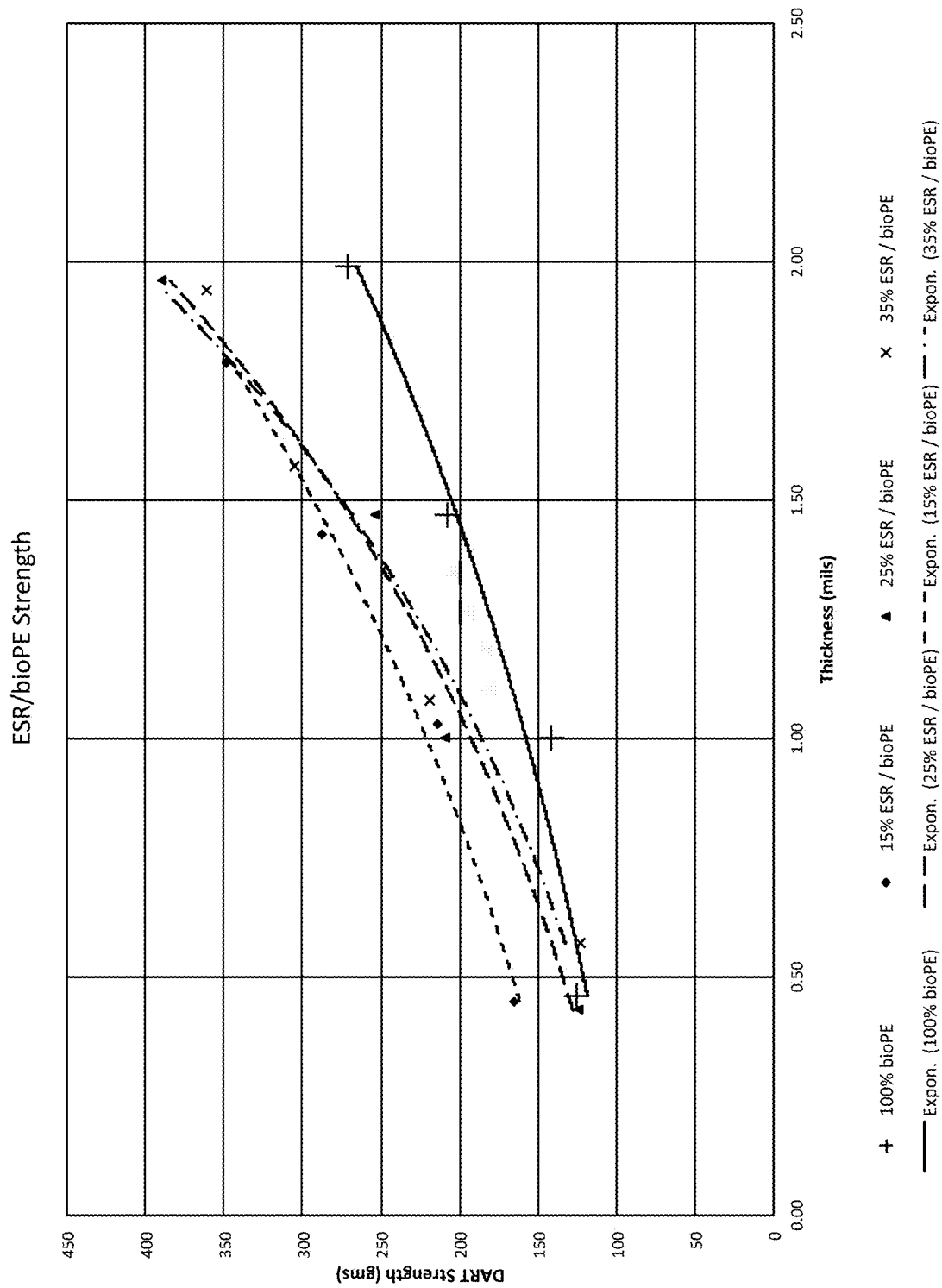
FIG. 19B presents similar data as FIG. 19A, but shows dart strength as a function of film thickness, for blends including varying percentages of ESR.

As is apparent from FIG. 19A, the biopolyethyelene alone (no ESR) provides a dart strength of about 120 g for a thickness of 0.5 mil, a dart strength of about 155 g for a thickness of 1 mil, a dart strength of about 200 g for a thickness of 1.5 mils, and a dart strength of about 270 g for a thickness of 2 mils. The approximate dart strengths are shown in Table 25A. Table 25B shows percentages of strength increases as compared to the pure biopolyethylene film. It is readily apparent that there are increases for all thicknesses, and all tested percentages of ESR in the film. The increases in strength are particularly high as the films become thicker (i.e., the percentage increase is even more dramatic for thicker films as compared to thinner films).

TABLE 25A

| Dart Strength (g) | | | | |
|---|---|---|---|---|
| ESR % | 0.5 mil | 1 mil | 1.5 mils | 2 mils |
| 0% | 120 g | 160 g | 200 g | 270 g |
| 15% | 165 g | 225 g | 290 g | 385 g |
| 25% | 135 g | 195 g | 275 g | 395 g |
| 35% | 125 g | 190 g | 275 g | 410 g |

TABLE 25B

| Percent Increase in Dart Strength (%) | | | | |
|---|---|---|---|---|
| ESR % | 0.5 mil | 1 mil | 1.5 mils | 2 mils |
| 0% | — | — | — | — |
| 15% | 38% | 41% | 45% | 43% |
| 25% | 13% | 22% | 38% | 46% |
| 35% | 4% | 19% | 38% | 70% |

In forming and testing such films, Applicant observed that the results of increased strength generally match up well with the results seen using synthetic petrochemical polyethylenes. As noted above, it was observed that when using the biopolyethylene material in the blend, the improvement in strength increased more rapidly, as the thickness increased (i.e., the percentage increase is most dramatic for thicker films as compared to thinner films).

It was also observed that a sweetspot for starch-based ESR with the biopolyethylene may be at about 15%, rather than the about 25% observed with petrochemical sourced polyethylene. Nevertheless, increases in strength were similar observed when blending ESR with either base resin.

Finally, the films formed according to Example 16 include far more than 40% biocontent, which is a particular advantage of the present invention, as both the base resin (e.g., any "green" sustainable polymeric material such as those described herein) and the carbohydrate-based or starch-based ESR material are derived from sustainable materials. The only component in the films that did not count towards biocontent is the compatibilizer (and where available, a sustainable compatibilizer could conceivably be used). The biocontent may thus be at least 40%, at least 45%, at least 50%, at least 55%, at least 60%, at least 65%, at least 70%, at least 75%, at least 80%, at least 85%, at least 90%, or even at least 95% by weight of the film or other product. The films of Example 16 consisted of biocontent, other than the Bynel® compatibilizer, such that they included greater than 90% biocontent by weight.

Finally, the films of Example 16 are substantially fully biodegradable, in a similar manner as described for the various other tested polyethylenes of Examples 6-15. The present invention thus provides very high biocontent polymer films and other products, which are not only sustainable, but also biodegradable.

IV. Conclusion

In closing, although the various implementations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

In closing, it is to be understood that the embodiments of the inventive features disclosed herein are illustrative of the principles of the inventive features. Other modifications that may be employed are within the scope of the inventive features. Thus, by way of example, but not of limitation, alternative configurations of the inventive features may be utilized in accordance with the teachings herein. Accordingly, the inventive features are not limited to that precisely as shown and described.

The invention claimed is:
1. An article comprising:
   at least one of biopolyethylene or biopolypropylene; and
   a starch-based polymeric material configured to provide the at least one of biopolyethylene or biopolypropylene with biodegradability, where the at least one of biopolyethylene or biopolypropylene itself is not otherwise substantially biodegradable;
   wherein the starch-based polymeric material is formed from a plasticizer and one or more starches comprising one or more of potato starch, corn starch or tapioca starch, the starch-based polymeric material has a crystallinity of less than about 20%, and does not re-form a crystalline structure, and has a water content of no more than about 2%, and
   wherein the starch-based polymeric material and at least one of biopolyethylene or biopolypropylene exhibit a substantial lack of sea-island features when blended together to form the article;
   wherein at least 25% of the biopolyethylene or biopolypropylene biodegrades within 5 years under ASTM D-5511.
2. The article of claim 1, wherein the at least one of biopolyethylene or biopolypropylene comprises a biopolyethylene.
3. The article of claim 2, wherein the at least one of biopolyethylene or biopolypropylene is formed from one or more of sugarcane or corn.
4. The article of claim 1, wherein the starch-based polymeric material is formed from two or more starches, a first starch comprising one or more of potato starch, corn starch or tapioca starch, and a second starch comprising one or more of another of potato starch, corn starch or tapioca starch.
5. The article of claim 4, wherein:
   an amount of the first starch comprises from about 50% to about 90% by weight relative to a combined weight of the first starch and the second starch, and an amount of the second starch comprises from about 10% to about 50% by weight relative to a combined weight of the first starch and the second starch; and
   an amount of the starch-based polymeric material comprises from about 10% to about 40% by weight of a combined weight of the starch-based polymeric material and the at least one of biopolyethylene or biopolypropylene, and an amount of the at least one of biopolyethylene or biopolypropylene comprises from about 60% to about 90% by weight of the combined weight of the starch-based polymeric material and the at least one of biopolyethylene or biopolypropylene.
6. The article of claim 5, wherein a strength of the article is at least about 5% greater than the article would have if made solely from the at least one of biopolyethylene or biopolypropylene, without the starch-based polymeric material.
7. The article of claim 1, wherein at least 90% of polymeric content of the article is sourced from starting materials which can be renewed within about 100 years or less.
8. The article of claim 1, wherein the article comprises a film.
9. The article of claim 1, wherein the article comprises at least one of a bottle or a sheet.
10. An article comprising:
    biopolyethylene; and
    one or more starch-based polymeric materials configured to provide the biopolyethylene of the article with biodegradability, where the biopolyethylene is not otherwise substantially biodegradable;
    wherein the starch-based polymeric material is formed from a plasticizer and one or more starches comprising one or more of potato starch, corn starch or tapioca starch, the starch-based polymeric material has a crystallinity of less than about 20%, and does not re-form a crystalline structure, and has a water content of no more than about 2%;
    wherein the starch-based polymeric material and biopolyethylene exhibit a substantial lack of sea-island features when blended together to form the article; and
    wherein a strength of the article is at least about 5% greater than the article would have if made solely from the biopolyethylene, without the starch-based polymeric material.
11. The article of claim 10, wherein the article comprises a film and has a dart drop impact strength of at least about 100 g/mil of thickness.
12. The article of claim 10, wherein the biopolyethylene is formed from one or more of sugarcane or corn.
13. The article of claim 10, wherein the starch-based polymeric material is formed from two or more starches, a first starch comprising one or more of potato starch, corn starch or tapioca starch, and a second starch comprising one or more of another of potato starch, corn starch or tapioca starch.
14. The article of claim 13, wherein:
    an amount of the first starch comprises from about 50% to about 90% by weight relative to a combined weight of the first starch and the second starch, and an amount of the second starch comprises from about 10% to about 50% by weight relative to a combined weight of the first starch and the second starch; and
    an amount of the starch-based polymeric material comprises from about 10% to about 40% by weight of a combined weight of the starch-based polymeric material and the biopolyethylene, and an amount of the biopolyethylene comprises from about 60% to about 90% by weight of the combined weight of the starch-based polymeric material and the biopolyethylene.
15. The article of claim 10, wherein a strength of the article is at least 10% greater than the article would have if made solely from the biopolyethylene, without the starch-based polymeric material.
16. The article of claim 10, wherein at least 90% of polymeric content of the article is sourced from starting materials which can be renewed within about 100 years or less.
17. The article of claim 10, wherein the article comprises a film.
18. The article of claim 10, wherein the article comprises at least one of a bottle or a sheet.
19. The article of claim 1, further comprising a compatibilizer, wherein the compatibilizer is present in an amount of no more than 8% by weight.
20. The article of claim 10, further comprising a compatibilizer, wherein the compatibilizer is present in an amount of no more than 8% by weight.
21. The article of claim 10, wherein a strength of the article is at least 20% greater than the article would have if made solely from the biopolyethylene, without the starch-based polymeric material.
22. An article comprising:
    PBAT; and
    a starch-based polymeric material configured to provide the PBAT with biodegradability under ASTM D-6691;

wherein the starch-based polymeric material is formed from a starch and a plasticizer, has a crystallinity of less than about 20%, and does not re-form a crystalline structure, has a water content of no more than about 2%, and the starch-based polymeric material and the PBAT exhibit a substantial lack of sea-island features when blended together to form the article; and wherein at least 25% of the PBAT biodegrades within 5 years under ASTM D-6691.

23. The article of claim 1, wherein the article is injection molded or extruded.

24. The article of claim 10, wherein the article is injection molded or extruded.

25. An article comprising:
at least one of biopolyethylene or biopolypropylene;
a starch-based polymeric material configured to provide the at least one of biopolyethylene or biopolypropylene with biodegradability, where the at least one of biopolyethylene or biopolypropylene itself is not otherwise substantially biodegradable; and
a compatibilizer, wherein the compatibilizer is present in an amount of no more than 8% by weight;
wherein the starch-based polymeric material is formed from a starch and a plasticizer, has a crystallinity of less than about 20%, and does not re-form a crystalline structure, and has a water content of no more than about 2%;
wherein the starch-based polymeric material and at least one of biopolyethylene or biopolypropylene exhibit a substantial lack of sea-island features when blended together to form the article;
wherein at least 25% of the biopolyethylene or biopolypropylene biodegrades within 5 years under ASTM D-5511.

26. An article comprising:
biopolyethylene;
one or more starch-based polymeric materials configured to provide the biopolyethylene of the article with biodegradability, where the biopolyethylene is not otherwise substantially biodegradable; and
a compatibilizer, wherein the compatibilizer is present in an amount of no more than 8% by weight;
wherein the starch-based polymeric material is formed from a starch and a plasticizer, has a crystallinity of less than about 20%, and does not re-form a crystalline structure, and has a water content of no more than about 2%;
wherein the starch-based polymeric material and biopolyethylene exhibit a substantial lack of sea-island features when blended together to form the article;
wherein a strength of the article is at least about 5% greater than the article would have if made solely from the biopolyethylene, without the starch-based polymeric material.

27. The article of claim 22, wherein the starch-based polymeric material is formed from one or more starches comprising one or more of potato starch, corn starch or tapioca starch.

28. The article of claim 22, wherein the starch-based polymeric material is formed from two or more starches, a first starch comprising one or more of potato starch, corn starch or tapioca starch, and a second starch comprising one or more of another of potato starch, corn starch or tapioca starch.

29. The article of claim 28, wherein:
an amount of the first starch comprises from about 50% to about 90% by weight relative to a combined weight of the first starch and the second starch, and an amount of the second starch comprises from about 10% to about 50% by weight relative to a combined weight of the first starch and the second starch; and
an amount of the starch-based polymeric material comprises from about 10% to about 40% by weight of a combined weight of the starch-based polymeric material and the PBAT, and an amount of the PBAT comprises from about 60% to about 90% by weight of the combined weight of the starch-based polymeric material and the PBAT.

30. The article of claim 22, wherein an amount of the starch-based polymeric material comprises from about 10% to about 40% by weight of a combined weight of the starch-based polymeric material and the PBAT, and an amount of the PBAT comprises from about 60% to about 90% by weight of the combined weight of the starch-based polymeric material and the PBAT.

31. The article of claim 22, wherein at least 90% of polymeric content of the article is sourced from starting materials which can be renewed within about 100 years or less.

32. The article of claim 22, wherein the article comprises a film.

33. The article of claim 22, wherein the article comprises at least one of a bottle or a sheet.

34. The article of claim 22, further comprising a compatibilizer, wherein the compatibilizer is present in an amount of no more than 8% by weight.

35. The article of claim 22, wherein the article is injection molded or extruded.

36. The article of claim 1, wherein an amount of the starch-based polymeric material comprises from about 10% to about 40% by weight of a combined weight of the starch-based polymeric material and the at least one of biopolyethylene or biopolypropylene, and an amount of the at least one of biopolyethylene or biopolypropylene comprises from about 60% to about 90% by weight of the combined weight of the starch-based polymeric material and the at least one of biopolyethylene or biopolypropylene.

37. The article of claim 10, wherein an amount of the starch-based polymeric material comprises from about 10% to about 40% by weight of a combined weight of the starch-based polymeric material and the biopolyethylene, and an amount of the biopolyethylene comprises from about 60% to about 90% by weight of the combined weight of the starch-based polymeric material and the biopolyethylene.

* * * * *